United States Patent
Sereshki

(10) Patent No.: US 11,302,326 B2
(45) Date of Patent: *Apr. 12, 2022

(54) TONE INTERFERENCE CANCELLATION

(71) Applicant: Sonos, Inc., Santa Barbara, CA (US)

(72) Inventor: Saeed Bagheri Sereshki, Goleta, CA (US)

(73) Assignee: Sonos, Inc., Santa Barbara, CA (US)

(*) Notice: Subject to any disclaimer, the term of this patent is extended or adjusted under 35 U.S.C. 154(b) by 38 days.

This patent is subject to a terminal disclaimer.

(21) Appl. No.: 16/845,946

(22) Filed: Apr. 10, 2020

(65) Prior Publication Data

US 2020/0380982 A1 Dec. 3, 2020

Related U.S. Application Data

(63) Continuation of application No. 15/718,521, filed on Sep. 28, 2017, now Pat. No. 10,621,981.

(51) Int. Cl.
*G10L 15/22* (2006.01)
*G10L 15/08* (2006.01)
(Continued)

(52) U.S. Cl.
CPC ............ *G10L 15/22* (2013.01); *G10L 15/08* (2013.01); *G10L 21/0208* (2013.01);
(Continued)

(58) Field of Classification Search
CPC ...... G10L 15/08; G10L 15/22; H04M 3/5315; H04S 7/301
(Continued)

(56) References Cited

U.S. PATENT DOCUMENTS

| 4,741,038 A | 4/1988 | Elko et al. |
| 4,941,187 A | 7/1990 | Slater |

(Continued)

FOREIGN PATENT DOCUMENTS

| AU | 2017100486 A4 | 6/2017 |
| AU | 2017100581 A4 | 6/2017 |

(Continued)

OTHER PUBLICATIONS

US 9,299,346 B1, 03/2016, Hart et al. (withdrawn)
(Continued)

*Primary Examiner* — Farzad Kazeminezhad
(74) *Attorney, Agent, or Firm* — Akerman LLP

(57) ABSTRACT

Example techniques involve systems with multiple acoustic echo cancellers. An example implementation captures first audio within an acoustic environment and detecting, within the captured first audio content, a wake-word. In response to the wake-word and before playing an acknowledgement tone, the implementation activates (a) a first sound canceller when one or more speakers are playing back audio content or (b) a second sound canceller when the one or more speakers are idle. In response to the wake-word and after activating either (a) the first sound canceller or (b) the second sound canceller, the implementation outputs the acknowledgement tone via the one or more speakers. The implementation captures second audio within the acoustic environment and cancelling the acoustic echo of the acknowledgement tone from the captured second audio using the activated sound canceller.

20 Claims, 10 Drawing Sheets

(51) Int. Cl.
*H04M 3/53* (2006.01)
*H04S 7/00* (2006.01)
*G10L 25/78* (2013.01)
*G10L 21/0232* (2013.01)
*G10L 21/0208* (2013.01)

(52) U.S. Cl.
CPC .......... *G10L 21/0232* (2013.01); *G10L 25/78* (2013.01); *G10L 2015/088* (2013.01); *G10L 2015/223* (2013.01); *G10L 2021/02085* (2013.01); *H04M 3/53* (2013.01); *H04S 7/301* (2013.01)

(58) Field of Classification Search
USPC ........................................ 455/570; 348/14.01
See application file for complete search history.

(56) References Cited

U.S. PATENT DOCUMENTS

| | | | |
|---|---|---|---|
| 4,974,213 | A | 11/1990 | Siwecki |
| 5,036,538 | A | 7/1991 | Oken et al. |
| 5,440,644 | A | 8/1995 | Farinelli et al. |
| 5,588,065 | A | 12/1996 | Tanaka et al. |
| 5,740,260 | A | 4/1998 | Odom |
| 5,761,320 | A | 6/1998 | Farinelli et al. |
| 5,923,902 | A | 7/1999 | Inagaki |
| 5,949,414 | A | 9/1999 | Namikata et al. |
| 6,032,202 | A | 2/2000 | Lea et al. |
| 6,088,459 | A | 7/2000 | Hobelsberger |
| 6,256,554 | B1 | 7/2001 | DiLorenzo |
| 6,301,603 | B1 | 10/2001 | Maher et al. |
| 6,311,157 | B1 | 10/2001 | Strong |
| 6,366,886 | B1 | 4/2002 | Dragosh et al. |
| 6,404,811 | B1 | 6/2002 | Cvetko et al. |
| 6,408,078 | B1 | 6/2002 | Hobelsberger |
| 6,469,633 | B1 | 10/2002 | Wachter et al. |
| 6,522,886 | B1 | 2/2003 | Youngs et al. |
| 6,594,347 | B1 | 7/2003 | Calder et al. |
| 6,594,630 | B1 | 7/2003 | Zlokarnik et al. |
| 6,611,537 | B1 | 8/2003 | Edens et al. |
| 6,611,604 | B1 | 8/2003 | Irby et al. |
| 6,631,410 | B1 | 10/2003 | Kowalski et al. |
| 6,757,517 | B2 | 6/2004 | Chang |
| 6,778,869 | B2 | 8/2004 | Champion |
| 6,937,977 | B2 | 8/2005 | Gerson |
| 7,099,821 | B2 | 8/2006 | Visser et al. |
| 7,103,542 | B2 | 9/2006 | Doyle |
| 7,130,608 | B2 | 10/2006 | Hollstrom et al. |
| 7,130,616 | B2 | 10/2006 | Janik |
| 7,143,939 | B2 | 12/2006 | Henzerling |
| 7,174,299 | B2 | 2/2007 | Fujii et al. |
| 7,228,275 | B1 | 6/2007 | Endo et al. |
| 7,236,773 | B2 | 6/2007 | Thomas |
| 7,295,548 | B2 | 11/2007 | Blank et al. |
| 7,356,471 | B2 | 4/2008 | Ito et al. |
| 7,383,297 | B1 | 6/2008 | Atsmon et al. |
| 7,391,791 | B2 | 6/2008 | Balassanian et al. |
| 7,483,538 | B2 | 1/2009 | McCarty et al. |
| 7,571,014 | B1 | 8/2009 | Lambourne et al. |
| 7,577,757 | B2 | 8/2009 | Carter et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,661,107 | B1 | 2/2010 | Van et al. |
| 7,702,508 | B2 | 4/2010 | Bennett |
| 7,792,311 | B1 | 9/2010 | Holmgren et al. |
| 7,853,341 | B2 | 12/2010 | McCarty et al. |
| 7,961,892 | B2 | 6/2011 | Fedigan |
| 7,987,294 | B2 | 7/2011 | Bryce et al. |
| 8,014,423 | B2 | 9/2011 | Thaler et al. |
| 8,019,076 | B1 | 9/2011 | Lambert |
| 8,032,383 | B1 | 10/2011 | Bhardwaj et al. |
| 8,041,565 | B1 | 10/2011 | Bhardwaj et al. |
| 8,045,952 | B2 | 10/2011 | Oureshey et al. |
| 8,073,125 | B2 | 12/2011 | Zhang et al. |
| 8,073,681 | B2 | 12/2011 | Baldwin et al. |
| 8,103,009 | B2 | 1/2012 | McCarty et al. |
| 8,136,040 | B2 | 3/2012 | Fleming |
| 8,165,867 | B1 | 4/2012 | Fish |
| 8,234,395 | B2 | 7/2012 | Millington |
| 8,239,206 | B1 | 8/2012 | Lebeau et al. |
| 8,255,224 | B2 | 8/2012 | Singleton et al. |
| 8,284,982 | B2 | 10/2012 | Bailey |
| 8,290,603 | B1 | 10/2012 | Lambourne |
| 8,340,975 | B1 | 12/2012 | Rosenberger |
| 8,364,481 | B2 | 1/2013 | Strope et al. |
| 8,385,557 | B2 | 2/2013 | Tashev et al. |
| 8,386,261 | B2 | 2/2013 | Mellott et al. |
| 8,386,523 | B2 | 2/2013 | Mody et al. |
| 8,423,893 | B2 | 4/2013 | Ramsay et al. |
| 8,428,758 | B2 | 4/2013 | Naik et al. |
| 8,453,058 | B1 | 5/2013 | Coccaro et al. |
| 8,473,618 | B2 | 6/2013 | Spear et al. |
| 8,483,853 | B1 | 7/2013 | Lambourne |
| 8,484,025 | B1 | 7/2013 | Moreno et al. |
| 8,588,849 | B2 | 11/2013 | Patterson et al. |
| 8,600,443 | B2 | 12/2013 | Kawaguchi et al. |
| 8,710,970 | B2 | 4/2014 | Oelrich et al. |
| 8,738,925 | B1 | 5/2014 | Park et al. |
| 8,775,191 | B1 | 7/2014 | Sharifi et al. |
| 8,831,761 | B2 | 9/2014 | Kemp et al. |
| 8,831,957 | B2 | 9/2014 | Taubman et al. |
| 8,848,879 | B1 | 9/2014 | Coughlan et al. |
| 8,861,756 | B2 | 10/2014 | Zhu et al. |
| 8,874,448 | B1 | 10/2014 | Kauffmann et al. |
| 8,938,394 | B1 | 1/2015 | Faaborg et al. |
| 8,942,252 | B2 | 1/2015 | Balassanian et al. |
| 8,983,383 | B1 | 3/2015 | Haskin |
| 8,983,844 | B1 | 3/2015 | Thomas et al. |
| 9,015,049 | B2 | 4/2015 | Baldwin et al. |
| 9,042,556 | B2 | 5/2015 | Kallai et al. |
| 9,060,224 | B1 | 6/2015 | List |
| 9,094,539 | B1 | 7/2015 | Noble |
| 9,098,467 | B1 | 8/2015 | Blanksteen et al. |
| 9,124,650 | B2 | 9/2015 | Maharajh et al. |
| 9,124,711 | B2 | 9/2015 | Park et al. |
| 9,148,742 | B1 | 9/2015 | Koulomzin et al. |
| 9,190,043 | B2 | 11/2015 | Krisch et al. |
| 9,208,785 | B2 | 12/2015 | Ben-David et al. |
| 9,215,545 | B2 | 12/2015 | Dublin et al. |
| 9,245,527 | B2 | 1/2016 | Lindahl |
| 9,251,793 | B2 | 2/2016 | Lebeau et al. |
| 9,253,572 | B2 | 2/2016 | Beddingfield, Sr. et al. |
| 9,262,612 | B2 | 2/2016 | Cheyer |
| 9,263,042 | B1 | 2/2016 | Sharifi |
| 9,275,637 | B1 | 3/2016 | Salvador et al. |
| 9,288,597 | B2 | 3/2016 | Carlsson et al. |
| 9,300,266 | B2 | 3/2016 | Grokop |
| 9,304,736 | B1 | 4/2016 | Whiteley et al. |
| 9,307,321 | B1 | 4/2016 | Unruh |
| 9,318,107 | B1 | 4/2016 | Sharifi |
| 9,319,816 | B1 | 4/2016 | Narayanan |
| 9,324,322 | B1 | 4/2016 | Torok et al. |
| 9,335,819 | B1 | 5/2016 | Jaeger et al. |
| 9,361,878 | B2 | 6/2016 | Boukadakis |
| 9,368,105 | B1 | 6/2016 | Freed et al. |
| 9,373,329 | B2 | 6/2016 | Strope et al. |
| 9,374,634 | B2 | 6/2016 | Macours |
| 9,386,154 | B2 | 7/2016 | Baciu et al. |
| 9,390,708 | B1 | 7/2016 | Hoffmeister |
| 9,401,058 | B2 | 7/2016 | De La Fuente et al. |
| 9,412,392 | B2 | 8/2016 | Lindahl et al. |
| 9,426,567 | B2 | 8/2016 | Lee et al. |
| 9,431,021 | B1 | 8/2016 | Scalise et al. |
| 9,443,527 | B1 | 9/2016 | Watanabe et al. |
| 9,472,201 | B1 | 10/2016 | Sleator |
| 9,472,203 | B1 | 10/2016 | Ayrapetian et al. |
| 9,484,030 | B1 | 11/2016 | Meaney et al. |
| 9,489,948 | B1 | 11/2016 | Chu et al. |
| 9,494,683 | B1 | 11/2016 | Sadek |
| 9,509,269 | B1 | 11/2016 | Rosenberg |
| 9,510,101 | B1 | 11/2016 | Polleros |
| 9,514,476 | B2 | 12/2016 | Kay et al. |

(56) References Cited

U.S. PATENT DOCUMENTS

| | | |
|---|---|---|
| 9,514,752 B2 | 12/2016 | Sharifi |
| 9,516,081 B2 | 12/2016 | Tebbs et al. |
| 9,536,541 B2 | 1/2017 | Chen et al. |
| 9,548,053 B1 | 1/2017 | Basye et al. |
| 9,548,066 B2 | 1/2017 | Jain et al. |
| 9,552,816 B2 | 1/2017 | Vanlund et al. |
| 9,554,210 B1 | 1/2017 | Ayrapetian et al. |
| 9,560,441 B1 | 1/2017 | McDonough, Jr. et al. |
| 9,576,591 B2 | 2/2017 | Kim et al. |
| 9,601,116 B2 | 3/2017 | Casado et al. |
| 9,615,170 B2 | 4/2017 | Kirsch et al. |
| 9,615,171 B1 | 4/2017 | O'Neill et al. |
| 9,626,695 B2 | 4/2017 | Balasubramanian et al. |
| 9,632,748 B2 | 4/2017 | Faaborg et al. |
| 9,633,186 B2 | 4/2017 | Ingrassia, Jr. et al. |
| 9,633,368 B2 | 4/2017 | Greenzeiger et al. |
| 9,633,660 B2 | 4/2017 | Haughay et al. |
| 9,633,661 B1 | 4/2017 | Typrin et al. |
| 9,633,671 B2 | 4/2017 | Giacobello et al. |
| 9,633,674 B2 | 4/2017 | Sinha et al. |
| 9,640,179 B1 | 5/2017 | Hart et al. |
| 9,640,183 B2 | 5/2017 | Jung et al. |
| 9,641,919 B1 | 5/2017 | Poole et al. |
| 9,646,614 B2 | 5/2017 | Bellegarda et al. |
| 9,648,564 B1 | 5/2017 | Cui et al. |
| 9,653,060 B1 | 5/2017 | Hilmes et al. |
| 9,653,075 B1 | 5/2017 | Chen et al. |
| 9,659,555 B1 | 5/2017 | Hilmes et al. |
| 9,672,821 B2 | 6/2017 | Krishnaswamy et al. |
| 9,674,587 B2 | 6/2017 | Triplett et al. |
| 9,685,171 B1 | 6/2017 | Yang |
| 9,691,378 B1 | 6/2017 | Meyers et al. |
| 9,691,379 B1 | 6/2017 | Mathias et al. |
| 9,697,826 B2 | 7/2017 | Sainath et al. |
| 9,697,828 B1 | 7/2017 | Prasad et al. |
| 9,698,999 B2 | 7/2017 | Mutagi et al. |
| 9,704,478 B1 | 7/2017 | Vitaladevuni et al. |
| 9,721,566 B2 | 8/2017 | Newendorp et al. |
| 9,721,568 B1 | 8/2017 | Polansky et al. |
| 9,721,570 B1 | 8/2017 | Beal et al. |
| 9,728,188 B1 | 8/2017 | Rosen et al. |
| 9,734,822 B1 | 8/2017 | Sundaram et al. |
| 9,736,578 B2 | 8/2017 | Iyengar et al. |
| 9,743,204 B1 | 8/2017 | Welch et al. |
| 9,743,207 B1 | 8/2017 | Hartung |
| 9,747,011 B2 | 8/2017 | Lewis et al. |
| 9,747,899 B2 | 8/2017 | Pogue et al. |
| 9,747,920 B2 | 8/2017 | Ayrapetian et al. |
| 9,747,926 B2 | 8/2017 | Sharifi et al. |
| 9,749,760 B2 | 8/2017 | Lambourne |
| 9,754,605 B1 | 9/2017 | Chhetri |
| 9,762,967 B2 | 9/2017 | Clarke et al. |
| 9,769,420 B1 | 9/2017 | Moses |
| 9,779,725 B2 | 10/2017 | Sun et al. |
| 9,779,735 B2 | 10/2017 | Civelli et al. |
| 9,811,314 B2 | 11/2017 | Plagge et al. |
| 9,813,810 B1 | 11/2017 | Nongpiur |
| 9,813,812 B2 | 11/2017 | Berthelsen et al. |
| 9,818,407 B1 | 11/2017 | Secker-Walker et al. |
| 9,820,036 B1 | 11/2017 | Tritschler et al. |
| 9,820,039 B2 | 11/2017 | Lang |
| 9,826,306 B2 | 11/2017 | Lang |
| 9,865,259 B1 | 1/2018 | Typrin et al. |
| 9,865,264 B2 | 1/2018 | Gelfenbeyn et al. |
| 9,881,616 B2 | 1/2018 | Beckley et al. |
| 9,900,723 B1 | 2/2018 | Choisel et al. |
| 9,916,839 B1 | 3/2018 | Scalise et al. |
| 9,947,316 B2 | 4/2018 | Millington et al. |
| 9,947,333 B1 | 4/2018 | David |
| 9,972,318 B1 | 5/2018 | Kelly et al. |
| 9,972,343 B1 | 5/2018 | Thorson et al. |
| 9,973,849 B1 | 5/2018 | Zhang et al. |
| 9,979,560 B2 | 5/2018 | Kim et al. |
| 10,013,381 B2 | 7/2018 | Mayman et al. |
| 10,013,995 B1 | 7/2018 | Lashkari et al. |
| 10,026,401 B1 | 7/2018 | Mutagi et al. |
| 10,048,930 B1 | 8/2018 | Vega et al. |
| 10,049,675 B2 | 8/2018 | Haughay |
| 10,051,366 B1 | 8/2018 | Buoni et al. |
| 10,051,600 B1 | 8/2018 | Zhong et al. |
| 10,057,698 B2 | 8/2018 | Drinkwater et al. |
| RE47,049 E | 9/2018 | Zhu et al. |
| 10,068,573 B1 | 9/2018 | Aykac et al. |
| 10,074,369 B2 | 9/2018 | Devaraj et al. |
| 10,074,371 B1 | 9/2018 | Wang et al. |
| 10,079,015 B1 | 9/2018 | Lockhart et al. |
| 10,108,393 B2 | 10/2018 | Millington et al. |
| 10,115,400 B2 | 10/2018 | Wilberding |
| 10,116,748 B2 | 10/2018 | Farmer et al. |
| 10,127,911 B2 | 11/2018 | Kim et al. |
| 10,134,399 B2 | 11/2018 | Lang et al. |
| 10,136,204 B1 | 11/2018 | Poole et al. |
| 10,152,969 B2 | 12/2018 | Reilly et al. |
| 10,181,323 B2 | 1/2019 | Beckhardt et al. |
| 10,186,265 B1 | 1/2019 | Lockhart et al. |
| 10,192,546 B1 | 1/2019 | Piersol et al. |
| 10,224,056 B1 | 3/2019 | Torok et al. |
| 10,225,651 B2 | 3/2019 | Lang |
| 10,248,376 B2 | 4/2019 | Keyser-Allen et al. |
| 10,276,161 B2 | 4/2019 | Hughes et al. |
| 10,297,256 B2 | 5/2019 | Reilly et al. |
| 10,339,917 B2 | 7/2019 | Aleksic et al. |
| 10,346,122 B1 | 7/2019 | Morgan |
| 10,354,650 B2 | 7/2019 | Gruenstein et al. |
| 10,365,887 B1 | 7/2019 | Mulherkar |
| 10,365,889 B2 | 7/2019 | Plagge et al. |
| 10,366,688 B2 | 7/2019 | Gunn et al. |
| 10,366,699 B1 | 7/2019 | Dharia et al. |
| 10,374,816 B1 | 8/2019 | Leblang et al. |
| 10,381,001 B2 | 8/2019 | Gunn et al. |
| 10,381,002 B2 | 8/2019 | Gunn et al. |
| 10,381,003 B2 | 8/2019 | Wakisaka et al. |
| 10,388,272 B1 | 8/2019 | Thomson et al. |
| 10,433,058 B1 | 10/2019 | Torgerson et al. |
| 10,445,057 B2 | 10/2019 | Vega et al. |
| 10,469,966 B2 | 11/2019 | Lambourne |
| 10,499,146 B2 | 12/2019 | Lang et al. |
| 10,510,340 B1 | 12/2019 | Fu et al. |
| 10,511,904 B2 | 12/2019 | Buoni et al. |
| 10,522,146 B1 | 12/2019 | Tushinskiy |
| 10,546,583 B2 | 1/2020 | White et al. |
| 10,573,321 B1 | 2/2020 | Smith et al. |
| 10,586,540 B1 | 3/2020 | Smith et al. |
| 10,599,287 B2 | 3/2020 | Kumar et al. |
| 10,602,268 B1 | 3/2020 | Soto |
| 10,614,807 B2 | 4/2020 | Beckhardt et al. |
| 10,621,981 B2 * | 4/2020 | Sereshki ............... G10L 15/08 |
| 10,622,009 B1 | 4/2020 | Zhang et al. |
| 10,624,612 B2 | 4/2020 | Sumi et al. |
| 10,645,130 B2 | 5/2020 | Corbin et al. |
| 10,672,383 B1 | 6/2020 | Thomson et al. |
| 10,679,625 B1 | 6/2020 | Lockhart et al. |
| 10,681,460 B2 | 6/2020 | Woo et al. |
| 10,694,608 B2 | 6/2020 | Baker et al. |
| 10,712,997 B2 | 7/2020 | Wilberding et al. |
| 10,740,065 B2 | 8/2020 | Jarvis et al. |
| 10,762,896 B1 | 9/2020 | Yavagal et al. |
| 10,847,143 B2 | 11/2020 | Millington et al. |
| 10,848,885 B2 | 11/2020 | Lambourne |
| RE48,371 E | 12/2020 | Zhu et al. |
| 10,878,811 B2 | 12/2020 | Smith et al. |
| 10,897,679 B2 | 1/2021 | Lambourne |
| 10,943,598 B2 | 3/2021 | Singh et al. |
| 10,971,158 B1 | 4/2021 | Patangay et al. |
| 2001/0042107 A1 | 11/2001 | Palm |
| 2002/0022453 A1 | 2/2002 | Balog et al. |
| 2002/0026442 A1 | 2/2002 | Lipscomb et al. |
| 2002/0034280 A1 | 3/2002 | Infosino |
| 2002/0046023 A1 | 4/2002 | Fujii et al. |
| 2002/0072816 A1 | 6/2002 | Shdema et al. |
| 2002/0116196 A1 | 8/2002 | Tran |
| 2002/0124097 A1 | 9/2002 | Isely et al. |
| 2003/0015354 A1 | 1/2003 | Edwards et al. |
| 2003/0038848 A1 | 2/2003 | Lee et al. |

(56) References Cited

U.S. PATENT DOCUMENTS

| | | |
|---|---|---|
| 2003/0040908 A1 | 2/2003 | Yang et al. |
| 2003/0070182 A1 | 4/2003 | Pierre et al. |
| 2003/0070869 A1 | 4/2003 | Hlibowicki |
| 2003/0072462 A1 | 4/2003 | Hlibowicki |
| 2003/0095672 A1 | 5/2003 | Hobelsberger |
| 2003/0130850 A1 | 7/2003 | Badt et al. |
| 2003/0157951 A1 | 8/2003 | Hasty |
| 2003/0235244 A1 | 12/2003 | Pessoa et al. |
| 2004/0024478 A1 | 2/2004 | Hans et al. |
| 2004/0093219 A1 | 5/2004 | Shin et al. |
| 2004/0105566 A1 | 6/2004 | Matsunaga et al. |
| 2004/0127241 A1 | 7/2004 | Shostak |
| 2004/0128135 A1 | 7/2004 | Anastasakos et al. |
| 2004/0234088 A1 | 11/2004 | McCarty et al. |
| 2005/0031131 A1 | 2/2005 | Browning et al. |
| 2005/0031132 A1 | 2/2005 | Browning et al. |
| 2005/0031133 A1 | 2/2005 | Browning et al. |
| 2005/0031134 A1 | 2/2005 | Leske |
| 2005/0031137 A1 | 2/2005 | Browning et al. |
| 2005/0031138 A1 | 2/2005 | Browning et al. |
| 2005/0031139 A1 | 2/2005 | Browning et al. |
| 2005/0031140 A1 | 2/2005 | Browning |
| 2005/0047606 A1 | 3/2005 | Lee et al. |
| 2005/0077843 A1 | 4/2005 | Benditt |
| 2005/0164664 A1 | 7/2005 | DiFonzo et al. |
| 2005/0195988 A1 | 9/2005 | Tashev et al. |
| 2005/0201254 A1 | 9/2005 | Looney et al. |
| 2005/0207584 A1 | 9/2005 | Bright |
| 2005/0235334 A1 | 10/2005 | Togashi et al. |
| 2005/0268234 A1 | 12/2005 | Rossi et al. |
| 2005/0283330 A1 | 12/2005 | Laraia et al. |
| 2005/0283475 A1 | 12/2005 | Beranek et al. |
| 2006/0004834 A1 | 1/2006 | Pyhalammi et al. |
| 2006/0023945 A1 | 2/2006 | King et al. |
| 2006/0041431 A1 | 2/2006 | Maes |
| 2006/0093128 A1 | 5/2006 | Oxford |
| 2006/0104451 A1 | 5/2006 | Browning et al. |
| 2006/0147058 A1 | 7/2006 | Wang |
| 2006/0190269 A1 | 8/2006 | Tessel et al. |
| 2006/0190968 A1 | 8/2006 | Jung et al. |
| 2006/0247913 A1 | 11/2006 | Huerta et al. |
| 2006/0262943 A1 | 11/2006 | Oxford |
| 2007/0018844 A1 | 1/2007 | Sutardja |
| 2007/0019815 A1 | 1/2007 | Asada et al. |
| 2007/0033043 A1 | 2/2007 | Hyakumoto |
| 2007/0071206 A1 | 3/2007 | Gainsboro et al. |
| 2007/0071255 A1 | 3/2007 | Schobben |
| 2007/0076131 A1 | 4/2007 | Li et al. |
| 2007/0076906 A1 | 4/2007 | Takagi et al. |
| 2007/0140058 A1 | 6/2007 | McIntosh et al. |
| 2007/0140521 A1 | 6/2007 | Mitobe et al. |
| 2007/0142944 A1 | 6/2007 | Goldberg et al. |
| 2007/0147651 A1 | 6/2007 | Mitobe et al. |
| 2007/0201639 A1 | 8/2007 | Park et al. |
| 2007/0254604 A1 | 11/2007 | Kim |
| 2008/0037814 A1 | 2/2008 | Shau |
| 2008/0090537 A1 | 4/2008 | Sutardja |
| 2008/0090617 A1 | 4/2008 | Sutardja |
| 2008/0146289 A1 | 6/2008 | Korneluk et al. |
| 2008/0182518 A1 | 7/2008 | Lo |
| 2008/0207115 A1 | 8/2008 | Lee et al. |
| 2008/0208594 A1 | 8/2008 | Cross et al. |
| 2008/0221897 A1 | 9/2008 | Cerra et al. |
| 2008/0247530 A1 | 10/2008 | Barton et al. |
| 2008/0248797 A1 | 10/2008 | Freeman et al. |
| 2008/0291896 A1 | 11/2008 | Tuubel et al. |
| 2008/0301729 A1 | 12/2008 | Broos et al. |
| 2009/0003620 A1 | 1/2009 | McKillop et al. |
| 2009/0005893 A1 | 1/2009 | Sugii et al. |
| 2009/0010445 A1 | 1/2009 | Matsuo |
| 2009/0018828 A1 | 1/2009 | Nakadai et al. |
| 2009/0043206 A1 | 2/2009 | Towfiq et al. |
| 2009/0052688 A1 | 2/2009 | Ishibashi et al. |
| 2009/0076821 A1 | 3/2009 | Brenner et al. |
| 2009/0153289 A1 | 6/2009 | Hope et al. |
| 2009/0191854 A1 | 7/2009 | Beason |
| 2009/0197524 A1 | 8/2009 | Haff et al. |
| 2009/0220107 A1 | 9/2009 | Every et al. |
| 2009/0228919 A1 | 9/2009 | Zott et al. |
| 2009/0238377 A1 | 9/2009 | Ramakrishnan et al. |
| 2009/0238386 A1 | 9/2009 | Usher et al. |
| 2009/0248397 A1 | 10/2009 | Garcia et al. |
| 2009/0249222 A1 | 10/2009 | Schmidt et al. |
| 2009/0264072 A1 | 10/2009 | Dai |
| 2009/0323907 A1 | 12/2009 | Gupta et al. |
| 2009/0326949 A1 | 12/2009 | Douthitt et al. |
| 2010/0014690 A1 | 1/2010 | Wolff et al. |
| 2010/0023638 A1 | 1/2010 | Bowman |
| 2010/0035593 A1 | 2/2010 | Franco et al. |
| 2010/0070922 A1 | 3/2010 | DeMaio et al. |
| 2010/0075723 A1 | 3/2010 | Min et al. |
| 2010/0088100 A1 | 4/2010 | Lindahl |
| 2010/0092004 A1 | 4/2010 | Kuze |
| 2010/0161335 A1 | 6/2010 | Whynot |
| 2010/0172516 A1 | 7/2010 | Lastrucci |
| 2010/0178873 A1 | 7/2010 | Lee et al. |
| 2010/0179874 A1 | 7/2010 | Higgins et al. |
| 2010/0185448 A1 | 7/2010 | Meisel |
| 2010/0211199 A1 | 8/2010 | Naik et al. |
| 2011/0033059 A1 | 2/2011 | Bhaskar et al. |
| 2011/0035580 A1 | 2/2011 | Wang et al. |
| 2011/0044461 A1 | 2/2011 | Kuech et al. |
| 2011/0044489 A1 | 2/2011 | Saiki et al. |
| 2011/0066634 A1 | 3/2011 | Phillips et al. |
| 2011/0091055 A1 | 4/2011 | Leblanc |
| 2011/0103615 A1 | 5/2011 | Sun |
| 2011/0145581 A1 | 6/2011 | Malhotra et al. |
| 2011/0170707 A1 | 7/2011 | Yamada et al. |
| 2011/0182436 A1 | 7/2011 | Murgia et al. |
| 2011/0202924 A1 | 8/2011 | Banguero et al. |
| 2011/0218656 A1 | 9/2011 | Bishop et al. |
| 2011/0267985 A1 | 11/2011 | Wilkinson et al. |
| 2011/0276333 A1 | 11/2011 | Wang et al. |
| 2011/0280422 A1 | 11/2011 | Neumeyer et al. |
| 2011/0285808 A1 | 11/2011 | Feng et al. |
| 2011/0289506 A1 | 11/2011 | Trivi et al. |
| 2011/0299706 A1 | 12/2011 | Sakai |
| 2012/0020486 A1 | 1/2012 | Fried et al. |
| 2012/0022863 A1 | 1/2012 | Cho et al. |
| 2012/0022864 A1 | 1/2012 | Leman et al. |
| 2012/0078635 A1 | 3/2012 | Rothkopf et al. |
| 2012/0086568 A1 | 4/2012 | Scott et al. |
| 2012/0123268 A1 | 5/2012 | Tanaka et al. |
| 2012/0128160 A1 | 5/2012 | Kim et al. |
| 2012/0131125 A1 | 5/2012 | Seidel et al. |
| 2012/0148075 A1 | 6/2012 | Goh et al. |
| 2012/0162540 A1 | 6/2012 | Ouchi et al. |
| 2012/0163603 A1 | 6/2012 | Abe et al. |
| 2012/0177215 A1 | 7/2012 | Bose et al. |
| 2012/0183149 A1 | 7/2012 | Hiroe |
| 2012/0224715 A1 | 9/2012 | Kikkeri |
| 2012/0297284 A1 | 11/2012 | Matthews, III et al. |
| 2012/0308044 A1 | 12/2012 | Vander et al. |
| 2012/0308046 A1 | 12/2012 | Muza |
| 2013/0006453 A1 | 1/2013 | Wang et al. |
| 2013/0024018 A1 | 1/2013 | Chang et al. |
| 2013/0034241 A1 | 2/2013 | Pandey et al. |
| 2013/0039527 A1 | 2/2013 | Jensen et al. |
| 2013/0058492 A1 | 3/2013 | Silzle et al. |
| 2013/0066453 A1 | 3/2013 | Seefeldt |
| 2013/0080146 A1 | 3/2013 | Kato et al. |
| 2013/0124211 A1 | 5/2013 | McDonough |
| 2013/0148821 A1 | 6/2013 | Sorensen |
| 2013/0170647 A1 | 7/2013 | Reilly et al. |
| 2013/0179173 A1 | 7/2013 | Lee et al. |
| 2013/0183944 A1 | 7/2013 | Mozer et al. |
| 2013/0191119 A1 | 7/2013 | Sugiyama |
| 2013/0191122 A1 | 7/2013 | Mason |
| 2013/0198298 A1 | 8/2013 | Li et al. |
| 2013/0211826 A1 | 8/2013 | Mannby |
| 2013/0216056 A1 | 8/2013 | Thyssen |
| 2013/0262101 A1 | 10/2013 | Srinivasan |
| 2013/0315420 A1 | 11/2013 | You |
| 2013/0317635 A1 | 11/2013 | Bates et al. |

(56) References Cited

U.S. PATENT DOCUMENTS

| | | |
|---|---|---|
| 2013/0322462 A1 | 12/2013 | Poulsen |
| 2013/0322665 A1 | 12/2013 | Bennett et al. |
| 2013/0324031 A1 | 12/2013 | Loureiro |
| 2013/0329896 A1 | 12/2013 | Krishnaswamy et al. |
| 2013/0331970 A1 | 12/2013 | Beckhardt et al. |
| 2013/0332165 A1 | 12/2013 | Beckley et al. |
| 2013/0339028 A1 | 12/2013 | Rosner et al. |
| 2014/0003611 A1 | 1/2014 | Mohammad et al. |
| 2014/0003625 A1 | 1/2014 | Sheen et al. |
| 2014/0003635 A1 | 1/2014 | Mohammad et al. |
| 2014/0005813 A1 | 1/2014 | Reimann |
| 2014/0006026 A1 | 1/2014 | Lamb et al. |
| 2014/0006825 A1 | 1/2014 | Shenhav |
| 2014/0019743 A1 | 1/2014 | DeLuca |
| 2014/0034929 A1 | 2/2014 | Hamada et al. |
| 2014/0046464 A1 | 2/2014 | Reimann |
| 2014/0064501 A1 | 3/2014 | Olsen et al. |
| 2014/0073298 A1 | 3/2014 | Rossmann |
| 2014/0075306 A1 | 3/2014 | Rega |
| 2014/0075311 A1 | 3/2014 | Boettcher et al. |
| 2014/0094151 A1 | 4/2014 | Klappert et al. |
| 2014/0100854 A1 | 4/2014 | Chen et al. |
| 2014/0109138 A1 | 4/2014 | Cannistraro et al. |
| 2014/0122075 A1 | 5/2014 | Bak et al. |
| 2014/0136195 A1 | 5/2014 | Abdossalami et al. |
| 2014/0145168 A1 | 5/2014 | Ohsawa et al. |
| 2014/0146983 A1 | 5/2014 | Kim et al. |
| 2014/0163978 A1 | 6/2014 | Basye et al. |
| 2014/0164400 A1 | 6/2014 | Kruglick |
| 2014/0167931 A1 | 6/2014 | Lee et al. |
| 2014/0168344 A1 | 6/2014 | Shoemake et al. |
| 2014/0172953 A1 | 6/2014 | Blanksteen |
| 2014/0181271 A1 | 6/2014 | Millington |
| 2014/0192986 A1 | 7/2014 | Lee et al. |
| 2014/0195252 A1 | 7/2014 | Gruber et al. |
| 2014/0207457 A1 | 7/2014 | Biatov et al. |
| 2014/0214429 A1 | 7/2014 | Pantel |
| 2014/0215332 A1 | 7/2014 | Lee et al. |
| 2014/0219472 A1 | 8/2014 | Huang et al. |
| 2014/0222436 A1 | 8/2014 | Binder et al. |
| 2014/0229184 A1 | 8/2014 | Shires |
| 2014/0244013 A1 | 8/2014 | Reilly |
| 2014/0244712 A1 | 8/2014 | Walters et al. |
| 2014/0249817 A1 | 9/2014 | Hart et al. |
| 2014/0252386 A1 | 9/2014 | Ito et al. |
| 2014/0254805 A1 | 9/2014 | Su et al. |
| 2014/0258292 A1 | 9/2014 | Thramann et al. |
| 2014/0259075 A1 | 9/2014 | Chang et al. |
| 2014/0269757 A1 | 9/2014 | Park et al. |
| 2014/0270282 A1 | 9/2014 | Tammi et al. |
| 2014/0274185 A1 | 9/2014 | Luna et al. |
| 2014/0274203 A1 | 9/2014 | Ganong, III et al. |
| 2014/0274218 A1 | 9/2014 | Kadiwala et al. |
| 2014/0277650 A1 | 9/2014 | Zurek et al. |
| 2014/0291642 A1 | 10/2014 | Watabe et al. |
| 2014/0310002 A1 | 10/2014 | Nitz et al. |
| 2014/0310614 A1 | 10/2014 | Jones |
| 2014/0340888 A1 | 11/2014 | Ishisone et al. |
| 2014/0357248 A1 | 12/2014 | Tonshal et al. |
| 2014/0363022 A1 | 12/2014 | Dizon et al. |
| 2014/0363024 A1 | 12/2014 | Apodaca |
| 2014/0365227 A1 | 12/2014 | Cash et al. |
| 2014/0369491 A1 | 12/2014 | Kloberdans et al. |
| 2014/0372109 A1 | 12/2014 | Iyer et al. |
| 2015/0006176 A1 | 1/2015 | Pogue et al. |
| 2015/0006184 A1 | 1/2015 | Marti et al. |
| 2015/0010169 A1 | 1/2015 | Popova et al. |
| 2015/0014680 A1 | 1/2015 | Yamazaki et al. |
| 2015/0016642 A1 | 1/2015 | Walsh et al. |
| 2015/0018992 A1 | 1/2015 | Griffiths et al. |
| 2015/0019201 A1 | 1/2015 | Schoenbach |
| 2015/0019219 A1 | 1/2015 | Tzirkel-Hancock et al. |
| 2015/0036831 A1 | 2/2015 | Klippel |
| 2015/0039303 A1 | 2/2015 | Lesso et al. |
| 2015/0063580 A1 | 3/2015 | Huang et al. |
| 2015/0086034 A1 | 3/2015 | Lombardi et al. |
| 2015/0091709 A1 | 4/2015 | Reichert et al. |
| 2015/0092947 A1 | 4/2015 | Gossain et al. |
| 2015/0104037 A1 | 4/2015 | Lee et al. |
| 2015/0106085 A1 | 4/2015 | Lindahl |
| 2015/0110294 A1 | 4/2015 | Chen et al. |
| 2015/0112672 A1 | 4/2015 | Giacobello et al. |
| 2015/0124975 A1 | 5/2015 | Pontoppidan |
| 2015/0128065 A1 | 5/2015 | Torii et al. |
| 2015/0134456 A1 | 5/2015 | Baldwin |
| 2015/0154976 A1 | 6/2015 | Mutagi |
| 2015/0161990 A1 | 6/2015 | Sharifi |
| 2015/0169279 A1 | 6/2015 | Duga |
| 2015/0170645 A1 | 6/2015 | Di et al. |
| 2015/0172843 A1 | 6/2015 | Quan |
| 2015/0179181 A1 | 6/2015 | Morris et al. |
| 2015/0180432 A1 | 6/2015 | Gao et al. |
| 2015/0181318 A1 | 6/2015 | Gautama et al. |
| 2015/0189438 A1 | 7/2015 | Hampiholi et al. |
| 2015/0200454 A1 | 7/2015 | Heusdens et al. |
| 2015/0201271 A1 | 7/2015 | Diethorn et al. |
| 2015/0221678 A1 | 8/2015 | Yamazaki et al. |
| 2015/0222563 A1 | 8/2015 | Burns et al. |
| 2015/0222987 A1 | 8/2015 | Angel, Jr. et al. |
| 2015/0228274 A1 | 8/2015 | Leppanen et al. |
| 2015/0228803 A1 | 8/2015 | Koezuka et al. |
| 2015/0237406 A1 | 8/2015 | Ochoa |
| 2015/0243287 A1 | 8/2015 | Nakano et al. |
| 2015/0245152 A1 | 8/2015 | Ding et al. |
| 2015/0245154 A1 | 8/2015 | Dadu et al. |
| 2015/0249889 A1 | 9/2015 | Iyer et al. |
| 2015/0253292 A1 | 9/2015 | Larkin et al. |
| 2015/0253960 A1 | 9/2015 | Lin et al. |
| 2015/0254057 A1 | 9/2015 | Klein et al. |
| 2015/0263174 A1 | 9/2015 | Yamazaki et al. |
| 2015/0271593 A1 | 9/2015 | Sun et al. |
| 2015/0277846 A1 | 10/2015 | Yen et al. |
| 2015/0280676 A1 | 10/2015 | Holman et al. |
| 2015/0296299 A1 | 10/2015 | Klippel et al. |
| 2015/0302856 A1 | 10/2015 | Kim et al. |
| 2015/0319529 A1 | 11/2015 | Klippel |
| 2015/0325267 A1 | 11/2015 | Lee et al. |
| 2015/0331663 A1 | 11/2015 | Beckhardt et al. |
| 2015/0334471 A1 | 11/2015 | Innes et al. |
| 2015/0338917 A1 | 11/2015 | Steiner et al. |
| 2015/0341406 A1 | 11/2015 | Rockefeller et al. |
| 2015/0346845 A1 | 12/2015 | Di et al. |
| 2015/0348548 A1 | 12/2015 | Piernot et al. |
| 2015/0348551 A1 | 12/2015 | Gruber et al. |
| 2015/0355878 A1 | 12/2015 | Corbin |
| 2015/0363061 A1 | 12/2015 | De, III et al. |
| 2015/0363401 A1 | 12/2015 | Chen et al. |
| 2015/0370531 A1 | 12/2015 | Faaborg |
| 2015/0371657 A1 | 12/2015 | Gao |
| 2015/0371659 A1 | 12/2015 | Gao |
| 2015/0371664 A1 | 12/2015 | Bar-Or et al. |
| 2015/0380010 A1 | 12/2015 | Srinivasan et al. |
| 2015/0382047 A1 | 12/2015 | Van Os et al. |
| 2016/0007116 A1 | 1/2016 | Holman |
| 2016/0021458 A1 | 1/2016 | Johnson et al. |
| 2016/0026428 A1 | 1/2016 | Morganstern et al. |
| 2016/0029142 A1 | 1/2016 | Isaac et al. |
| 2016/0035321 A1 | 2/2016 | Cho et al. |
| 2016/0036962 A1 | 2/2016 | Rand et al. |
| 2016/0042748 A1 | 2/2016 | Jain et al. |
| 2016/0044151 A1 | 2/2016 | Shoemaker et al. |
| 2016/0050488 A1 | 2/2016 | Matheja et al. |
| 2016/0057522 A1 | 2/2016 | Choisel et al. |
| 2016/0072804 A1 | 3/2016 | Chien et al. |
| 2016/0077710 A1 | 3/2016 | Lewis et al. |
| 2016/0086609 A1 | 3/2016 | Yue et al. |
| 2016/0088392 A1 | 3/2016 | Huttunen et al. |
| 2016/0093304 A1 | 3/2016 | Kim et al. |
| 2016/0094718 A1 | 3/2016 | Mani et al. |
| 2016/0094917 A1 | 3/2016 | Wilk et al. |
| 2016/0098393 A1 | 4/2016 | Hebert |
| 2016/0098992 A1 | 4/2016 | Renard et al. |
| 2016/0103653 A1 | 4/2016 | Jang |
| 2016/0104480 A1 | 4/2016 | Sharifi |

(56) References Cited

U.S. PATENT DOCUMENTS

| | | |
|---|---|---|
| 2016/0111110 A1 | 4/2016 | Gautama et al. |
| 2016/0125876 A1 | 5/2016 | Schroeter et al. |
| 2016/0127780 A1 | 5/2016 | Roberts et al. |
| 2016/0133259 A1 | 5/2016 | Rubin et al. |
| 2016/0134966 A1 | 5/2016 | Fitzgerald et al. |
| 2016/0134982 A1 | 5/2016 | Iyer |
| 2016/0154089 A1 | 6/2016 | Altman |
| 2016/0155442 A1 | 6/2016 | Kannan et al. |
| 2016/0155443 A1 | 6/2016 | Khan et al. |
| 2016/0157035 A1 | 6/2016 | Russell et al. |
| 2016/0162469 A1 | 6/2016 | Santos |
| 2016/0171976 A1 | 6/2016 | Sun et al. |
| 2016/0173578 A1 | 6/2016 | Sharma et al. |
| 2016/0173983 A1 | 6/2016 | Berthelsen et al. |
| 2016/0180853 A1 | 6/2016 | Vanlund et al. |
| 2016/0189716 A1 | 6/2016 | Lindahl et al. |
| 2016/0196499 A1 | 7/2016 | Khan et al. |
| 2016/0203331 A1 | 7/2016 | Khan et al. |
| 2016/0210110 A1 | 7/2016 | Feldman |
| 2016/0212538 A1 | 7/2016 | Fullam et al. |
| 2016/0216938 A1 | 7/2016 | Millington |
| 2016/0225385 A1 | 8/2016 | Hammarqvist |
| 2016/0232451 A1 | 8/2016 | Scherzer |
| 2016/0234204 A1 | 8/2016 | Rishi et al. |
| 2016/0234615 A1 | 8/2016 | Lambourne |
| 2016/0239255 A1 | 8/2016 | Chavez et al. |
| 2016/0240192 A1 | 8/2016 | Raghuvir |
| 2016/0241976 A1 | 8/2016 | Pearson |
| 2016/0253050 A1 | 9/2016 | Mishra et al. |
| 2016/0260431 A1 | 9/2016 | Newendorp et al. |
| 2016/0283841 A1 | 9/2016 | Sainath et al. |
| 2016/0302018 A1 | 10/2016 | Russell et al. |
| 2016/0314782 A1 | 10/2016 | Klimanis |
| 2016/0316293 A1 | 10/2016 | Klimanis |
| 2016/0322045 A1 | 11/2016 | Hatfield et al. |
| 2016/0336519 A1 | 11/2016 | Seo et al. |
| 2016/0343866 A1 | 11/2016 | Koezuka et al. |
| 2016/0343949 A1 | 11/2016 | Seo et al. |
| 2016/0343954 A1 | 11/2016 | Seo et al. |
| 2016/0345114 A1 | 11/2016 | Hanna et al. |
| 2016/0352915 A1 | 12/2016 | Gautama |
| 2016/0353217 A1 | 12/2016 | Starobin et al. |
| 2016/0353218 A1 | 12/2016 | Starobin et al. |
| 2016/0357503 A1 | 12/2016 | Triplett et al. |
| 2016/0364206 A1 | 12/2016 | Keyser-Allen et al. |
| 2016/0366515 A1 | 12/2016 | Mendes et al. |
| 2016/0372688 A1 | 12/2016 | Seo et al. |
| 2016/0373269 A1 | 12/2016 | Okubo et al. |
| 2016/0373909 A1 | 12/2016 | Rasmussen et al. |
| 2016/0379634 A1 | 12/2016 | Yamamoto et al. |
| 2017/0003931 A1 | 1/2017 | Dvortsov et al. |
| 2017/0012207 A1 | 1/2017 | Seo et al. |
| 2017/0012232 A1 | 1/2017 | Kataishi et al. |
| 2017/0019732 A1 | 1/2017 | Mendes et al. |
| 2017/0025615 A1 | 1/2017 | Seo et al. |
| 2017/0025630 A1 | 1/2017 | Seo et al. |
| 2017/0026769 A1 | 1/2017 | Patel |
| 2017/0034263 A1 | 2/2017 | Archambault et al. |
| 2017/0039025 A1 | 2/2017 | Kielak |
| 2017/0040018 A1 | 2/2017 | Tormey |
| 2017/0041724 A1 | 2/2017 | Master et al. |
| 2017/0060526 A1 | 3/2017 | Barton et al. |
| 2017/0062734 A1 | 3/2017 | Suzuki et al. |
| 2017/0070478 A1 | 3/2017 | Park et al. |
| 2017/0076212 A1 | 3/2017 | Shams et al. |
| 2017/0076720 A1 | 3/2017 | Gopalan et al. |
| 2017/0078824 A1 | 3/2017 | Heo |
| 2017/0083285 A1 | 3/2017 | Meyers et al. |
| 2017/0084277 A1 | 3/2017 | Sharifi |
| 2017/0084292 A1 | 3/2017 | Yoo |
| 2017/0084295 A1 | 3/2017 | Tsiartas et al. |
| 2017/0090864 A1 | 3/2017 | Jorgovanovic |
| 2017/0092278 A1 | 3/2017 | Evermann et al. |
| 2017/0092297 A1 | 3/2017 | Sainath et al. |
| 2017/0092299 A1 | 3/2017 | Matsuo |
| 2017/0092889 A1 | 3/2017 | Seo et al. |
| 2017/0092890 A1 | 3/2017 | Seo et al. |
| 2017/0094215 A1 | 3/2017 | Western |
| 2017/0103754 A1 | 4/2017 | Higbie et al. |
| 2017/0103755 A1 | 4/2017 | Jeon et al. |
| 2017/0110124 A1 | 4/2017 | Boesen et al. |
| 2017/0110144 A1 | 4/2017 | Sharifi et al. |
| 2017/0117497 A1 | 4/2017 | Seo et al. |
| 2017/0123251 A1 | 5/2017 | Nakada et al. |
| 2017/0125037 A1 | 5/2017 | Shin |
| 2017/0125456 A1 | 5/2017 | Kasahara |
| 2017/0133007 A1 | 5/2017 | Drewes |
| 2017/0133011 A1 | 5/2017 | Chen et al. |
| 2017/0134872 A1 | 5/2017 | Silva et al. |
| 2017/0139720 A1 | 5/2017 | Stein |
| 2017/0140449 A1 | 5/2017 | Kannan |
| 2017/0140748 A1 | 5/2017 | Roberts et al. |
| 2017/0140759 A1 | 5/2017 | Kumar et al. |
| 2017/0177585 A1 | 6/2017 | Rodger et al. |
| 2017/0178662 A1 | 6/2017 | Ayrapetian et al. |
| 2017/0180561 A1 | 6/2017 | Kadiwala et al. |
| 2017/0188150 A1 | 6/2017 | Brunet et al. |
| 2017/0188437 A1 | 6/2017 | Banta |
| 2017/0193999 A1 | 7/2017 | Aleksic et al. |
| 2017/0206896 A1 | 7/2017 | Ko et al. |
| 2017/0206900 A1 | 7/2017 | Lee et al. |
| 2017/0214996 A1 | 7/2017 | Yeo |
| 2017/0236512 A1 | 8/2017 | Williams et al. |
| 2017/0236515 A1 | 8/2017 | Pinsky et al. |
| 2017/0242649 A1 | 8/2017 | Jarvis et al. |
| 2017/0242651 A1 | 8/2017 | Lang et al. |
| 2017/0242653 A1 | 8/2017 | Lang et al. |
| 2017/0242657 A1 | 8/2017 | Jarvis et al. |
| 2017/0243576 A1 | 8/2017 | Millington et al. |
| 2017/0243587 A1 | 8/2017 | Plagge et al. |
| 2017/0245076 A1 | 8/2017 | Kusano et al. |
| 2017/0255612 A1 | 9/2017 | Sari et al. |
| 2017/0257686 A1 | 9/2017 | Gautama et al. |
| 2017/0270919 A1 | 9/2017 | Parthasarathi et al. |
| 2017/0278512 A1 | 9/2017 | Pandya et al. |
| 2017/0287485 A1 | 10/2017 | Civelli et al. |
| 2017/0330565 A1 | 11/2017 | Daley et al. |
| 2017/0332168 A1 | 11/2017 | Moghimi et al. |
| 2017/0346872 A1 | 11/2017 | Naik et al. |
| 2017/0352357 A1 | 12/2017 | Fink |
| 2017/0353789 A1 | 12/2017 | Kim et al. |
| 2017/0357475 A1 | 12/2017 | Lee et al. |
| 2017/0357478 A1 | 12/2017 | Piersol et al. |
| 2017/0366393 A1 | 12/2017 | Shaker et al. |
| 2017/0374454 A1 | 12/2017 | Bernardini et al. |
| 2018/0018964 A1 | 1/2018 | Reilly et al. |
| 2018/0018967 A1 | 1/2018 | Lang et al. |
| 2018/0020306 A1 | 1/2018 | Sheen |
| 2018/0025733 A1 | 1/2018 | Qian et al. |
| 2018/0033428 A1 | 2/2018 | Kim et al. |
| 2018/0040324 A1 | 2/2018 | Wilberding |
| 2018/0047394 A1 | 2/2018 | Tian et al. |
| 2018/0053504 A1 | 2/2018 | Wang et al. |
| 2018/0054506 A1 | 2/2018 | Hart et al. |
| 2018/0061396 A1 | 3/2018 | Srinivasan et al. |
| 2018/0061402 A1 | 3/2018 | Devaraj et al. |
| 2018/0061404 A1 | 3/2018 | Devaraj et al. |
| 2018/0061419 A1 | 3/2018 | Melendo Casado et al. |
| 2018/0061420 A1 | 3/2018 | Patil et al. |
| 2018/0062871 A1 | 3/2018 | Jones et al. |
| 2018/0084367 A1 | 3/2018 | Greff et al. |
| 2018/0088900 A1 | 3/2018 | Glaser et al. |
| 2018/0091898 A1 | 3/2018 | Yoon et al. |
| 2018/0091913 A1 | 3/2018 | Hartung et al. |
| 2018/0096683 A1 | 4/2018 | James et al. |
| 2018/0096696 A1 | 4/2018 | Mixter |
| 2018/0107446 A1 | 4/2018 | Wilberding et al. |
| 2018/0108351 A1 | 4/2018 | Beckhardt et al. |
| 2018/0122372 A1 | 5/2018 | Wanderlust |
| 2018/0122378 A1 | 5/2018 | Mixter et al. |
| 2018/0130469 A1 | 5/2018 | Gruenstein et al. |
| 2018/0132217 A1 | 5/2018 | Stirling-Gallacher |
| 2018/0132298 A1 | 5/2018 | Birnam et al. |
| 2018/0137861 A1 | 5/2018 | Ogawa |

(56) References Cited

U.S. PATENT DOCUMENTS

| | | |
|---|---|---|
| 2018/0165055 A1 | 6/2018 | Yu et al. |
| 2018/0167981 A1 | 6/2018 | Jonna et al. |
| 2018/0174597 A1 | 6/2018 | Lee et al. |
| 2018/0182390 A1 | 6/2018 | Hughes et al. |
| 2018/0190285 A1 | 7/2018 | Heckman et al. |
| 2018/0197533 A1 | 7/2018 | Lyon et al. |
| 2018/0199146 A1 | 7/2018 | Sheen |
| 2018/0204569 A1 | 7/2018 | Nadkar et al. |
| 2018/0205963 A1 | 7/2018 | Matei et al. |
| 2018/0210698 A1 | 7/2018 | Park et al. |
| 2018/0218747 A1 | 8/2018 | Moghimi et al. |
| 2018/0219976 A1 | 8/2018 | Decenzo et al. |
| 2018/0225933 A1 | 8/2018 | Park et al. |
| 2018/0228006 A1 | 8/2018 | Baker et al. |
| 2018/0233136 A1 | 8/2018 | Torok et al. |
| 2018/0233137 A1 | 8/2018 | Torok et al. |
| 2018/0233139 A1 | 8/2018 | Finkelstein et al. |
| 2018/0234765 A1 | 8/2018 | Torok et al. |
| 2018/0262793 A1 | 9/2018 | Lau et al. |
| 2018/0262831 A1 | 9/2018 | Matheja et al. |
| 2018/0270565 A1 | 9/2018 | Ganeshkumar |
| 2018/0277107 A1 | 9/2018 | Kim |
| 2018/0277113 A1 | 9/2018 | Hartung et al. |
| 2018/0277119 A1 | 9/2018 | Baba et al. |
| 2018/0277133 A1 | 9/2018 | Deetz et al. |
| 2018/0293484 A1 | 10/2018 | Wang et al. |
| 2018/0308470 A1 | 10/2018 | Park et al. |
| 2018/0314552 A1 | 11/2018 | Kim et al. |
| 2018/0324756 A1 | 11/2018 | Ryu et al. |
| 2018/0335903 A1 | 11/2018 | Coffman et al. |
| 2018/0336274 A1 | 11/2018 | Choudhury et al. |
| 2018/0358009 A1 | 12/2018 | Daley et al. |
| 2018/0365567 A1 | 12/2018 | Kolavennu et al. |
| 2018/0367944 A1 | 12/2018 | Heo et al. |
| 2019/0012141 A1 | 1/2019 | Piersol et al. |
| 2019/0013019 A1 | 1/2019 | Lawrence |
| 2019/0014592 A1 | 1/2019 | Hampel et al. |
| 2019/0033446 A1 | 1/2019 | Bultan et al. |
| 2019/0042187 A1 | 2/2019 | Truong et al. |
| 2019/0043492 A1 | 2/2019 | Lang |
| 2019/0066672 A1 | 2/2019 | Wood et al. |
| 2019/0074025 A1 | 3/2019 | Lashkari et al. |
| 2019/0079724 A1 | 3/2019 | Feuz et al. |
| 2019/0081507 A1 | 3/2019 | Ide |
| 2019/0082255 A1 | 3/2019 | Tajiri et al. |
| 2019/0088261 A1 | 3/2019 | Lang et al. |
| 2019/0090056 A1 | 3/2019 | Rexach et al. |
| 2019/0098400 A1 | 3/2019 | Buoni et al. |
| 2019/0104119 A1 | 4/2019 | Giorgi et al. |
| 2019/0104373 A1 | 4/2019 | Wodrich et al. |
| 2019/0108839 A1 | 4/2019 | Reilly et al. |
| 2019/0115011 A1 | 4/2019 | Khellah et al. |
| 2019/0130906 A1 | 5/2019 | Kobayashi et al. |
| 2019/0163153 A1 | 5/2019 | Price et al. |
| 2019/0172452 A1 | 6/2019 | Smith et al. |
| 2019/0173687 A1 | 6/2019 | Mackay et al. |
| 2019/0179607 A1 | 6/2019 | Thangarathnam et al. |
| 2019/0179611 A1 | 6/2019 | Wojogbe et al. |
| 2019/0182072 A1 | 6/2019 | Roe et al. |
| 2019/0206412 A1 | 7/2019 | Li et al. |
| 2019/0220246 A1 | 7/2019 | Orr et al. |
| 2019/0237067 A1 | 8/2019 | Friedman et al. |
| 2019/0239008 A1 | 8/2019 | Lambourne |
| 2019/0239009 A1 | 8/2019 | Lambourne |
| 2019/0243603 A1 | 8/2019 | Keyser-Allen et al. |
| 2019/0243606 A1 | 8/2019 | Jayakumar et al. |
| 2019/0281397 A1 | 9/2019 | Lambourne |
| 2019/0287546 A1 | 9/2019 | Ganeshkumar |
| 2019/0295563 A1 | 9/2019 | Kamdar et al. |
| 2019/0297388 A1 | 9/2019 | Panchaksharaiah et al. |
| 2019/0304443 A1 | 10/2019 | Bhagwan |
| 2019/0311710 A1 | 10/2019 | Eraslan et al. |
| 2019/0311712 A1 | 10/2019 | Firik et al. |
| 2019/0311720 A1 | 10/2019 | Pasko |
| 2019/0317606 A1 | 10/2019 | Jain et al. |
| 2019/0342962 A1 | 11/2019 | Chang et al. |
| 2019/0364375 A1 | 11/2019 | Soto et al. |
| 2020/0007987 A1 | 1/2020 | Woo et al. |
| 2020/0034492 A1 | 1/2020 | Verbeke et al. |
| 2020/0051554 A1 | 2/2020 | Kim et al. |
| 2020/0092687 A1 | 3/2020 | Devaraj et al. |
| 2020/0105256 A1 | 4/2020 | Fainberg et al. |
| 2020/0175989 A1 | 6/2020 | Lockhart et al. |
| 2020/0184980 A1 | 6/2020 | Wilberding |
| 2020/0193973 A1 | 6/2020 | Tolomei et al. |
| 2020/0211556 A1 | 7/2020 | Mixter et al. |
| 2020/0213729 A1 | 7/2020 | Soto |
| 2020/0216089 A1 | 7/2020 | Garcia et al. |
| 2020/0336846 A1 | 10/2020 | Rohde et al. |
| 2020/0395006 A1 | 12/2020 | Smith et al. |
| 2020/0395010 A1 | 12/2020 | Smith et al. |
| 2020/0395013 A1 | 12/2020 | Smith et al. |
| 2020/0409652 A1 | 12/2020 | Wilberding et al. |
| 2021/0035561 A1 | 2/2021 | D'Amato et al. |
| 2021/0035572 A1 | 2/2021 | D'Amato et al. |
| 2021/0118429 A1 | 4/2021 | Shan |

FOREIGN PATENT DOCUMENTS

| | | |
|---|---|---|
| CN | 101310558 A | 11/2008 |
| CN | 101480039 A | 7/2009 |
| CN | 101661753 A | 3/2010 |
| CN | 101686282 A | 3/2010 |
| CN | 101907983 A | 12/2010 |
| CN | 102123188 A | 7/2011 |
| CN | 102256098 A | 11/2011 |
| CN | 102567468 A | 7/2012 |
| CN | 103052001 A | 4/2013 |
| CN | 103181192 A | 6/2013 |
| CN | 103210663 A | 7/2013 |
| CN | 103546616 A | 1/2014 |
| CN | 103811007 A | 5/2014 |
| CN | 104010251 A | 8/2014 |
| CN | 104035743 A | 9/2014 |
| CN | 104053088 A | 9/2014 |
| CN | 104092936 A | 10/2014 |
| CN | 104104769 A | 10/2014 |
| CN | 104538030 A | 4/2015 |
| CN | 104575504 A | 4/2015 |
| CN | 104635539 A | 5/2015 |
| CN | 104865550 A | 8/2015 |
| CN | 105187907 A | 12/2015 |
| CN | 105204357 A | 12/2015 |
| CN | 105206281 A | 12/2015 |
| CN | 105284076 A | 1/2016 |
| CN | 105493442 A | 4/2016 |
| CN | 106028223 A | 10/2016 |
| CN | 106375902 A | 2/2017 |
| CN | 106531165 A | 3/2017 |
| CN | 106708403 A | 5/2017 |
| CN | 107004410 A | 8/2017 |
| CN | 107919123 A | 4/2018 |
| EP | 1349146 A1 | 10/2003 |
| EP | 1389853 A1 | 2/2004 |
| EP | 2166737 A1 | 3/2010 |
| EP | 2683147 A1 | 1/2014 |
| EP | 3128767 A2 | 2/2017 |
| EP | 2351021 B1 | 9/2017 |
| EP | 3270377 A1 | 1/2018 |
| EP | 3285502 A1 | 2/2018 |
| JP | 2001236093 A | 8/2001 |
| JP | 2003223188 A | 8/2003 |
| JP | 2004347943 A | 12/2004 |
| JP | 2004354721 A | 12/2004 |
| JP | 2005242134 A | 9/2005 |
| JP | 2005250867 A | 9/2005 |
| JP | 2005284492 A | 10/2005 |
| JP | 2006092482 A | 4/2006 |
| JP | 2007013400 A | 1/2007 |
| JP | 2007142595 A | 6/2007 |
| JP | 2008079256 A | 4/2008 |
| JP | 2008158868 A | 7/2008 |
| JP | 2010141748 A | 6/2010 |
| JP | 2013037148 A | 2/2013 |

(56) References Cited

FOREIGN PATENT DOCUMENTS

| | | |
|---|---|---|
| JP | 2014071138 A | 4/2014 |
| JP | 2014137590 A | 7/2014 |
| JP | 2015161551 A | 9/2015 |
| JP | 2015527768 A | 9/2015 |
| JP | 2016095383 A | 5/2016 |
| JP | 2017072857 A | 4/2017 |
| KR | 20100036351 A | 4/2010 |
| KR | 100966415 B1 | 6/2010 |
| KR | 20100111071 A | 10/2010 |
| KR | 20130050987 A | 5/2013 |
| KR | 20140035310 A | 3/2014 |
| KR | 20140112900 A | 9/2014 |
| WO | 200153994 | 7/2001 |
| WO | 2003093950 A2 | 11/2003 |
| WO | 2008048599 A1 | 4/2008 |
| WO | 2012166386 A2 | 12/2012 |
| WO | 2013184792 A1 | 12/2013 |
| WO | 2014064531 A1 | 5/2014 |
| WO | 2014159581 A1 | 10/2014 |
| WO | 2015017303 A1 | 2/2015 |
| WO | 2015037396 A1 | 3/2015 |
| WO | 2015131024 A1 | 9/2015 |
| WO | 2015178950 A1 | 11/2015 |
| WO | 2016014142 A1 | 1/2016 |
| WO | 2016022926 A1 | 2/2016 |
| WO | 2016033364 A1 | 3/2016 |
| WO | 2016057268 A1 | 4/2016 |
| WO | 2016085775 A2 | 6/2016 |
| WO | 2016165067 A1 | 10/2016 |
| WO | 2016171956 A1 | 10/2016 |
| WO | 2016200593 A1 | 12/2016 |
| WO | 2017039632 A1 | 3/2017 |
| WO | 2017058654 A1 | 4/2017 |
| WO | 2017138934 A1 | 8/2017 |
| WO | 2017147075 A1 | 8/2017 |
| WO | 2017147936 A1 | 9/2017 |
| WO | 2018027142 A1 | 2/2018 |
| WO | 2018067404 A1 | 4/2018 |

OTHER PUBLICATIONS

Notice of Allowance dated Dec. 15, 2017, issued in connection with U.S. Appl. No. 15/223,218, filed Jul. 29, 2016, 7 pages.
Notice of Allowance dated Jan. 15, 2020, issued in connection with U.S. Appl. No. 16/439,009, filed Jun. 12, 2019, 9 pages.
Notice of Allowance dated Mar. 15, 2019, issued in connection with U.S. Appl. No. 15/804,776, filed Nov. 6, 2017, 9 pages.
Notice of Allowance dated Oct. 15, 2019, issued in connection with U.S. Appl. No. 16/437,437, filed Jun. 11, 2019, 9 pages.
Notice of Allowance dated Oct. 15, 2020, issued in connection with U.S. Appl. No. 16/715,713, filed Dec. 16, 2019, 9 pages.
Notice of Allowance dated Aug. 16, 2017, issued in connection with U.S. Appl. No. 15/098,892, filed Apr. 14, 2016, 9 pages.
Notice of Allowance dated Aug. 17, 2017, issued in connection with U.S. Appl. No. 15/131,244, filed Apr. 18, 2016, 9 pages.
Notice of Allowance dated Jul. 17, 2019, issued in connection with U.S. Appl. No. 15/718,911, filed Sep. 28, 2017, 5 pages.
Notice of Allowance dated Jun. 17, 2020, issued in connection with U.S. Appl. No. 16/141,875, filed Sep. 25, 2018, 6 pages.
Notice of Allowance dated Sep. 17, 2018, issued in connection with U.S. Appl. No. 15/211,689, filed Jul. 15, 2016, 6 pages.
Notice of Allowance dated Apr. 18, 2019, issued in connection with U.S. Appl. No. 16/173,797, filed Oct. 29, 2018, 9 pages.
Notice of Allowance dated Dec. 18, 2019, issued in connection with U.S. Appl. No. 16/434,426, filed Jun. 7, 2019, 13 pages.
Notice of Allowance dated Feb. 18, 2020, issued in connection with U.S. Appl. No. 16/022,662, filed Jun. 28, 2018, 8 pages.
Notice of Allowance dated Jul. 18, 2019, issued in connection with U.S. Appl. No. 15/438,749, filed Feb. 21, 2017, 9 pages.
Notice of Allowance dated Jul. 18, 2019, issued in connection with U.S. Appl. No. 15/721,141, filed Sep. 29, 2017, 8 pages.
Notice of Allowance dated Aug. 19, 2020, issued in connection with U.S. Appl. No. 16/271,560, filed Feb. 8, 2019, 9 pages.
Notice of Allowance dated Dec. 19, 2018, issued in connection with U.S. Appl. No. 15/818,051, filed Nov. 20, 2017, 9 pages.
Notice of Allowance dated Jul. 19, 2018, issued in connection with U.S. Appl. No. 15/681,937, filed Aug. 21, 2017, 7 pages.
Notice of Allowance dated Aug. 2, 2019, issued in connection with U.S. Appl. No. 16/102,650, filed Aug. 13, 2018, 5 pages.
Notice of Allowance dated Dec. 2, 2020, issued in connection with U.S. Appl. No. 15/989,715, filed May 25, 2018, 11 pages.
Notice of Allowance dated Sep. 2, 2020, issued in connection with U.S. Appl. No. 16/214,711, filed Dec. 10, 2018, 9 pages.
Notice of Allowance dated Jul. 20, 2020, issued in connection with U.S. Appl. No. 15/984,073, filed May 18, 2018, 12 pages.
Notice of Allowance dated Mar. 20, 2018, issued in connection with U.S. Appl. No. 15/784,952, filed Oct. 16, 2017, 7 pages.
Notice of Allowance dated Sep. 20, 2018, issued in connection with U.S. Appl. No. 15/946,599, filed Apr. 5, 2018, 7 pages.
Notice of Allowance dated Feb. 21, 2020, issued in connection with U.S. Appl. No. 16/416,752, filed May 20, 2019, 6 pages.
Notice of Allowance dated Jan. 21, 2020, issued in connection with U.S. Appl. No. 16/672,764, filed Nov. 4, 2019, 10 pages.
Notice of Allowance dated Oct. 21, 2019, issued in connection with U.S. Appl. No. 15/946,585, filed Apr. 5, 2018, 5 pages.
Notice of Allowance dated Aug. 22, 2017, issued in connection with U.S. Appl. No. 15/273,679, filed Sep. 22, 2016, 5 pages.
Notice of Allowance dated Jan. 22, 2018, issued in connection with U.S. Appl. No. 15/178,180, filed Jun. 9, 2016, 9 pages.
Notice of Allowance dated Jul. 22, 2020, issued in connection with U.S. Appl. No. 16/131,409, filed Sep. 14, 2018, 13 pages.
Notice of Allowance dated Jul. 22, 2020, issued in connection with U.S. Appl. No. 16/790,621, filed Feb. 13, 2020, 10 pages.
Notice of Allowance dated Apr. 24, 2019, issued in connection with U.S. Appl. No. 16/154,469, filed Oct. 3, 2018, 5 pages.
Notice of Allowance dated Aug. 26, 2020, issued in connection with U.S. Appl. No. 15/948,541, filed Apr. 9, 2018, 9 pages.
Notice of Allowance dated Apr. 27, 2020, issued in connection with U.S. Appl. No. 16/700,607, filed Dec. 2, 2019, 10 pages.
Notice of Allowance dated Mar. 27, 2019, issued in connection with U.S. Appl. No. 16/214,666, filed Dec. 10, 2018, 6 pages.
Notice of Allowance dated Mar. 28, 2018, issued in connection with U.S. Appl. No. 15/699,982, filed Sep. 8, 2017, 17 pages.
Notice of Allowance dated Dec. 29, 2017, issued in connection with U.S. Appl. No. 15/131,776, filed Apr. 18, 2016, 13 pages.
Notice of Allowance dated Jun. 29, 2020, issued in connection with U.S. Appl. No. 16/216,357, filed Dec. 11, 2018, 8 pages.
Notice of Allowance dated May 29, 2020, issued in connection with U.S. Appl. No. 16/148,879, filed Oct. 1, 2018, 6 pages.
Notice of Allowance dated Apr. 3, 2019, issued in connection with U.S. Appl. No. 16/160,107, filed Oct. 15, 2018, 7 pages.
Notice of Allowance dated Jul. 30, 2018, issued in connection with U.S. Appl. No. 15/098,718, filed Apr. 14, 2016, 5 pages.
Notice of Allowance dated Jul. 30, 2019, issued in connection with U.S. Appl. No. 15/131,254, filed Apr. 18, 2016, 9 pages.
Notice of Allowance dated Mar. 30, 2020, issued in connection with U.S. Appl. No. 15/973,413, filed May 7, 2018, 5 pages.
Notice of Allowance dated Nov. 30, 2018, issued in connection with U.S. Appl. No. 15/438,725, filed Feb. 21, 2017, 5 pages.
Notice of Allowance dated Oct. 30, 2019, issued in connection with U.S. Appl. No. 16/131,392, filed Sep. 14, 2018, 9 pages.
Notice of Allowance dated Oct. 30, 2020, issued in connection with U.S. Appl. No. 16/528,016, filed Jul. 31, 2019, 10 pages.
Notice of Allowance dated May 31, 2019, issued in connection with U.S. Appl. No. 15/717,621, filed Sep. 27, 2017, 9 pages.
Notice of Allowance dated Mar. 4, 2020, issued in connection with U.S. Appl. No. 16/444,975, filed Jun. 18, 2019, 10 pages.
Notice of Allowance dated Feb. 5, 2020, issued in connection with U.S. Appl. No. 16/178,122, filed Nov. 1, 2018, 9 pages.
Notice of Allowance dated Oct. 5, 2018, issued in connection with U.S. Appl. No. 15/211,748, filed Jul. 15, 2018, 10 pages.
Advisory Action dated Apr. 23, 2021, issued in connection with U.S. Appl. No. 16/219,702, filed Dec. 13, 2018, 3 pages.

(56) References Cited

OTHER PUBLICATIONS

Anonymous: "What are the function of 4 Microphones on iPhone 6S/6S+?", ETrade Supply, Dec. 24, 2015, XP055646381, Retrieved from the Internet: URL:https://www.etradesupply.com/blog/4-microphones-iphone-6s6s-for/ [retrieved on Nov. 26, 2019].
Australian Patent Office, Australian Examination Report Action dated Apr. 7, 2021, issued in connection with Australian Application No. 2019333058, 2 pages.
Australian Patent Office, Examination Report dated Jun. 28, 2021, issued in connection with Australian Patent Application No. 2019395022, 2 pages.
Canadian Patent Office, Canadian Examination Report dated Mar. 9, 2021, issued in connection with Canadian Application No. 3067776, 5 pages.
Chinese Patent Office, Chinese Office Action and Translation dated Jul. 2, 2021, issued in connection with Chinese Application No. 201880077216.4, 22 pages.
Chinese Patent Office, Chinese Office Action and Translation dated Mar. 30, 2021, issued in connection with Chinese Application No. 202010302650.7, 15 pages.
Chinese Patent Office, First Office Action and Translation dated May 27, 2021, issued in connection with Chinese Application No. 201880026360.5, 15 pages.
Chinese Patent Office, First Office Action and Translation dated Dec. 28, 2020, issued in connection with Chinese Application No. 201880072203.8, 11 pages.
European Patent Office, European EPC Article 94.3 dated Feb. 23, 2021, issued in connection with European Application No. 17200837.7, 8 pages.
European Patent Office, European EPC Article 94.3 dated Feb. 26, 2021, issued in connection with European Application No. 18789515.6, 8 pages.
European Patent Office, European Extended Search Report dated Nov. 25, 2020, issued in connection with European Application No. 20185599.6, 9 pages.
European Patent Office, European Office Action dated Jan. 21, 2021, issued in connection with European Application No. 17792272.1, 7 pages.
Final Office Action dated Feb. 10, 2021, issued in connection with U.S. Appl. No. 16/219,702, filed Dec. 13, 2018, 9 pages.
Final Office Action dated Feb. 10, 2021, issued in connection with U.S. Appl. No. 16/402,617, filed May 3, 2019, 13 pages.
Final Office Action dated Jul. 15, 2021, issued in connection with U.S. Appl. No. 16/153,530, filed Oct. 5, 2018, 22 pages.
Final Office Action dated Jun. 15, 2021, issued in connection with U.S. Appl. No. 16/819,755, filed Mar. 16, 2020, 12 pages.
Final Office Action dated Feb. 22, 2021, issued in connection with U.S. Appl. No. 15/936,177, filed Mar. 26, 2018, 20 pages.
Final Office Action dated Feb. 22, 2021, issued in connection with U.S. Appl. No. 16/213,570, filed Dec. 7, 2018, 12 pages.
Final Office Action dated Jun. 4, 2021, issued in connection with U.S. Appl. No. 16/168,389, filed Oct. 23, 2018, 38 pages.
Final Office Action dated Jun. 8, 2021, issued in connection with U.S. Appl. No. 16/271,550, filed Feb. 8, 2019, 41 pages.
First Action Interview Office Action dated Mar. 8, 2021, issued in connection with U.S. Appl. No. 16/798,967, filed Feb. 24, 2020, 4 pages.
Hans Speidel: "Chatbot Training: How to use training data to provide fully automated customer support", Jun. 29, 2017, pp. 1-3, XP055473185, Retrieved from the Internet: URL:https://www.crowdguru.de/wp-content/uploads/Case-Study-Chatbot-training-How-to-use-training-data-to-provide-fully-automated-customer-support.pdf [retrieved on May 7, 2018].
Indian Patent Office, Examination Report dated May 24, 2021, issued in connection with Indian Patent Application No. 201847035595, 6 pages.
Indian Patent Office, Examination Report dated Feb. 25, 2021, issued in connection with Indian Patent Application No. 201847035625, 6 pages.

International Bureau, International Preliminary Report on Patentability and Written Opinion, dated Apr. 1, 2021, issued in connection with International Application No. PCT/US2019/052129, filed on Sep. 20, 2019, 13 pages.
International Bureau, International Preliminary Report on Patentability and Written Opinion, dated Jul. 1, 2021, issued in connection with International Application No. PCT/US2019/067576, filed on Dec. 19, 2019, 8 pages.
International Bureau, International Preliminary Report on Patentability and Written Opinion, dated Dec. 10, 2020, issued in connection with International Application No. PCT/US2019/033945, filed on May 25, 2018, 7 pages.
International Bureau, International Preliminary Report on Patentability and Written Opinion, dated Apr. 15, 2021, issued in connection with International Application No. PCT/US2019/054332, filed on Oct. 2, 2019, 9 pages.
International Bureau, International Preliminary Report on Patentability and Written Opinion, dated Mar. 25, 2021, issued in connection with International Application No. PCT/US2019/050852, filed on Sep. 12, 2019, 8 pages.
International Bureau, International Preliminary Report on Patentability and Written Opinion, dated Aug. 27, 2019, issued in connection with International Application No. PCT/US2018/019010, filed on Feb. 21, 2018, 9 pages.
International Bureau, International Preliminary Report on Patentability and Written Opinion, dated Jan. 7, 2021, issued in connection with International Application No. PCT/US2019/039828, filed on Jun. 28, 2019, 11 pages.
International Bureau, International Preliminary Report on Patentability and Written Opinion, dated Apr. 8, 2021, issued in connection with International Application No. PCT/US2019/052654, filed on Sep. 24, 2019, 7 pages.
International Bureau, International Preliminary Report on Patentability and Written Opinion, dated Apr. 8, 2021, issued in connection with International Application No. PCT/US2019/052841, filed on Sep. 25, 2019, 8 pages.
International Bureau, International Preliminary Report on Patentability and Written Opinion, dated Apr. 8, 2021, issued in connection with International Application No. PCT/US2019/053253, filed on Sep. 26, 2019, 10 pages.
International Bureau, International Preliminary Report on Patentability, dated Jun. 17, 2021, issued in connection with International Application No. PCT/US2019/064907, filed on Dec. 6, 2019, 8 pages.
International Bureau, International Preliminary Report on Patentability, dated Mar. 2, 2021, issued in connection with International Application No. PCT/US2019/048558, filed on Aug. 28, 2019, 8 pages.
International Bureau, International Search Report and Written Opinion dated Dec. 11, 2019, issued in connection with International Application No. PCT/US2019/052129, filed on Sep. 20, 2019, 18 pages.
International Bureau, International Search Report and Written Opinion dated Nov. 13, 2018, issued in connection with International Application No. PCT/US2018/045397, filed on Aug. 6, 2018, 11 pages.
International Bureau, International Search Report and Written Opinion dated Jan. 14, 2019, issued in connection with International Application No. PCT/US2018053472, filed on Sep. 28, 2018, 10 pages.
International Bureau, International Search Report and Written Opinion dated Jul. 17, 2019, issued in connection with International Application No. PCT/US2019/032934, filed on May 17, 2019, 17 pages.
International Bureau, International Search Report and Written Opinion dated Nov. 18, 2019, issued in connection with International Application No. PCT/US2019/048558, filed on Aug. 28, 2019, 11 pages.
International Bureau, International Search Report and Written Opinion dated Apr. 23, 2021, issued in connection with International Application No. PCT/US2021/070007, filed on Jan. 6, 2021, 11 pages.

(56) References Cited

OTHER PUBLICATIONS

International Bureau, International Search Report and Written Opinion dated Jul. 24, 2018, issued in connection with International Application No. PCT/US2018/019010, filed on Feb. 21, 2018, 12 pages.
International Bureau, International Search Report and Written Opinion, dated Feb. 27, 2019, issued in connection with International Application No. PCT/US2018/053123, filed on Sep. 27, 2018, 16 pages.
International Bureau, International Search Report and Written Opinion dated Sep. 27, 2019, issued in connection with International Application No. PCT/US2019/039828, filed on Jun. 28, 2019, 13 pages.
International Bureau, International Search Report and Written Opinion dated Nov. 29, 2019, issued in connection with International Application No. PCT/US2019/053523, filed on Sep. 29, 2019, 14 pages.
International Bureau, International Search Report and Written Opinion dated Sep. 4, 2019, issued in connection with International Application No. PCT/US2019/033945, filed on May 24, 2019, 8 pages.
Japanese Patent Office, Decision of Refusal and Translation dated Jun. 8, 2021, issued in connection with Japanese Patent Application No. 2019-073348, 5 pages.
Japanese Patent Office, English Translation of Office Action dated Nov. 17, 2020, issued in connection with Japanese Application No. 2019-145039, 5 pages.
Non-Final Office Action dated Mar. 27, 2020, issued in connection with U.S. Appl. No. 16/790,621, filed Feb. 13, 2020, 8 pages.
Non-Final Office Action dated May 27, 2020, issued in connection with U.S. Appl. No. 16/715,713, filed Dec. 16, 2019, 14 pages.
Non-Final Office Action dated Oct. 27, 2020, issued in connection with U.S. Appl. No. 16/213,570, filed Dec. 7, 2018, 13 pages.
Non-Final Office Action dated Oct. 27, 2020, issued in connection with U.S. Appl. No. 16/715,984, filed Dec. 16, 2019, 14 pages.
Non-Final Office Action dated Oct. 27, 2020, issued in connection with U.S. Appl. No. 16/819,755, filed Mar. 16, 2020, 8 pages.
Non-Final Office Action dated Oct. 28, 2019, issued in connection with U.S. Appl. No. 16/145,275, filed Sep. 28, 2018, 11 pages.
Non-Final Office Action dated Mar. 29, 2019, issued in connection with U.S. Appl. No. 16/102,650, filed Aug. 13, 2018, 11 pages.
Non-Final Office Action dated Sep. 29, 2020, issued in connection with U.S. Appl. No. 16/402,617, filed May 3, 2019, 12 pages.
Non-Final Office Action dated Dec. 3, 2020, issued in connection with U.S. Appl. No. 16/145,275, filed Sep. 28, 2018, 11 pages.
Non-Final Office Action dated Jul. 3, 2019, issued in connection with U.S. Appl. No. 15/948,541, filed Apr. 9, 2018, 7 pages.
Non-Final Office Action dated May 3, 2019, issued in connection with U.S. Appl. No. 16/178,122, filed Nov. 1, 2018, 14 pages.
Non-Final Office Action dated Oct. 3, 2018, issued in connection with U.S. Appl. No. 16/102,153, filed Aug. 13, 2018, 20 pages.
Non-Final Office Action dated Apr. 30, 2019, issued in connection with U.S. Appl. No. 15/718,521, filed Sep. 28, 2017, 39 pages.
Non-Final Office Action dated Jun. 30, 2017, issued in connection with U.S. Appl. No. 15/277,810, filed Sep. 27, 2016, 13 pages.
Non-Final Office Action dated Apr. 4, 2019, issued in connection with U.S. Appl. No. 15/718,911, filed Sep. 28, 2017, 21 pages.
Non-Final Office Action dated Aug. 4, 2020, issued in connection with U.S. Appl. No. 16/600,644, filed Oct. 14, 2019, 30 pages.
Non-Final Office Action dated Jan. 4, 2019, issued in connection with U.S. Appl. No. 15/948,541, filed Apr. 9, 2018, 6 pages.
Non-Final Office Action dated Apr. 6, 2020, issued in connection with U.S. Appl. No. 16/424,825, filed May 29, 2019, 22 pages.
Non-Final Office Action dated Feb. 6, 2018, issued in connection with U.S. Appl. No. 15/211,689, filed Jul. 15, 2016, 32 pages.
Non-Final Office Action dated Feb. 6, 2018, issued in connection with U.S. Appl. No. 15/237,133, filed Aug. 15, 2016, 6 pages.
Non-Final Office Action dated Mar. 6, 2020, issued in connection with U.S. Appl. No. 16/141,875, filed Sep. 25, 2018, 8 pages.
Non-Final Office Action dated Sep. 6, 2017, issued in connection with U.S. Appl. No. 15/131,254, filed Apr. 18, 2016, 13 pages.
Non-Final Office Action dated Sep. 6, 2018, issued in connection with U.S. Appl. No. 15/098,760, filed Apr. 14, 2016, 29 pages.
Non-Final Office Action dated Sep. 8, 2020, issued in connection with U.S. Appl. No. 15/936,177, filed Mar. 26, 2018, 19 pages.
Non-Final Office Action dated Apr. 9, 2018, issued in connection with U.S. Appl. No. 15/804,776, filed Nov. 6, 2017, 18 pages.
Non-Final Office Action dated May 9, 2018, issued in connection with U.S. Appl. No. 15/818,051, filed Nov. 20, 2017, 22 pages.
Non-Final Office Action dated Sep. 9, 2020, issued in connection with U.S. Appl. No. 16/168,389, filed Oct. 23, 2018, 29 pages.
Notice of Allowance dated Dec. 2, 2019, issued in connection with U.S. Appl. No. 15/718,521, filed Sep. 28, 2017, 15 pages.
Notice of Allowance dated Dec. 4, 2017, issued in connection with U.S. Appl. No. 15/277,810, filed Sep. 27, 2016, 5 pages.
Notice of Allowance dated Jul. 5, 2018, issued in connection with U.S. Appl. No. 15/237,133, filed Aug. 15, 2016, 5 pages.
Notice of Allowance dated Jul. 9, 2018, issued in connection with U.S. Appl. No. 15/438,741, filed Feb. 21, 2017, 5 pages.
Notice of Allowance dated Apr. 1, 2019, issued in connection with U.S. Appl. No. 15/935,966, filed Mar. 26, 2018, 5 pages.
Notice of Allowance dated Aug. 1, 2018, issued in connection with U.S. Appl. No. 15/297,627, filed Oct. 19, 2016, 9 pages.
Notice of Allowance dated Aug. 10, 2020, issued in connection with U.S. Appl. No. 16/424,825, filed May 29, 2019, 9 pages.
Notice of Allowance dated Apr. 11, 2018, issued in connection with U.S. Appl. No. 15/719,454, filed Sep. 28, 2017, 15 pages.
Notice of Allowance dated Oct. 11, 2019, issued in connection with U.S. Appl. No. 16/437,476, filed Jun. 11, 2019, 9 pages.
Notice of Allowance dated Sep. 11, 2019, issued in connection with U.S. Appl. No. 16/154,071, filed Oct. 8, 2018, 5 pages.
Notice of Allowance dated Dec. 12, 2018, issued in connection with U.S. Appl. No. 15/811,468, filed Nov. 13, 2017, 9 pages.
Notice of Allowance dated Jul. 12, 2017, issued in connection with U.S. Appl. No. 15/098,805, filed Apr. 14, 2016, 8 pages.
Notice of Allowance dated Jun. 12, 2019, issued in connection with U.S. Appl. No. 15/670,361, filed Aug. 7, 2017, 7 pages.
Notice of Allowance dated Sep. 12, 2018, issued in connection with U.S. Appl. No. 15/438,744, filed Feb. 21, 2017, 15 pages.
Notice of Allowance dated Dec. 13, 2017, issued in connection with U.S. Appl. No. 15/784,952, filed Oct. 16, 2017, 9 pages.
Notice of Allowance dated Feb. 13, 2019, issued in connection with U.S. Appl. No. 15/959,907, filed Apr. 23, 2018, 10 pages.
Notice of Allowance dated Jan. 13, 2020, issued in connection with U.S. Appl. No. 16/192,126, filed Nov. 15, 2018, 6 pages.
Notice of Allowance dated Nov. 13, 2020, issued in connection with U.S. Appl. No. 16/131,409, filed Sep. 14, 2018, 11 pages.
Notice of Allowance dated Aug. 14, 2017, issued in connection with U.S. Appl. No. 15/098,867, filed Apr. 14, 2016, 10 pages.
Notice of Allowance dated Aug. 14, 2020, issued in connection with U.S. Appl. No. 16/598,125, filed Oct. 10, 2019, 5 pages.
Notice of Allowance dated Feb. 14, 2017, issued in connection with U.S. Appl. No. 15/229,855, filed Aug. 5, 2016, 11 pages.
Notice of Allowance dated Jun. 14, 2017, issued in connection with U.S. Appl. No. 15/282,554, filed Sep. 30, 2016, 11 pages.
Notice of Allowance dated Nov. 14, 2018, issued in connection with U.S. Appl. No. 15/297,627, filed Oct. 19, 2016, 5 pages.
Final Office Action dated Apr. 11, 2019, issued in connection with U.S. Appl. No. 15/131,254, filed Apr. 18, 2016, 17 pages.
Final Office Action dated Aug. 11, 2017, issued in connection with U.S. Patent Application No. 15/131,776, filed Apr. 18, 2016, 7 pages.
Final Office Action dated Dec. 11, 2019, issued in connection with U.S. Appl. No. 16/227,308, filed Dec. 20, 2018, 10 pages.
Final Office Action dated Sep. 11, 2019, issued in connection with U.S. Appl. No. 16/178,122, filed Nov. 1, 2018, 13 pages.
Final Office Action dated Apr. 13, 2018, issued in connection with U.S. Appl. No. 15/131,254, filed Apr. 18, 2016, 18 pages.
Final Office Action dated Apr. 13, 2018, issued in connection with U.S. Appl. No. 15/438,744, filed Feb. 21, 2017, 20 pages.
Final Office Action dated May 13, 2020, issued in connection with U.S. Appl. No. 16/153,530, filed Oct. 5, 2018, 20 pages.

(56) References Cited

OTHER PUBLICATIONS

Final Office Action dated Jun. 15, 2017, issued in connection with U.S. Appl. No. 15/098,718, filed Apr. 14, 2016, 15 pages.
Final Office Action dated Oct. 15, 2018, issued in connection with U.S. Appl. No. 15/804,776, filed Nov. 6, 2017, 18 pages.
Final Office Action dated Oct. 15, 2020, issued in connection with U.S. Appl. No. 16/109,375, filed Aug. 22, 2018, 9 pages.
Final Office Action dated Oct. 16, 2018, issued in connection with U.S. Appl. No. 15/438,725, filed Feb. 21, 2017, 10 pages.
Final Office Action dated May 18, 2020, issued in connection with U.S. Appl. No. 16/177,185, filed Oct. 31, 2018, 16 pages.
Final Office Action dated Feb. 21, 2018, issued in connection with U.S. Appl. No. 15/297,627, filed Oct. 19, 2016, 12 pages.
Final Office Action dated May 21, 2020, issued in connection with U.S. Appl. No. 15/989,715, filed May 25, 2018, 21 pages.
Final Office Action dated Jun. 22, 2020, issued in connection with U.S. Appl. No. 16/179,779, filed Nov. 2, 2018, 16 pages.
Final Office Action dated Mar. 23, 2020, issued in connection with U.S. Appl. No. 16/145,275, filed Sep. 28, 2018, 11 pages.
Final Office Action dated Feb. 24, 2020, issued in connection with U.S. Appl. No. 15/936,177, filed Mar. 26, 2018, 20 pages.
Final Office Action dated Apr. 26, 2019, issued in connection with U.S. Appl. No. 15/721,141, filed Sep. 29, 2017, 20 pages.
Final Office Action dated Apr. 30, 2019, issued in connection with U.S. Appl. No. 15/098,760, filed Apr. 14, 2016, 6 pages.
Final Office Action dated Feb. 5, 2019, issued in connection with U.S. Appl. No. 15/438,749, filed Feb. 21, 2017, 17 pages.
Final Office Action dated Feb. 7, 2020, issued in connection with U.S. Appl. No. 15/948,541, filed Apr. 9, 2018, 8 pages.
Final Office Action dated Sep. 8, 2020, issued in connection with U.S. Appl. No. 16/213,570, filed Dec. 7, 2018, 12 pages.
Fiorenza Arisio et al. "Deliverable 1.1 User Study, analysis of requirements and definition of the application task," May 31, 2012, http://dirha.fbk.eu/sites/dirha.fbk.eu/files/docs/DIRHA_D1.1., 31 pages.
First Action Interview Office Action dated Aug. 14, 2019, issued in connection with U.S. Appl. No. 16/227,308, filed Dec. 20, 2018, 4 pages.
First Action Interview Office Action dated Jun. 15, 2020, issued in connection with U.S. Appl. No. 16/213,570, filed Dec. 7, 2018, 4 pages.
First Action Interview Office Action dated Jun. 2, 2020, issued in connection with U.S. Appl. No. 16/109,375, filed Aug. 22, 2018, 10 pages.
First Action Interview Office Action dated Jan. 22, 2020, issued in connection with U.S. Appl. No. 15/989,715, filed May 25, 2018, 3 pages.
First Action Interview Office Action dated Jul. 5, 2019, issued in connection with U.S. Appl. No. 16/227,308, filed Dec. 20, 2018, 4 pages.
Freiberger, Kari, "Development and Evaluation of Source Localization Algorithms for Coincident Microphone Arrays," Diploma Thesis, Apr. 1, 2010, 106 pages.
Giacobello et al. "A Sparse Nonuniformly Partitioned Multidelay Filter for Acoustic Echo Cancellation," 2013, IEEE Workshop on Applications of Signal Processing to Audio and Acoustics, Oct. 2013, New Paltz, NY, 4 pages.
Giacobello et al. "Tuning Methodology for Speech Enhancement Algorithms using a Simulated Conversational Database and Perceptual Objective Measures," 2014, 4th Joint Workshop on Hands-free Speech Communication and Microphone Arrays HSCMA, 2014, 5 pages.
Han et al. "Deep Compression: Compressing Deep Neural Networks with Pruning, Trained Quantization and Huffman Coding." ICLR 2016, Feb. 15, 2016, 14 pages.
Helwani et al. "Source-domain adaptive filtering for MIMO systems with application to acoustic echo cancellation", Acoustics Speech and Signal Processing, 2010 IEEE International Conference, Mar. 14, 2010, 4 pages.
Hirano et al. "A Noise-Robust Stochastic Gradient Algorithm with an Adaptive Step-Size Suitable for Mobile Hands-Free Telephones," 1995, International Conference on Acoustics, Speech, and Signal Processing, vol. 2, 4 pages.
International Bureau, International Preliminary Report on Patentability, dated Apr. 11, 2019, issued in connection with International Application No. PCT/US2017/054063, filed on Sep. 28, 2017, 9 pages.
International Bureau, International Preliminary Report on Patentability, dated Feb. 20, 2020, issued in connection with International Application No. PCT/US2018/045397, filed on Aug. 6, 2018, 8 pages.
International Bureau, International Preliminary Report on Patentability, dated Apr. 23, 2019, issued in connection with International Application No. PCT/US2017/057220, filed on Oct. 18, 2017, 7 pages.
International Bureau, International Preliminary Report on Patentability, dated Mar. 31, 2020, issued in connection with International Application No. PCT/U.S. Pat. No. 2018053123, filed on Sep. 27, 2018, 12 pages.
International Bureau, International Preliminary Report on Patentability, dated Mar. 31, 2020, issued in connection with International Application No. PCT/US2018053472, filed on Sep. 28, 2018, 8 pages.
International Bureau, International Preliminary Report on Patentability, dated Mar. 31, 2020, issued in connection with International Application No. PCT/US2018053517, filed on Sep. 28, 2018, 10 pages.
International Bureau, International Preliminary Report on Patentability, dated Sep. 7, 2018, issued in connection with International Application No. PCT/US2017/018728, filed on Feb. 21, 2017, 8 pages.
International Bureau, International Preliminary Report on Patentability, dated Sep. 7, 2018, issued in connection with International Application No. PCT/US2017/018739, filed on Feb. 21, 2017, 7 pages.
International Bureau, International Search Report and Written Opinion dated Nov. 10, 2020, issued in connection with International Application No. PCT/US2020/044250, filed on Jul. 30, 2020, 15 pages.
International Bureau, International Search Report and Written Opinion dated Jul. 14, 2020, issued in connection with International Application No. PCT/US2020/017150, filed on Feb. 7, 2020, 27 pages.
International Bureau, International Search Report and Written Opinion dated Nov. 18, 2019, issued in connection with International Application No. PCT/US2019052841, filed on Sep. 25, 2019, 12 pages.
International Bureau, International Search Report and Written Opinion dated Mar. 2, 2020, issued in connection with International Application No. PCT/US2019064907, filed on Dec. 6, 2019, 11 pages.
International Bureau, International Search Report and Written Opinion dated Dec. 20, 2019, issued in connection with International Application No. PCT/US2019052654, filed on Sep. 24, 2019, 11 pages.
International Bureau, International Search Report and Written Opinion dated Sep. 21, 2020, issued in connection with International Application No. PCT/US2020/037229, filed on Jun. 11, 2020, 17 pages.
International Bureau, International Search Report and Written Opinion dated Dec. 6, 2019, issued in connection with International Application No. PCT/US2019050852, filed on Sep. 12, 2019, 10 pages.
International Bureau, International Search Report and Written Opinion dated Apr. 8, 2020, issued in connection with International Application No. PCT/US2019/067576, filed on Dec. 19, 2019, 12 pages.
Japanese Patent Office, Notice of Reasons for Refusal and Translation dated Jun. 22, 2021, issued in connection with Japanese Patent Application No. 2020-517935, 4 pages.

(56) References Cited

OTHER PUBLICATIONS

Japanese Patent Office, Office Action and Translation dated Mar. 16, 2021, issued in connection with Japanese Patent Application No. 2020-506725, 7 pages.
Japanese Patent Office, Office Action and Translation dated Apr. 20, 2021, issued in connection with Japanese Patent Application No. 2020-513852, 9 pages.
Japanese Patent Office, Office Action and Translation dated Feb. 24, 2021, issued in connection with Japanese Patent Application No. 2019-517281, 4 pages.
Japanese Patent Office, Office Action and Translation dated Apr. 27, 2021, issued in connection with Japanese Patent Application No. 2020-518400, 10 pages.
Japanese Patent Office, Office Action and Translation dated Jul. 6, 2021, issued in connection with Japanese Patent Application No. 2019-073349, 6 pages.
Joseph Szurley et al, "Efficient computation of microphone utility in a wireless acoustic sensor network with multi-channel Wiener filter based noise reduction", 2012 IEEE International Conference On Acoustics, Speech and Signal Processing, Kyoto, Japan, Mar. 25-30, 2012, pp. 2657-2660, XP032227701, DOI: 10.1109/ICASSP.2012.6288463 ISBN: 978-1-4673-0045-2.
Korean Patent Office, Korean Examination Report and Translation dated Apr. 26, 2021, issued in connection with Korean Application No. 10-2021-7008937, 15 pages.
Korean Patent Office, Korean Office Action and Translation dated Jan. 4, 2021, issued in connection with Korean Application No. 10-2020-7034425, 14 pages.
Non-Final Office Action dated Jul. 12, 2021, issued in connection with U.S. Appl. No. 17/008,104, filed Aug. 31, 2020, 6 pages.
Non-Final Office Action dated Jun. 18, 2021, issued in connection with U.S. Appl. No. 17/236,559, filed Apr. 21, 2021, 9 pages.
Non-Final Office Action dated Apr. 21, 2021, issued in connection with U.S. Appl. No. 16/109,375, filed Aug. 22, 2018, 9 pages.
Non-Final Office Action dated Apr. 23, 2021, issued in connection with U.S. Appl. No. 16/660,197, filed Oct. 22, 2019, 9 pages.
Non-Final Office Action dated Jun. 25, 2021, issued in connection with U.S. Appl. No. 16/213,570, filed Dec. 7, 2018, 11 pages.
Non-Final Office Action dated Jul. 8, 2021, issued in connection with U.S. Appl. No. 16/813,643, filed Mar. 9, 2020, 12 pages.
Non-Final Office Action dated Jul. 9, 2021, issued in connection with U.S. Appl. No. 16/806,747, filed Mar. 2, 2020, 18 pages.
Non-Final Office Action dated Feb. 11, 2021, issued in connection with U.S. Appl. No. 16/876,493, filed May 18, 2020, 16 pages.
Non-Final Office Action dated Mar. 11, 2021, issued in connection with U.S. Appl. No. 16/834,483, filed Mar. 30, 2020, 11 pages.
Non-Final Office Action dated Apr. 12, 2021, issued in connection with U.S. Appl. No. 16/528,224, filed Jul. 31, 2019, 9 pages.
Non-Final Office Action dated Jun. 23, 2021, issued in connection with U.S. Appl. No. 16/439,032, filed Jun. 12, 2019, 13 pages.
Non-Final Office Action dated Mar. 29, 2021, issued in connection with U.S. Appl. No. 16/528,265, filed Jul. 31, 2019, 18 pages.
Non-Final Office Action dated Jan. 6, 2021, issued in connection with U.S. Appl. No. 16/439,046, filed Jun. 12, 2019, 13 pages.
Non-Final Office Action dated Apr. 9, 2021, issued in connection with U.S. Appl. No. 16/780,483, filed Feb. 3, 2020, 45 pages.
Non-Final Office Action dated Feb. 9, 2021, issued in connection with U.S. Appl. No. 16/806,747, filed Mar. 2, 2020, 16 pages.
Notice of Allowance dated Mar. 31, 2021, issued in connection with U.S. Appl. No. 16/813,643, filed Mar. 9, 2020, 11 pages.
Notice of Allowance dated Jun. 1, 2021, issued in connection with U.S. Appl. No. 16/219,702, filed Dec. 13, 2018, 8 pages.
Notice of Allowance dated Jun. 1, 2021, issued in connection with U.S. Appl. No. 16/685,135, filed Nov. 15, 2019, 10 pages.
Notice of Allowance dated Feb. 10, 2021, issued in connection with U.S. Appl. No. 16/138,111, filed Sep. 21, 2018, 8 pages.
Notice of Allowance dated May 12, 2021, issued in connection with U.S. Appl. No. 16/402,617, filed May 3, 2019, 8 pages.
Notice of Allowance dated Jan. 13, 2021, issued in connection with U.S. Appl. No. 16/539,843, filed Aug. 13, 2019, 5 pages.
Notice of Allowance dated Jan. 14, 2021, issued in connection with U.S. Appl. No. 17/087,423, filed Nov. 2, 2020, 8 pages.
Notice of Allowance dated Apr. 16, 2021, issued in connection with U.S. Appl. No. 16/798,967, filed Feb. 24, 2020, 16 pages.
Notice of Allowance dated Feb. 17, 2021, issued in connection with U.S. Appl. No. 16/715,984, filed Dec. 16, 2019, 8 pages.
Notice of Allowance dated Mar. 18, 2021, issued in connection with U.S. Appl. No. 16/177,185, filed Oct. 31, 2018, 8 pages.
Notice of Allowance dated Mar. 19, 2021, issued in connection with U.S. Appl. No. 17/157,686, filed Jan. 25, 2021, 11 pages.
Notice of Allowance dated Apr. 21, 2021, issued in connection with U.S. Appl. No. 16/145,275, filed Sep. 28, 2018, 8 pages.
Notice of Allowance dated Jan. 21, 2021, issued in connection with U.S. Appl. No. 16/600,644, filed Oct. 14, 2019, 7 pages.
Notice of Allowance dated Jun. 23, 2021, issued in connection with U.S. Appl. No. 16/814,844, filed Mar. 10, 2020, 8 pages.
Notice of Allowance dated May 26, 2021, issued in connection with U.S. Appl. No. 16/927,670, filed Jul. 13, 2020, 10 pages.
Notice of Allowance dated May 28, 2021, issued in connection with U.S. Appl. No. 16/524,306, filed Jul. 29, 2019, 9 pages.
Notice of Allowance dated Jan. 29, 2021, issued in connection with U.S. Appl. No. 16/290,599, filed Mar. 1, 2019, 9 pages.
Notice of Allowance dated Mar. 29, 2021, issued in connection with U.S. Appl. No. 16/600,949, filed Oct. 14, 2019, 9 pages.
Notice of Allowance dated Jun. 3, 2021, issued in connection with U.S. Appl. No. 16/876,493, filed May 18, 2020, 7 pages.
Notice of Allowance dated Jun. 4, 2021, issued in connection with U.S. Appl. No. 16/528,265, filed Jul. 31, 2019, 17 pages.
Notice of Allowance dated Jun. 7, 2021, issued in connection with U.S. Appl. No. 16/528,224, filed Jul. 31, 2019, 9 pages.
Pre-Appeal Brief Decision mailed on Jun. 2, 2021, issued in connection with U.S. Appl. No. 16/213,570, filed Dec. 7, 2018, 2 pages.
Preinterview First Office Action dated Jan. 8, 2021, issued in connection with U.S. Appl. No. 16/798,967, filed Feb. 24, 2020, 4 pages.
Tsung-Hsien Wen et al.: "A Network-based End-to-End Trainable Task-oriented Dialogue System", CORR ARXIV, vol. 1604.04562v1, Apr. 15, 2016, pp. 1-11, XP055396370, Stroudsburg, PA, USA.
Notice of Allowance dated Feb. 6, 2019, issued in connection with U.S. Appl. No. 16/102,153, filed Aug. 13, 2018, 9 pages.
Notice of Allowance dated Feb. 6, 2020, issued in connection with U.S. Appl. No. 16/227,308, filed Dec. 20, 2018, 7 pages.
Notice of Allowance dated Apr. 7, 2020, issued in connection with U.S. Appl. No. 15/098,760, filed Apr. 14, 2016, 7 pages.
Notice of Allowance dated Apr. 7, 2020, issued in connection with U.S. Appl. No. 16/147,710, filed Sep. 29, 2018, 15 pages.
Notice of Allowance dated Jun. 7, 2019, issued in connection with U.S. Appl. No. 16/102,153, filed Aug. 13, 2018, 9 pages.
Notice of Allowance dated Aug. 9, 2018, issued in connection with U.S. Appl. No. 15/229,868, filed Aug. 5, 2016, 11 pages.
Notice of Allowance dated Mar. 9, 2018, issued in connection with U.S. Appl. No. 15/584,782, filed May 2, 2017, 8 pages.
Optimizing Siri on HomePod in Far-Field Settings. Audio Software Engineering and Siri Speech Team, Machine Learning Journal vol. 1, Issue 12. https://machinelearning.apple.com/2018/12/03/optimizing-siri-on-homepod-in-far-field-settings.html. Dec. 2018, 18 pages.
Palm, Inc., "Handbook for the Palm VII Handheld," May 2000, 311 pages.
Preinterview First Office Action dated Aug. 5, 2019, issued in connection with U.S. Appl. No. 16/434,426, filed Jun. 7, 2019, 4 pages.
Preinterview First Office Action dated Mar. 25, 2020, issued in connection with U.S. Appl. No. 16/109,375, filed Aug. 22, 2018, 6 pages.
Preinterview First Office Action dated Sep. 30, 2019, issued in connection with U.S. Appl. No. 15/989,715, filed May 25, 2018, 4 pages.
Preinterview First Office Action dated May 7, 2020, issued in connection with U.S. Appl. No. 16/213,570, filed Dec. 7, 2018, 5 pages.
Presentations at WinHEC 2000, May 2000, 138 pages.

(56) References Cited

OTHER PUBLICATIONS

Restriction Requirement dated Aug. 14, 2019, issued in connection with U.S. Appl. No. 16/214,711, filed Dec. 10, 2018, 5 pages.
Restriction Requirement dated Aug. 9, 2018, issued in connection with U.S. Appl. No. 15/717,621, filed Sep. 27, 2017, 8 pages.
Rottondi et al., "An Overview on Networked Music Performance Technologies," IEEE Access, vol. 4, pp. 8823-8843, 2016, DOI: 10.1109/ACCESS.2016.2628440, 21 pages.
Souden et al. "An Integrated Solution for Online Multichannel Noise Tracking and Reduction." IEEE Transactions on Audio, Speech, and Language Processing, vol. 19. No. 7, Sep. 7, 2011, 11 pages.
Souden et al. "Gaussian Model-Based Multichannel Speech Presence Probability" IEEE Transactions on Audio, Speech, and Language Processing, vol. 18, No. 5, Jul. 5, 2010, 6pages.
Souden et al. "On Optimal Frequency-Domain Multichannel Linear Filtering for Noise Reduction." IEEE Transactions an Audio, Speech, and Language Processing, vol. 18, No. 2, Feb. 2010, 17pages.
Steven J. Nowlan and Geoffrey E. Hinton "Simplifying Neural Networks by Soft Weight-Sharing" Neural Computation 4, 1992, 21 pages.
Tsiami et al. "Experiments in acoustic source localization using sparse arrays in adverse indoors environments", 2014 22nd European Signal Processing Conference, Sep. 1, 2014, 5 pages.
Tweet: "How to start using Google app voice commands to make your life easier Share This Story shop @Bullet", Jan. 21, 2016, https://bgr.com/2016/01/21/best-ok-google-voice-commands/, 3 page.
Ullrich et al. "Soft Weight-Sharing for Neural Network Compression." ICLR 2017, 16 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Vacher at al. "Recognition of voice commands by multisource ASR and noise cancellation in a smart home annvironment" Signal Processing Conference 2012 Proceedings of the 20th European, IEEE, Aug. 27, 2012, 5 pages.
Vacher et al. "Speech Recognition in a Smart Home: Some Experiments for Telemonitoring," 2009 Proceedings of the 5th Conference on Speech Technology and Human-Computer Dialogoue, Constant, 2009, 10 pages.
"S Voice or Google Now?"; https://web.archive.org/web/20160807040123/lowdown.carphonewarehouse.com/news/s-voice-or-google-now/ . . . , Apr. 28, 2015; 4 pages.
Wung et al. "Robust Acoustic Echo Cancellation in the Short-Time Fourier Transform Domain Using Adaptive Crossband Filters" IEEE International Conference on Acoustic, Speech and Signal Processing ICASSP, 2014, p. 1300-1304.
Xiao et al. "A Learning-Based Approach to Direction of Arrival Estimation in Noisy and Reverberant Environments," 2015 IEEE International Conference On Acoustics, Speech and Signal Processing, Apr. 19, 2015, 5 pages.
Yamaha DME 64 Owner's Manual; copyright 2004, 80 pages.
Yamaha DME Designer 3.0 Owner's Manual; Copyright 2008, 501 pages.
Yamaha DME Designer 3.5 setup manual guide; copyright 2004, 16 pages.
Yamaha DME Designer 3.5 User Manual; Copyright 2004, 507 pages.
Non-Final Office Action dated Sep. 10, 2018, issued in connection with U.S. Appl. No. 15/670,361, filed Aug. 7, 2017, 17 pages.
Non-Final Office Action dated Oct. 11, 2019, issued in connection with U.S. Appl. No. 16/177,185, filed Oct. 31, 2018, 14 pages.
Non-Final Office Action dated Sep. 11, 2020, issued in connection with U.S. Appl. No. 15/989,715, filed May 25, 2018, 8 pages.
Non-Final Office Action dated Sep. 11, 2020, issued in connection with U.S. Appl. No. 16/219,702, filed Dec. 13, 2018, 9 pages.
Non-Final Office Action dated Dec. 12, 2016, issued in connection with U.S. Appl. No. 15/098,718, filed Apr. 14, 2016, 11 pages.
Non-Final Office Action dated Feb. 12, 2019, issued in connection with U.S. Appl. No. 15/670,361, filed Aug. 7, 2017, 13 pages.
Non-Final Office Action dated Jan. 13, 2017, issued in connection with U.S. Appl. No. 15/098,805, filed Apr. 14, 2016, 11 pages.
Non-Final Office Action dated Nov. 13, 2018, issued in connection with U.S. Appl. No. 15/717,621, filed Sep. 27, 2017, 23 pages.
Non-Final Office Action dated Nov. 13, 2018, issued in connection with U.S. Appl. No. 16/160,107, filed Oct. 15, 2018, 8 pages.
Non-Final Office Action dated Nov. 13, 2019, issued in connection with U.S. Appl. No. 15/984,073, filed May 18, 2018, 18 pages.
Non-Final Office Action dated May 14, 2020, issued in connection with U.S. Appl. No. 15/948,541, filed Apr. 9, 2018, 8 pages.
Non-Final Office Action dated Sep. 14, 2017, issued in connection with U.S. Appl. No. 15/178,180, filed Jun. 9, 2016, 16 pages.
Non-Final Office Action dated Sep. 14, 2018, issued in connection with U.S. Appl. No. 15/959,907, filed Apr. 23, 2018, 15 pages.
Non-Final Office Action dated Apr. 15, 2020, issued in connection with U.S. Appl. No. 16/138,111, filed Sep. 21, 2018, 15 pages.
Non-Final Office Action dated Dec. 15, 2020, issued in connection with U.S. Appl. No. 17/087,423, filed Nov. 2, 2020, 7 pages.
Non-Final Office Action dated Jan. 15, 2019, issued in connection with U.S. Appl. No. 16/173,797, filed Oct. 29, 2018, 6 pages.
Non-Final Office Action dated Nov. 15, 2019, issued in connection with U.S. Appl. No. 16/153,530, filed Oct. 5, 2018, 17 pages.
Non-Final Office Action dated Mar. 16, 2018, issued in connection with U.S. Appl. No. 15/681,937, filed Aug. 21, 2017, 5 pages.
Non-Final Office Action dated Oct. 16, 2018, issued in connection with U.S. Appl. No. 15/131,254, filed Apr. 18, 2016, 16 pages.
Non-Final Office Action dated Sep. 17, 2020, issued in connection with U.S. Appl. No. 16/600,949, filed Oct. 14, 2019, 29 pages.
Non-Final Office Action dated Apr. 18, 2018, issued in connection with U.S. Appl. No. 15/811,468 filed Nov. 13, 2017, 14 pages.
Non-Final Office Action dated Jan. 18, 2019, issued in connection with U.S. Appl. No. 15/721,141, filed Sep. 29, 2017, 18 pages.
Non-Final Office Action dated Oct. 18, 2019, issued in connection with U.S. Appl. No. 15/098,760, filed Apr. 14, 2016, 27 pages.
Non-Final Office Action dated Sep. 18, 2019, issued in connection with U.S. Appl. No. 16/179,779, filed Nov. 2, 2018, 14 pages.
Non-Final Office Action dated Apr. 19, 2017, issued in connection with U.S. Appl. No. 15/131,776, filed Apr. 18, 2016, 12 pages.
Non-Final Office Action dated Dec. 19, 2019, issued in connection with U.S. Appl. No. 16/147,710, filed Sep. 29, 2018, 10 pages.
Non-Final Office Action dated Feb. 19, 2020, issued in connection with U.S. Appl. No. 16/148,879, filed Oct. 1, 2018, 15 pages.
Non-Final Office Action dated Sep. 2, 2020, issued in connection with U.S. Appl. No. 16/290,599, filed Mar. 1, 2019, 17 pages.
Non-Final Office Action dated Feb. 20, 2018, issued in connection with U.S. Appl. No. 15/211,748, filed Jul. 15, 2016, 31 pages.
Non-Final Office Action dated Jun. 20, 2019, issued in connection with U.S. Appl. No. 15/946,585, filed Apr. 5, 2018, 10 pages.
Non-Final Office Action dated Aug. 21, 2019, issued in connection with U.S. Appl. No. 16/192,126, filed Nov. 15, 2018, 8 pages.
Non-Final Office Action dated Feb. 21, 2019, issued in connection with U.S. Appl. No. 16/214,666, filed Dec. 10, 2018, 12 pages.
Non-Final Office Action dated Jan. 21, 2020, issued in connection with U.S. Appl. No. 16/214,711, filed Dec. 10, 2018, 9 pages.
Non-Final Office Action dated Jan. 21, 2020, issued in connection with U.S. Appl. No. 16/598,125, filed Oct. 10, 2019, 25 pages.
Non-Final Office Action dated Oct. 21, 2019, issued in connection with U.S. Appl. No. 15/973,413, filed May 7, 2018, 10 pages.
Non-Final Office Action dated Jul. 22, 2020, issued in connection with U.S. Appl. No. 16/145,275, filed Sep. 28, 2018, 11 pages.
Non-Final Office Action dated May 22, 2018, issued in connection with U.S. Appl. No. 15/946,599, filed Apr. 5, 2018, 19 pages.
Non-Final Office Action dated Sep. 22, 2020, issued in connection with U.S. Appl. No. 16/539,843, filed Aug. 13, 2019, 7 pages.
Non-Final Office Action dated May 23, 2019, issued in connection with U.S. Appl. No. 16/154,071, filed Oct. 8, 2018, 36 pages.

(56) References Cited

OTHER PUBLICATIONS

Non-Final Office Action dated Nov. 23, 2020, issued in connection with U.S. Appl. No. 16/524,306, filed Jul. 29, 2019, 14 pages.
Non-Final Office Action dated Sep. 23, 2020, issued in connection with U.S. Appl. No. 16/177,185, filed Oct. 31, 2018, 17 pages.
Non-Final Office Action dated Aug. 24, 2017, issued in connection with U.S. Appl. No. 15/297,627, filed Oct. 19, 2016, 13 pages.
Non-Final Office Action dated Jul. 24, 2019, issued in connection with U.S. Appl. No. 16/439,009, filed Jun. 12, 2019, 26 pages.
Non-Final Office Action dated Jul. 25, 2017, issued in connection with U.S. Appl. No. 15/273,679, filed Jul. 22, 2016, 11 pages.
Non-Final Office Action dated Dec. 26, 2018, issued in connection with U.S. Appl. No. 16/154,469, filed Oct. 8, 2018, 7 pages.
Non-Final Office Action dated Jan. 26, 2017, issued in connection with U.S. Appl. No. 15/098,867, filed Apr. 14, 2016, 16 pages.
Non-Final Office Action dated Oct. 26, 2017, issued in connection with U.S. Appl. No. 15/438,744, filed Feb. 21, 2017, 12 pages.
Non-Final Office Action dated Jun. 27, 2018, issued in connection with U.S. Appl. No. 15/438,749, filed Feb. 21, 2017, 16 pages.
Non-Final Office Action dated Jun. 27, 2019, issued in connection with U.S. Appl. No. 16/437,437, filed Jun. 11, 2019, 8 pages.
Non-Final Office Action dated Jun. 27, 2019, issued in connection with U.S. Appl. No. 16/437,476, filed Jun. 11, 2019, 8 pages.
International Searching Authority, International Search Repod and Written Opinion dated Dec. 19, 2018, in connection with International Application No. PCT/US2018/053517, 13 pages.
International Searching Authority, International Search Repod and Written Opinion dated Nov. 22, 2017, issued in connection with International Application No. PCT/US2017/054063, filed on Sep. 28, 2017, 11 pages.
International Searching Authority, International Search Repod and Written Opinion dated Jan. 23, 2018, issued in connection with International Application No. PCT/US2017/57220, filed on Oct. 18, 2017, 8 pages.
International Searching Authority, International Search Repod and Written Opinion dated May 23, 2017, issued in connection with International Application No. PCT/US2017/018739, Filed on Feb. 21, 2017, 10 pages.
International Searching Authority, International Search Report and Written Opinion dated Oct. 23, 2017, issued in connection with International Application No. PCT/US2017/042170, filed on Jul. 14, 2017, 15 pages.
International Searching Authority, International Search Report and Written Opinion dated Oct. 24, 2017, issued in connection with International Application No. PCT/US2017/042227, filed on Jul. 14, 2017, 16 pages.
International Searching Authority, International Search Report and Written Opinion dated May 30, 2017, issued in connection with International Application No. PCT/US2017/018728, Filed on Feb. 21, 2017, 11 pages.
Japanese Patent Office, English Translation of Office Action dated Aug. 27, 2020, issued in connection with Japanese Application No. 2019-073349, 6 pages.
Japanese Patent Office, English Translation of Office Action dated Jul. 30, 2020, issued in connection with Japanese Application No. 2019-517281, 26 pages.
Japanese Patent Office, Non-Final Office Action and Translation dated Nov. 5, 2019, issued in connection with Japanese Patent Application No. 2019-517281, 6 pages.
Japanese Patent Office, Office Action and Translation dated Nov. 17, 2020, issued in connection with Japanese Patent Application No. 2019-145039, 7 pages.
Japanese Patent Office, Office Action and Translation dated Aug. 27, 2020, issued in connection with Japanese Patent Application No. 2019-073349, 6 pages.
Japanese Patent Office, Office Action and Translation dated Jul. 30, 2020, issued in connection with Japanese Patent Application No. 2019-517281, 6 pages.
Japanese Patent Office, Office Action and Translation dated Jul. 6, 2020, issued in connection with Japanese Patent Application No. 2019-073348, 10 pages.
Japanese Patent Office, Office Action and Translation dated Oct. 8, 2019, issued in connection with Japanese Patent Application No. 2019-521032, 5 pages.
Japanese Patent Office, Office Action Translation dated Nov. 5, 2019, issued in connection with Japanese Patent Application No. 2019-517281, 2 pages.
Japanese Patent Office, Office Action Translation dated Oct. 8, 2019, issued in connection with Japanese Patent Application No. 2019-521032, 8 pages.
Jo et al., "Synchronized One-to-many Media Streaming with Adaptive Playout Control," Proceedings of SPIE, 2002, pp. 71-82, vol. 4861.
Johnson, "Implementing Neural Networks into Modem Technology," IJCNN'99. International Joint Conference on Neural Networks . Proceedings [Cat. No. 99CH36339], Washington, DC, USA, 1999, pp. 1028-1032, vol. 2, doi: 10.1109/IJCNN. 1999.831096. [retrieved on Jun. 22, 2020].
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Jose Alvarez and Mathieu Salzmann "Compression-aware Training of Deep Networks" 31st Conference on Neural Information Processing Systems, Nov. 13, 2017, 12pages.
Korean Patent Office, Korean Office Action and Translation dated Aug. 16, 2019, issued in connection with Korean Application No. 10-2018-7027452, 14 pages.
Korean Patent Office, Korean Office Action and Translation dated Apr. 2, 2020, issued in connection with Korean Application No. 10-2020-7008486, 12 pages.
Korean Patent Office, Korean Office Action and Translation dated Mar. 25, 2020, issued in connection with Korean Application No. 10-2019-7012192, 14 pages.
Korean Patent Office, Korean Office Action and Translation dated Aug. 26, 2020, issued in connection with Korean Application No. 10-2019-7027640, 16 pages.
Korean Patent Office, Korean Office Action and Translation dated Mar. 30, 2020, issued in connection with Korean Application No. 10 2020 7004425, 5 pages.
Korean Patent Office, Korean Office Action and Translation dated Sep. 9, 2019, issued in connection with Korean Application No. 10-2018-7027451, 21 pages.
Korean Patent Office, Korean Office Action dated May 8, 2019, issued in connection with Korean Application No. 10-2018-7027451, 7 pages.
Korean Patent Office, Korean Office Action dated May 8, 2019, issued in connection with Korean Application No. 10-2018-7027452, 5 pages.
Louderback, Jim, "Affordable Audio Receiver Furnishes Homes With MP3," TechTV Vault. Jun. 28, 2000 retrieved Jul. 10, 2014, 2 pages.
Maja Taseska and Emanual A.P. Habets, "MMSE-Based Blind Source Extraction in Diffuse Noise Fields Using a Complex Coherence-Based a Priori Sap Estimator." International Workshop on Acoustic Signal Enhancement 2012, Sep. 1-6, 2012, 4pages.
Morales-Cordovilla et al. "Room Localization for Distant Speech Recognition," Proceedings of Interspeech 2014, Sep. 14, 2014, 4 pages.
Newman, Jared. "Chromecast Audio's multi-room support has arrived," Dec. 11, 2015, https://www.pcworld.com/article/3014204/customer-electronic/chromcase-audio-s-multi-room-support-has . . . , 1 page.
Ngo et al. "Incorporating the Conditional Speech Presence Probability in Multi-Channel Wiener Filter Based Noise Reduction in Hearing Aids." EURASIP Journal on Advances in Signal Processing vol. 2009, Jun. 2, 2009, 11 pages.
Non-Final Office Action dated Dec. 21, 2020, issued in connection with U.S. Appl. No. 16/153,530, filed Oct. 5, 2018, 22 pages.
Non-Final Office Action dated Dec. 9, 2020, issued in connection with U.S. Appl. No. 16/271,550, filed Feb. 8, 2019, 35 pages.

(56) References Cited

OTHER PUBLICATIONS

Non-Final Office Action dated Jun. 1, 2017, issued in connection with U.S. Appl. No. 15/223,218, filed Jul. 29, 2016, 7 pages.
Non-Final Office Action dated Nov. 2, 2017, issued in connection with U.S. Appl. No. 15/584,782, filed May 2, 2017, 11 pages.
Non-Final Office Action dated Nov. 3, 2017, issued in connection with U.S. Appl. No. 15/438,741, filed Feb. 21, 2017, 11 pages.
Non-Final Office Action dated Nov. 4, 2019, issued in connection with U.S. Appl. No. 16/022,662, filed Jun. 28, 2018, 16 pages.
Non-Final Office Action dated Sep. 5, 2019, issued in connection with U.S. Appl. No. 16/416,752, filed May 20, 2019, 14 pages.
Non-Final Office Action dated Feb. 7, 2017, issued in connection with U.S. Appl. No. 15/131,244, filed Apr. 18, 2016, 12 pages.
Non-Final Office Action dated Feb. 8, 2017, issued in connection with U.S. Appl. No. 15/098,892, filed Apr. 14, 2016, 17 pages.
Non-Final Office Action dated Mar. 9, 2017, issued in connection with U.S. Appl. No. 15/098,760, filed Apr. 14, 2016, 13 pages.
Non-Final Office Action dated Oct. 9, 2019, issued in connection with U.S. Appl. No. 15/936,177, filed Mar. 26, 2018, 16 pages.
Non-Final Office Action dated Jul. 1, 2020, issued in connection with U.S. Appl. No. 16/138,111, filed Sep. 21, 2018, 14 pages.
Non-Final Office Action dated Jan. 10, 2018, issued in connection with U.S. Appl. No. 15/098,718, filed Apr. 14, 2016, 15 pages.
Non-Final Office Action dated Jan. 10, 2018, issued in connection with U.S. Appl. No. 15/229,868, filed Aug. 5, 2016, 13 pages.
Non-Final Office Action dated Jan. 10, 2018, issued in connection with U.S. Appl. No. 15/438,725, filed Feb. 21, 2017, 15 pages.
Advisory Action dated Jun. 10, 2020, issued in connection with U.S. Appl. No. 15/936,177, filed Mar. 26, 2018, 4 pages.
Advisory Action dated Apr. 24, 2020, issued in connection with U.S. Appl. No. 15/948,541, filed Apr. 9, 2018, 4 pages.
Advisory Action dated Jun. 28, 2018, issued in connection with U.S. Appl. No. 15/438,744, filed Feb. 21, 2017, 3 pages.
Advisory Action dated Dec. 31, 2018, issued in connection with U.S. Appl. No. 15/804,776, filed Nov. 6, 2017, 4 pages.
Advisory Action dated Jun. 9, 2020, issued in connection with U.S. Appl. No. 16/145,275, filed Sep. 28, 2018, 3 pages.
Anonymous,. S Voice or Google Now—The Lowdown. Apr. 28, 2015, 9 pages, [online], [retrieved on Nov. 29, 2017], Retrieved from the Internet (URL:http://web.archive.org/web/20160807040123/http://lowdown.carphonewarehouse.com/news/s-voice-or-google-now/29958/).
AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
Australian Patent Office, Australian Examination Report Action dated Apr. 14, 2020, issued in connection with Australian Application No. 2019202257, 3 pages.
Australian Patent Office, Australian Examination Report Action dated Oct. 3, 2019, issued in connection with Australian Application No. 2018230932, 3 pages.
Australian Patent Office, Australian Examination Report Action dated Aug. 7, 2020, issued in connection with Australian Application No. 2019236722, 4 pages.
Australian Patent Office, Examination Report dated Oct. 30, 2018, issued in connection with Australian Application No. 2017222436, 3 pages.
"Automatic Parameter Tying in Neural Networks" ICLR 2018, 14 pages.
Bertrand et al. "Adaptive Distributed Noise Reduction for Speech Enhancement in Wireless Acoustic Sensor Networks" Jan. 2010, 4 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Canadian Patent Office, Canadian Office Action dated Nov. 14, 2018, issued in connection with Canadian Application No. 3015491, 3 pages.

Chinese Patent Office, First Office Action and Translation dated Mar. 20, 2019, issued in connection with Chinese Application No. 201780025028.2, 18 pages.
Chinese Patent Office, First Office Action and Translation dated Mar. 27, 2019, issued in connection with Chinese Application No. 201780025029.7, 9 pages.
Chinese Patent Office, First Office Action and Translation dated Nov. 5, 2019, issued in connection with Chinese Application No. 201780072651 3, 19 pages.
Chinese Patent Office, First Office Action dated Feb. 28, 2020, issued in connection with Chinese Application No. 201780061543.6, 29 pages.
Chinese Patent Office, Second Office Action and Translation dated May 11, 2020, issued in connection with Chinese Application No. 201780061543.6, 17 pages.
Chinese Patent Office, Second Office Action and Translation dated Jul. 18, 2019, issued in connection with Chinese Application No. 201780025029.7, 14 pages.
Chinese Patent Office, Second Office Action and Translation dated Sep. 23, 2019, issued in connection with Chinese Application No. 201780025028.2, 15 pages.
Chinese Patent Office, Second Office Action and Translation dated Mar. 31, 2020, issued in connection with Chinese Application No. 201780072651.3, 17 pages.
Chinese Patent Office, Third Office Action and Translation dated Sep. 16, 2019, issued in connection with Chinese Application No. 201780025029.7, 14 pages.
Chinese Patent Office, Third Office Action and Translation dated Aug. 5, 2020, issued in connection with Chinese Application No. 201780072651.3, 10 pages.
Chinese Patent Office, Translation of Office Action dated Jul. 18, 2019, issued in connection with Chinese Application No. 201780025029.7, 8 pages.
Cipriani,. The complete list of OK, Google commands—CNE. Jul. 1, 2016, 5 pages, [online], [retrieved on Jan. 15, 2020]. Retrieved from the Internet: (URL:https://web.archive.org/web/20160803230926/https://www.cnet.com/iow-to/complete-list-of-ok-google-commands/).
Corrected Notice of Allowability dated Mar. 8, 2017, issued in connection with U.S. Appl. No. 15/229,855, filed Aug. 5, 2016, 6 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
European Patent Office, European Extended Search Report dated Feb. 3, 2020, issued in connection with European Application No. 19197116.7, 9 pages.
European Patent Office, European Extended Search Report dated Jan. 3, 2019, issued in connection with European Application No. 177570702, 8 pages.
European Patent Office, European Extended Search Report dated Jan. 3, 2019, issued in connection with European Application No. 17757075.1, 9 pages.
European Patent Office, European Extended Search Report dated Oct. 30, 2017, issued in connection with EP Application No. 17174435.2, 11 pages.
European Patent Office, European Extended Search Report dated Aug. 6, 2020, issued in connection with European Application No. 20166332.5, 10 pages.
European Patent Office, European Office Action dated Jul. 1, 2020, issued in connection with European Application No. 17757075.1, 7 pages.
European Patent Office, European Office Action dated Jan. 14, 2020, issued in connection with European Application No. 17757070.2, 7 pages.
European Patent Office, European Office Action dated Jan. 22, 2019, issued in connection with European Application No. 17174435.2, 9 pages.
European Patent Office, European Office Action dated Sep. 23, 2020, issued in connection with European Application No. 18788976.1, 7 pages.

(56) References Cited

OTHER PUBLICATIONS

European Patent Office, European Office Action dated Oct. 26, 2020, issued in connection with European Application No. 18760101.8, 4 pages.

European Patent Office, European Office Action dated Aug. 30, 2019, issued in connection with European Application No. 17781608.9, 6 pages.

European Patent Office, European Office Action dated Sep. 9, 2020, issued in connection with European Application No. 18792656.3, 10 pages.

European Patent Office, Summons to Attend Oral Proceedings dated Dec. 20, 2019, issued in connection with European Application No. 17174435.2, 13 pages.

Fadilpasic,"Cortana can now be the default PDA on your Android", IT Pro Portal: Accessed via WayBack Machine; http://web.archive.org/web/20171129124915/https://www.itproportal.com/201- 5/08/11/cortana-can-now-be- . . . , Aug. 11, 2015, 6 pages.

Final Office Action dated Oct. 6, 2017, issued in connection with U.S. Appl. No. 15/098,760, filed Apr. 14, 2016, 25 pages.

Final Office Action dated Nov. 10, 2020, issued in connection with U.S. Appl. No. 16/600,644, filed Oct. 14, 2019, 19 pages.

\* cited by examiner

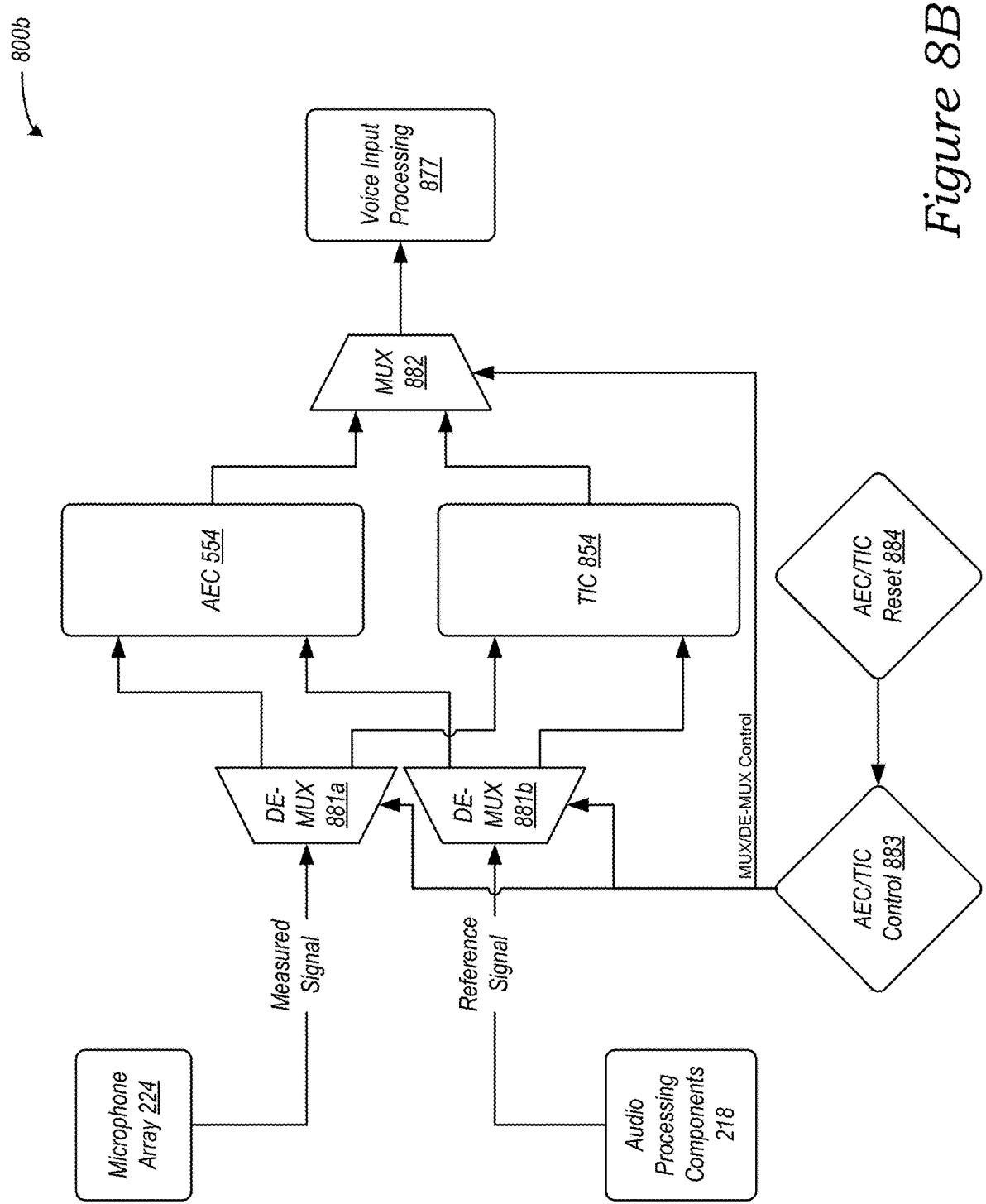

TONE INTERFERENCE CANCELLATION

CROSS REFERENCE TO RELATED APPLICATIONS

This application claims priority under 35 U.S.C. § 120 to, and is a continuation of, U.S. non-provisional patent application Ser. No. 15/718,521, entitled "Tone Interference Cancellation," which is incorporated herein by reference in its entirety.

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever-growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

FIG. 8B is a functional block diagram of an example acoustic echo cancellation pipeline;

Figure 1:
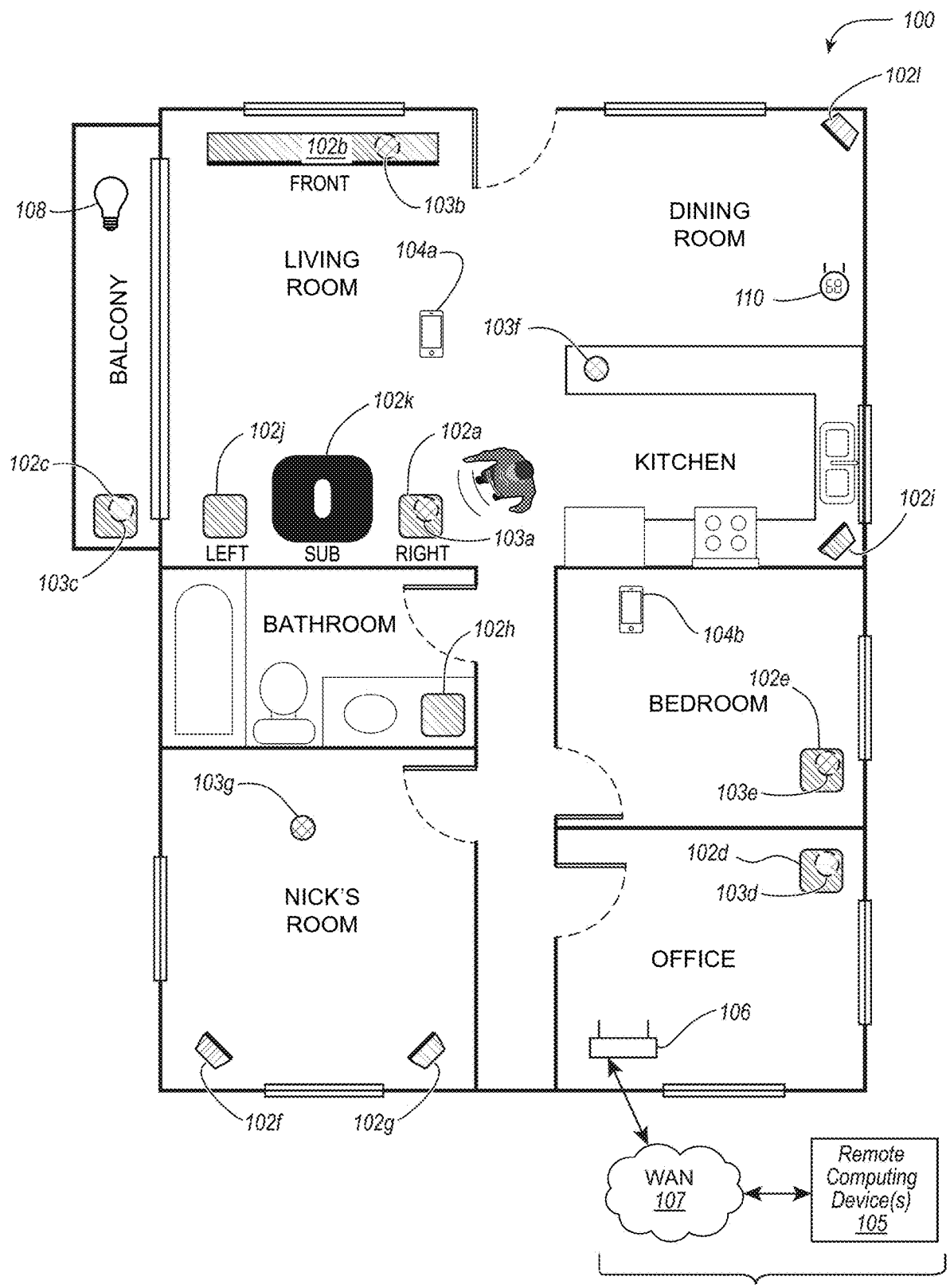
FIG. 1 shows a media playback system configuration in which certain embodiments may be practiced.

The drawings are for purposes of illustrating example embodiments, but it is understood that the inventions are not limited to the arrangements and instrumentality shown in the drawings. In the drawings, identical reference numbers identify at least generally similar elements. To facilitate the discussion of any particular element, the most significant digit or digits of any reference number refers to the Figure in which that element is first introduced. For example, element 110 is first introduced and discussed with reference to FIG. 1.

DETAILED DESCRIPTION

I. Overview

Networked microphone device may be used to control a household using voice control. Voice control can be beneficial for a "smart" home having a system of smart devices, such as playback devices, wireless illumination devices, thermostats, door locks, home-automation devices, as well as other examples. In some implementations, the system of smart devices includes a networked microphone device configured to detect voice inputs. A voice assistant service facilitates processing of the voice inputs. Traditionally, the voice assistant service includes remote servers that receive and process voice inputs. The voice service may return responses to voice inputs, which might include control of various smart devices or audio or video information (e.g., a weather report), among other examples.

A voice input typically includes an utterance with a wake word followed by an utterance containing a user request. A wake word, when uttered, may invoke a particular voice assistance service. For instance, in querying the AMAZON® voice assistant service, a user might speak a wake word "Alexa." Other examples include "Ok, Google" for invoking the GOOGLE® voice assistant service and "Hey, Siri" for invoking the APPLE® voice assistant service.

Upon detecting a wake word, a networked microphone device may listen for the user request in the voice utterance following the wake word. In some instances, the user request may include a command to control a third party device, such as a smart illumination device (e.g., a PHILIPS HUE® lighting device), a thermostat (e.g., NEST® thermostat), or a media playback device (e.g., a Sonos® playback device). For example, a user might speak the wake word "Alexa" followed by the utterance "turn on the living room" to turn on illumination devices. A user might speak the same wake word followed by the utterance "set the thermostat to 68 degrees." The user may also utter a request for a playback device to play a particular song, an album, or a playlist of music.

When a networked microphone device detects a wake word, the networked microphone device may provide an acknowledgement of the wake word to the user, so that the user can be informed that the networked microphone device has detected the wake word. In some implementations, this acknowledgement is provided by way of a light response (e.g., the illumination of one or more light emitting diodes, perhaps in certain colors and/or patterns). A possible disadvantage of using a light response to acknowledge wake word detection is that the user must be looking in the direction of the networked microphone device to see the light response.

Alternatively, example networked microphone devices may provide acknowledgement of wake word detection by way of an audio response. For instance, one or more speakers may play back an audible "acknowledgement" tone shortly after a networked microphone device detects a wake word in captured audio. However, wake words typically precede a voice utterance (e.g., a voice command or query) spoken by the user. As such, an acknowledgement tone may overlap the user's voice utterance. Given this overlap, the acknowledgement tone may interfere with the networked microphone device's capturing of the voice utterance.

In an effort to avoid or lessen interference from the acknowledgement tone in the capturing of the voice utterance, a networked microphone device may use an Acoustic Echo Canceller ("AEC") to remove the sound of the acknowledgement tone from the signal captured by microphone(s) of the networked microphone device. This removal is intended to improve the signal-to-noise ratio of a voice input to other sound within the acoustic environment, which includes the sound produced by the one or more speakers in playing back the acknowledgement tone, so as to provide a less noisy signal to a voice assistant service.

In example implementations, an AEC is implemented within the audio processing pipeline of a networked microphone device. Input to an AEC may include the signal captured by the microphone(s) and a reference signal representing the analog audio expected to be output by the transducers (e.g., the acknowledgement tone). Given these inputs, the AEC attempts to find a transfer function (i.e., a 'filter') that transforms the reference signal into the captured microphone signal with minimal error. Inverting the resulting AEC output and mixing it with the microphone signal causes a redaction of the audio output signal from the signal captured by the microphone(s). Moreover, AEC is an iterative process, whereby the error during each iteration of the AEC is used to update the filter for the next iteration of the AEC. Using this process, over successive iterations, the AEC "converges" to an effective cancellation of the reference signal from the measured signal.

However, being an iterative process, an AEC may take some time to converge to an effective cancellation of the reference signal from the measured signal. For instance, example AEC processes might take 700 milliseconds or longer to converge, depending on the noise in the acoustic environment. If the AEC already active and stable (i.e., converged) when an acknowledgement tone is outputted—perhaps because the device is playing back other audio content, such as music—then the AEC may effectively cancel the acknowledgement tone (in addition to the other audio content). However, if instead the AEC is inactive (i.e., not active and stable) when the acknowledgement tone is outputted, then the AEC is unlikely to have enough time to converge and thereby cancel the acknowledgement tone effectively, as the reference signal might be only a few hundred milliseconds in length.

To facilitate effective cancellation of an acknowledgement tone whether the AEC is active or not, example networked microphone devices described herein may implement two acoustic echo cancellations processes. If the networked microphone device is playing back audio content (e.g., music) via one or more audio drivers when a wake word is detected in captured audio, the networked microphone device runs (or continue running) a first AEC to cancel the acoustic echo of the acknowledgement tone from the captured audio. The first AEC also cancels the acoustic echo of the played back audio content. Conversely, if the one or more audio drivers of the networked microphone device are idle when the wake word is detected in the captured audio, the networked microphone device activates a second AEC to cancel the acoustic echo of the acknowledgement tone from the captured audio.

As compared with the first AEC, the second AEC is designed to converge significantly faster, thereby enabling the second AEC to cancel the acknowledgement tone effectively, even where the acknowledgement tone is only a few hundred milliseconds in length. In particular, the second AEC may converge more quickly than the first AEC by cancelling acoustic echo from only the specific frequency ranges (a.k.a., frequency "bins") in which the acknowledgement tone has content. In contrast, the first AEC is configured to cancel acoustic echo across the entire audible frequency spectrum (e.g., 20 Hz-20,000 Hz). By processing a subset of the frequency range that the first AEC processes, the second AEC may converge significantly faster (e.g., quickly enough to converge and cancel an acknowledgement tone that is only a few hundred milliseconds in length). In practice, in example implementations, such techniques have increased the rate of convergence by 91.44% as compared with a full-spectrum acoustic echo cancellation process.

Example techniques described herein may involve selecting among different acoustic echo cancellers implemented in a networked microphone device. An example implementation may involve capturing, via the one or more microphones, first audio within an acoustic environment, determining whether the one or more speakers are (a) playing back audio content or (b) idle, determining whether the one or more speakers are (a) playing back audio content or (b) idle, and identifying a set of frequency bands of the full audible frequency spectrum in which the audible tone in acknowledgment of the detected wake word has content.

The example implementation may further involve in response to detecting the wake word for the voice service and before playing an audible tone in acknowledgement of the detected wake word on the one or more speakers, activating either (a) a first sound canceller or (b) a second sound canceller. Activating either the (a) first sound canceller or (b) the second sound canceller may involve when the one or more speakers are playing back audio content, activating the first sound canceller, the first sound canceller configured to cancel audio output from the one or more speakers in a full audible frequency spectrum, and when the one or more speakers are idle, activating the second sound canceller process, the second sound canceller configured to cancel audio output from the one or more speakers in the identified frequency bands of the full audible frequency spectrum in which the audible tone in acknowledgment of the detected wake word has content.

The example implementation may also involve in response to detecting the wake word for the voice service and after activating either (a) the first sound canceller or (b) the second sound canceller, outputting the audible tone in acknowledgement of the detected wake word via the one or more speakers, and capturing, via the one or more microphones, second audio within the acoustic environment. The second audio includes sound produced by the one or more speakers in outputting the audible tone in acknowledgement of the detected wake word. The implementation may further involve cancelling the audible tone in acknowledgement of the detected wake word from the captured second audio using the activated audio canceller.

This example implementation may be embodied as a method, a device configured to carry out the implementation, a system of devices configured to carry out the implementation, or a non-transitory computer-readable medium containing instructions that are executable by one or more processors to carry out the implementation, among other examples. It will be understood by one of ordinary skill in the art that this disclosure includes numerous other embodiments, including combinations of the example features described herein. Further, any example operation described as being performed by a given device to illustrate a technique may be performed by any suitable devices, including the devices described herein. Yet further, any device may cause another device to perform any of the operations described herein.

While some examples described herein may refer to functions performed by given actors such as "users" and/or other entities, it should be understood that this description is for purposes of explanation only. The claims should not be interpreted to require action by any such example actor unless explicitly required by the language of the claims themselves.

II. Example Operating Environment

FIG. 1 illustrates an example configuration of a media playback system 100 in which one or more embodiments disclosed herein may be implemented. The media playback system 100 as shown is associated with an example home environment having several rooms and spaces, such as for example, an office, a dining room, and a living room. Within these rooms and spaces, the media playback system 100 includes playback devices 102 (identified individually as playback devices 102a-102l), network microphone devices 103 (identified individually as "NMD(s)" 103a-103g), and controller devices 104a and 104b (collectively "controller devices 104"). The home environment may include other network devices, such as one or more smart illumination devices 108 and a smart thermostat 110.

The various playback, network microphone, and controller devices 102-104 and/or other network devices of the media playback system 100 may be coupled to one another via point-to-point and/or over other connections, which may be wired and/or wireless, via a local area network (LAN) via a network router 106. For example, the playback device 102j (designated as "LEFT") may have a point-to-point connection with the playback device 102a (designated as "RIGHT"). In one embodiment, the LEFT playback device 102j may communicate over the point-to-point connection with the RIGHT playback device 102a. In a related embodiment, the LEFT playback device 102j may communicate with other network devices via the point-to-point connection and/or other connections via the LAN.

The network router 106 may be coupled to one or more remote computing device(s) 105 via a wide area network (WAN) 107. In some embodiments, the remote computing device(s) may be cloud servers. The remote computing device(s) 105 may be configured to interact with the media playback system 100 in various ways. For example, the remote computing device(s) may be configured to facilitate streaming and controlling playback of media content, such as audio, in the home environment. In one aspect of the technology described in greater detail below, the remote computing device(s) 105 are configured to provide an enhanced VAS 160 for the media playback system 100.

In some embodiments, one or more of the playback devices 102 may include an on-board (e.g., integrated) network microphone device. For example, the playback devices 102a-e include corresponding NMDs 103a-e, respectively. Playback devices that include network devices may be referred to herein interchangeably as a playback device or a network microphone device unless expressly stated otherwise.

In some embodiments, one or more of the NMDs 103 may be a stand-alone device. For example, the NMDs 103f and 103g may be stand-alone network microphone devices. A stand-alone network microphone device may omit components typically included in a playback device, such as a speaker or related electronics. In such cases, a stand-alone network microphone device might not produce audio output or may produce limited audio output (e.g., relatively low-quality output relative to quality of output by a playback device).

In some embodiments, one or more network microphone devices can be assigned to a playback device or a group of playback devices. In some embodiments, a network microphone device can be assigned to a playback device that does not include an onboard network microphone device. For example, the NMD 103f may be assigned to one or more of the playback devices 102 in its vicinity, such as one or both of the playback devices 102i and 102l in the kitchen and dining room spaces, respectively. In such a case, the NMD 103f may output audio through the playback device(s) to which it is assigned. Further details regarding assignment of network microphone devices are described, for example, in U.S. application Ser. No. 15/098,867 filed on Apr. 14, 2016, and titled "Default Playback Device Designation," and U.S. application Ser. No. 15/098,892 filed on Apr. 14, 2016 and titled "Default Playback Devices." Each of these applications is incorporated herein by reference in its entirety.

In some embodiments, a network microphone device may be configured such that it is dedicated exclusively to a particular VAS. In one example, the NMD 103a in the living room space may be dedicated exclusively to the enhanced VAS 160. In such case, the NMD 102a might not invoke any other VAS except the enhanced VAS 160. In a related example, other ones of the NMDs 103 may be configured to invoke the enhanced 160 VAS and one or more other VASes, such as a traditional VAS. Other examples of bonding and assigning network microphone devices to playback devices and/or VASes are possible. In some embodiments, the NMDs 103 might not be bonded or assigned in a particular manner.

Further aspects relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in other home environment configurations comprising more or fewer of any of the playback, network microphone, and/or controller devices 102-104. Additionally, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
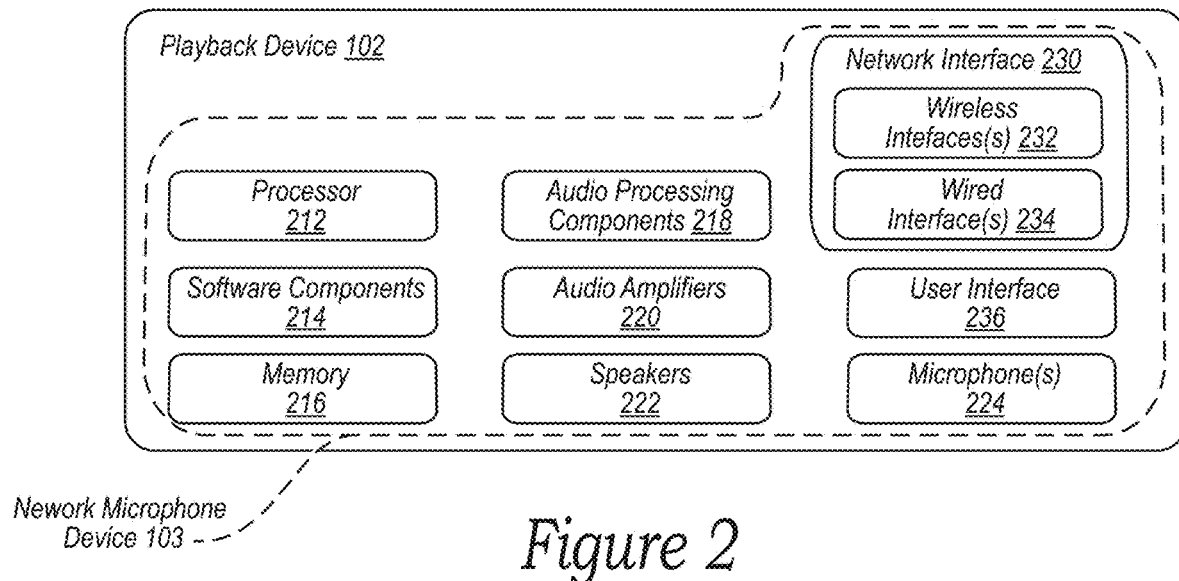
FIG. 2 is a functional block diagram of an example playback device.

FIG. 2 is a functional block diagram illustrating certain aspects of a selected one of the playback devices 102 shown in FIG. 1. As shown, such a playback device may include a processor 212, software components 214, memory 216, audio processing components 218, audio amplifier(s) 220, speaker(s) 222, and a network interface 230 including wireless interface(s) 232 and wired interface(s) 234. In some embodiments, a playback device might not include the speaker(s) 222, but rather a speaker interface for connecting the playback device to external speakers. In certain embodiments, the playback device includes neither the speaker(s) 222 nor the audio amplifier(s) 222, but rather an audio interface for connecting a playback device to an external audio amplifier or audio-visual receiver.

A playback device may further include a user interface 236. The user interface 236 may facilitate user interactions independent of or in conjunction with one or more of the controller devices 104. In various embodiments, the user interface 236 includes one or more of physical buttons and/or graphical interfaces provided on touch sensitive screen(s) and/or surface(s), among other possibilities, for a user to directly provide input. The user interface 236 may further include one or more of lights and the speaker(s) to provide visual and/or audio feedback to a user.

In some embodiments, the processor 212 may be a clock-driven computing component configured to process input data according to instructions stored in the memory 216. The memory 216 may be a tangible computer-readable medium configured to store instructions executable by the processor 212. For example, the memory 216 may be data storage that can be loaded with one or more of the software components 214 executable by the processor 212 to achieve certain functions. In one example, the functions may involve a playback device retrieving audio data from an audio source or another playback device. In another example, the functions may involve a playback device sending audio data to another device on a network. In yet another example, the functions may involve pairing of a playback device with one or more other playback devices to create a multi-channel audio environment.

Certain functions may involve a playback device synchronizing playback of audio content with one or more other playback devices. During synchronous playback, a listener should not perceive time-delay differences between playback of the audio content by the synchronized playback devices. U.S. Pat. No. 8,234,395 filed Apr. 4, 2004, and titled "System and method for synchronizing operations among a plurality of independently clocked digital data processing devices," which is hereby incorporated by reference in its entirety, provides in more detail some examples for audio playback synchronization among playback devices.

The memory 216 may be further configured to store data associated with a playback device. For example, the memory may store data corresponding to one or more zones and/or zone groups a playback device is a part of. One or more of the zones and/or zone groups may be named according to the room or space in which device(s) are located. For example, the playback and network microphone devices in the living room space shown in FIG. 1 may be referred to as a zone group named Living Room. As another example, the playback device 102l in the dining room space may be named as a zone "Dining Room." The zones and/or zone groups may also have uniquely assigned names, such as "Nick's Room," as shown in FIG. 1.

The memory 216 may be further configured to store other data. Such data may pertain to audio sources accessible by a playback device or a playback queue that the playback device (or some other playback device(s)) may be associated with. The data stored in the memory 216 may be stored as one or more state variables that are periodically updated and used to describe the state of the playback device. The memory 216 may also include the data associated with the state of the other devices of the media system, and shared from time to time among the devices so that one or more of the devices have the most recent data associated with the system. Other embodiments are also possible.

The audio processing components 218 may include one or more digital-to-analog converters (DAC), an audio preprocessing component, an audio enhancement component or a digital signal processor (DSP), and so on. In some embodiments, one or more of the audio processing components 218 may be a subcomponent of the processor 212. In one example, audio content may be processed and/or intentionally altered by the audio processing components 218 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback, the audio processing components 208 may be configured to process audio content to be sent to one or more other playback devices for playback.

Audio content to be processed and/or played back by a playback device may be received from an external source, such as via an audio line-in input connection (e.g., an auto-detecting 3.5 mm audio line-in connection) or the network interface 230.

The network interface 230 may be configured to facilitate a data flow between a playback device and one or more other devices on a data network. As such, a playback device may be configured to receive audio content over the data network from one or more other playback devices in communication with a playback device, network devices within a local area network, or audio content sources over a wide area network such as the Internet. In one example, the audio content and other signals transmitted and received by a playback device may be transmitted in the form of digital packet data containing an Internet Protocol (IP)-based source address and IP-based destination addresses. In such a case, the network interface 230 may be configured to parse the digital packet data such that the data destined for a playback device is properly received and processed by the playback device.

As shown, the network interface 230 may include wireless interface(s) 232 and wired interface(s) 234. The wireless interface(s) 232 may provide network interface functions for a playback device to wirelessly communicate with other devices (e.g., other playback device(s), speaker(s), receiver(s), network device(s), control device(s) within a data network the playback device is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 234 may provide network interface functions for a playback device to communicate over a wired connection with other devices in accordance with a communication protocol (e.g., IEEE 802.3). While the network interface 230 shown in FIG. 2 includes both wireless interface(s) 232 and wired interface(s) 234, the network interface 230 may in some embodiments include only wireless interface(s) or only wired interface(s).

In some embodiments, a playback device and one other playback device may be paired to play two separate audio components of audio content. For example, the LEFT playback device 102j in the Living Room may be configured to play a left channel audio component, while the RIGHT playback device 102a may be configured to play a right channel audio component, thereby producing or enhancing a stereo effect of the audio content. Similarly, the playback device 102l designated to the Dining Room may be configured to play a left channel audio component, while the playback device 102i designated to the Kitchen may be configured to play a right channel audio component. Paired playback devices may further play audio content in synchrony with other playback devices. Paired playback device may also be referred to as "bonded playback devices.

In some embodiments, one or more of the playback devices may be sonically consolidated with one or more other playback devices to form a single, consolidated playback device. A consolidated playback device may include separate playback devices each having additional or different speaker drivers through which audio content may be rendered. For example, a playback device designed to render low frequency range audio content (e.g., the playback device 102k designated as a subwoofer or "SUB") may be consolidated with a full-frequency playback device (e.g., the playback device 102b designated as "FRONT") to render the lower frequency range of the consolidated device. In such a case, the full frequency playback device, when consolidated with the low frequency playback device, may be configured to render only the mid and high frequency components of audio content, while the low-frequency playback device renders the low frequency component of the audio content. The consolidated playback device may be paired or consolidated with one or more other playback devices. For example, FIG. 1 shows the SUB playback device 102k consolidated with the FRONT playback device 102b to form subwoofer and center channels, and further consolidated with the RIGHT playback device 102a and the LEFT playback device 102j.

As discussed above, a playback device may include a network microphone device, such as one of the NMDs 103, as show in FIG. 2. A network microphone device may share some or all the components of a playback device, such as the processor 212, the memory 216, the microphone(s) 224, etc. In other examples, a network microphone device includes components that are dedicated exclusively to operational aspects of the network microphone device. For example, a network microphone device may include far-field microphones and/or voice processing components, which in some instances a playback device may not include. In another example, a network microphone device may include a touch-sensitive button for enabling/disabling a microphone. In yet another example, a network microphone device can be a stand-alone device, as discussed above.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the media playback system 100 may be established with one or more playback zones, after which one or more of the playback and/or network devices 102-103 may be added or removed to arrive at the example configuration shown in FIG. 1. As discussed above, zones and zone groups may be given a unique name and/or a name corresponding to the space in which device(s) are located.

In one example, one or more playback zones in the environment of FIG. 1 may each be playing different audio content. For instance, the user may be grilling in the Balcony zone and listening to hip hop music being played by the playback device 102c while another user is preparing food in the Kitchen zone and listening to classical music being played by the playback device 102i. In another example, a playback zone may play the same audio content in synchrony with another playback zone. For instance, the user may be in the Office zone where the playback device 102d is playing the same hip-hop music that is being playing by playback device 102c in the Balcony zone. In such a case, playback devices 102c and 102d may be playing the hip-hop in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

A network microphone device may receive voice inputs from a user in its vicinity. A network microphone device may capture a voice input upon detection of the user speaking the input. For instance, in the example shown in FIG. 1, the NMD 103a may capture the voice input of a user in the vicinity of the Living Room, Dining Room, and/or Kitchen zones. In some instances, other network microphone devices in the home environment, such as the NMD 104f in the Kitchen and/or the other NMD 104b in the Living Room may capture the same voice input. In such instances, network devices that detect the voice input may be configured to arbitrate between one another so that fewer or only the most proximate one of the NMDs 103 process the user's voice input. Other examples for selecting network microphone devices for processing voice input can be found, for example, in U.S. patent application Ser. No. 15/171,180 fled Jun. 9, 2016, and titled "Dynamic Player Selection for Audio Signal Processing" and U.S. patent application Ser. No. 15/211,748 filed Jul. 15, 2016, and titled "Voice Detection by Multiple Devices." Each of these references is incorporated herein by reference in its entirety. A network microphone device may control selected playback and/or network microphone devices 102-103 in response to voice inputs, as described in greater detail below.

As suggested above, the zone configurations of the media playback system 100 may be dynamically modified. As such, the media playback system 100 may support numerous configurations. For example, if a user physically moves one or more playback devices to or from a zone, the media playback system 100 may be reconfigured to accommodate the change(s). For instance, if the user physically moves the playback device 102c from the Balcony zone to the Office zone, the Office zone may now include both the playback devices 102c and 102d. In some cases, the use may pair or group the moved playback device 102c with the Office zone and/or rename the players in the Office zone using, e.g., one of the controller devices 104 and/or voice input. As another example, if one or more playback devices 102 are moved to a particular area in the home environment that is not already a playback zone, the moved playback device(s) may be renamed or associated with a playback zone for the particular area.

Further, different playback zones of the media playback system 100 may be dynamically combined into zone groups or split up into individual playback zones. For example, the Dining Room zone and the Kitchen zone may be combined into a zone group for a dinner party such that playback devices 102i and 102l may render audio content in synchrony. As another example, playback devices 102 consolidated in the Living Room zone for the previously described consolidated TV arrangement may be split into (i) a television zone and (ii) a separate listening zone. The television zone may include the FRONT playback device 102b. The listening zone may include the RIGHT, LEFT, and SUB playback devices 102a, 102j, and 102k, which may be grouped, paired, or consolidated, as described above. Splitting the Living Room zone in such a manner may allow one user to listen to music in the listening zone in one area of the living room space, and another user to watch the television in another area of the living room space. In a related example, a user may implement either of the NMD 103a or 103b to control the Living Room zone before it is separated into the television zone and the listening zone. Once separated, the listening zone may be controlled by a user in the vicinity of the NMD 103a, and the television zone may be controlled by a user in the vicinity of the NMD 103b. As described above, however, any of the NMDs 103 may be configured to control the various playback and other devices of the media playback system 100.

c. Example Controller Devices

Figure 3:
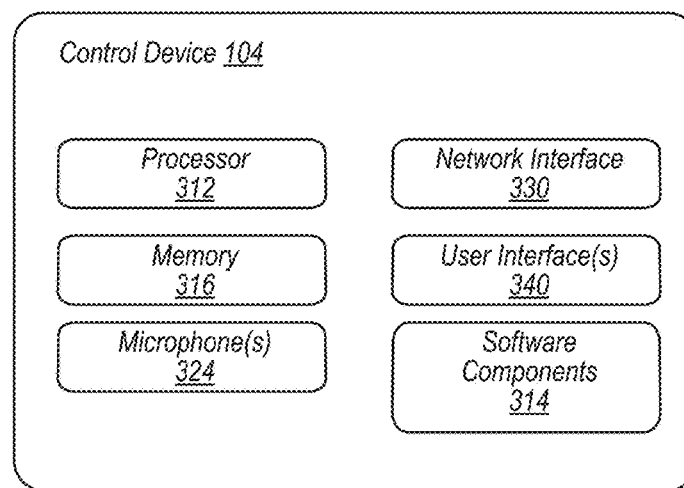
FIG. 3 is a functional block diagram of an example controller device.

FIG. 3 is a functional block diagram illustrating certain aspects of a selected one of the controller devices 104 of the media playback system 100 of FIG. 1. Such controller devices may also be referred to as a controller. The controller device shown in FIG. 3 may include components that are generally similar to certain components of the network devices described above, such as a processor 312, memory 316, microphone(s) 324, and a network interface 330. In one example, a controller device may be a dedicated controller for the media playback system 100. In another example, a controller device may be a network device on which media playback system controller application software may be installed, such as for example, an iPhone™, iPad™ or any other smart phone, tablet or network device (e.g., a networked computer such as a PC or Mac™)

The memory 316 of a controller device may be configured to store controller application software and other data associated with the media playback system 100 and a user of the system 100. The memory 316 may be loaded with one or more software components 314 executable by the processor 312 to achieve certain functions, such as facilitating user access, control, and configuration of the media playback system 100. A controller device communicates with other network devices over the network interface 330, such as a wireless interface, as described above.

In one example, data and information (e.g., such as a state variable) may be communicated between a controller device and other devices via the network interface 330. For instance, playback zone and zone group configurations in the media playback system 100 may be received by a controller device from a playback device, a network microphone device, or another network device, or transmitted by the controller device to another playback device or network device via the network interface 306. In some cases, the other network device may be another controller device.

Playback device control commands such as volume control and audio playback control may also be communicated from a controller device to a playback device via the network interface 330. As suggested above, changes to configurations of the media playback system 100 may also be performed by a user using the controller device. The configuration changes may include adding/removing one or more playback devices to/from a zone, adding/removing one or more zones to/from a zone group, forming a bonded or consolidated player, separating one or more playback devices from a bonded or consolidated player, among others.

Figures 4A, 4B:
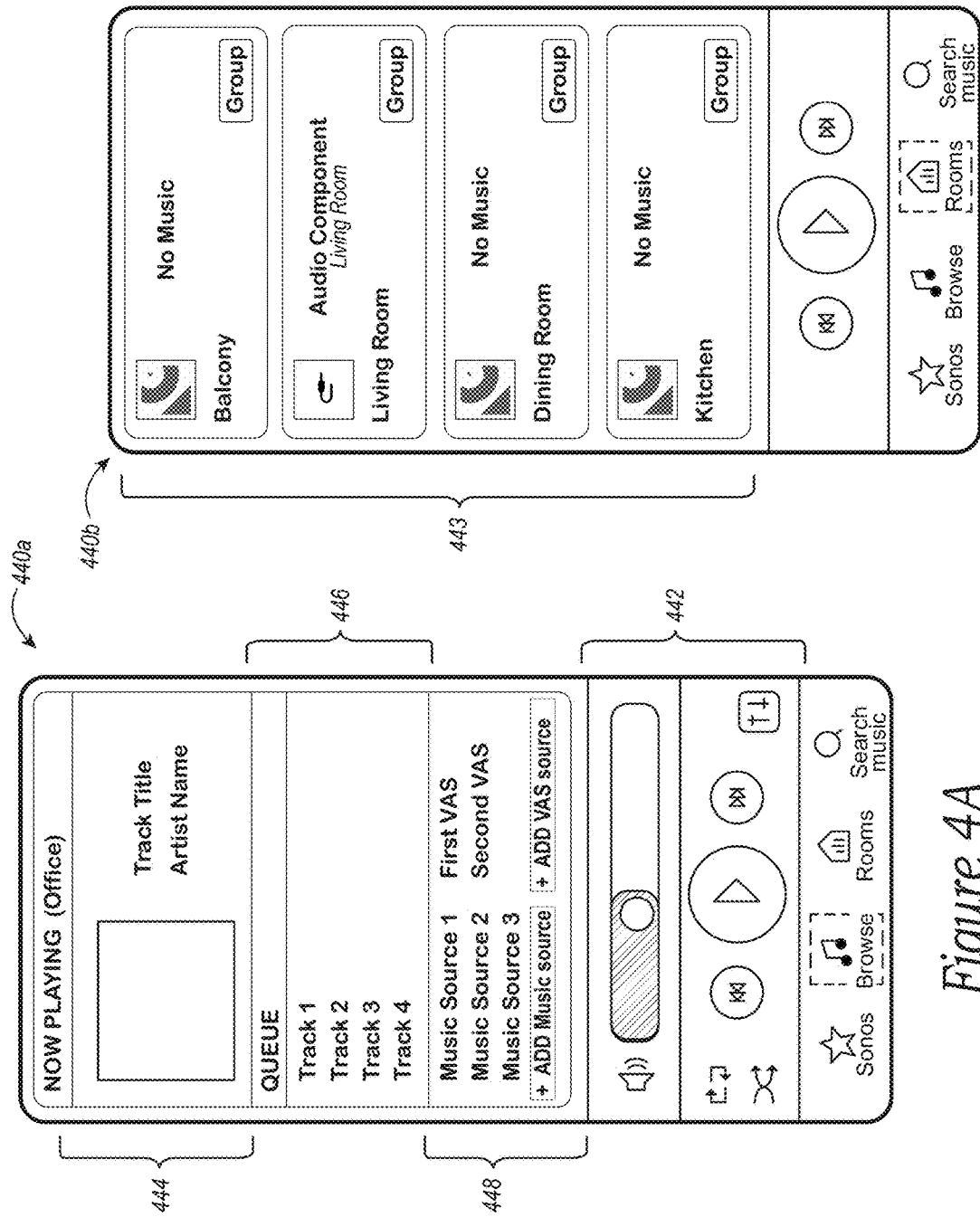
FIGS. 4A and 4B are controller interfaces.

The user interface(s) 340 of a controller device may be configured to facilitate user access and control of the media playback system 100, by providing controller interface(s) such as the controller interfaces 400a and 400b (collectively "controller interface 440") shown in FIGS. 4A and 4B, respectively. Referring to FIGS. 4A and 4B together, the controller interface 440 includes a playback control region 442, a playback zone region 443, a playback status region 444, a playback queue region 446, and a sources region 448. The user interface 400 as shown is just one example of a user interface that may be provided on a network device such as the controller device shown in FIG. 3 and accessed by users to control a media playback system such as the media playback system 100. Other user interfaces of varying formats, styles, and interactive sequences may alternatively be implemented on one or more network devices to provide comparable control access to a media playback system.

The playback control region 442 (FIG. 4A) may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 442 may also include selectable icons to modify equalization settings, and playback volume, among other possibilities.

The playback zone region 443 (FIG. 4B) may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 443 (FIG. 4B) may be dynamically updated as playback zone or zone group configurations are modified.

The playback status region 444 (FIG. 4A) may include graphical representations of audio content that is presently being played, previously played, or scheduled to play next in the selected playback zone or zone group. The selected playback zone or zone group may be visually distinguished on the user interface, such as within the playback zone region 443 and/or the playback status region 444. The graphical representations may include track title, artist name, album name, album year, track length, and other relevant information that may be useful for the user to know when controlling the media playback system via the user interface 440.

The playback queue region 446 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be re-associated with a new playback queue that is empty, or contains audio items from the playback queue associated with the established zone group before the established zone group was ungrouped. Other examples are also possible.

With reference still to FIGS. 4A and 4B, the graphical representations of audio content in the playback queue region 446 (FIG. 4B) may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device. Playback of such a playback queue may involve one or more playback devices playing back media items of the queue, perhaps in sequential or random order.

The sources region 448 may include graphical representations of selectable audio content sources and selectable voice assistants associated with a corresponding VAS. The VASes may be selectively assigned. In some examples, multiple VASes, such as AMAZON's ALEXA® and another voice service, may be invokable by the same network microphone device. In some embodiments, a user may assign a VAS exclusively to one or more network microphone devices, as discussed above. For example, a user may assign first VAS to one or both of the NMDs 102a and 102b in the living room space shown in FIG. 1, and a second VAS to the NMD 103f in the kitchen space. Other examples are possible.

d. Example Audio Content Sources

The audio sources in the sources region 448 may be audio content sources from which audio content may be retrieved and played by the selected playback zone or zone group. One or more playback devices in a zone or zone group may be configured to retrieve for playback audio content (e.g., according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a controller device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

e. Example Network Microphone Devices

Figure 5A:
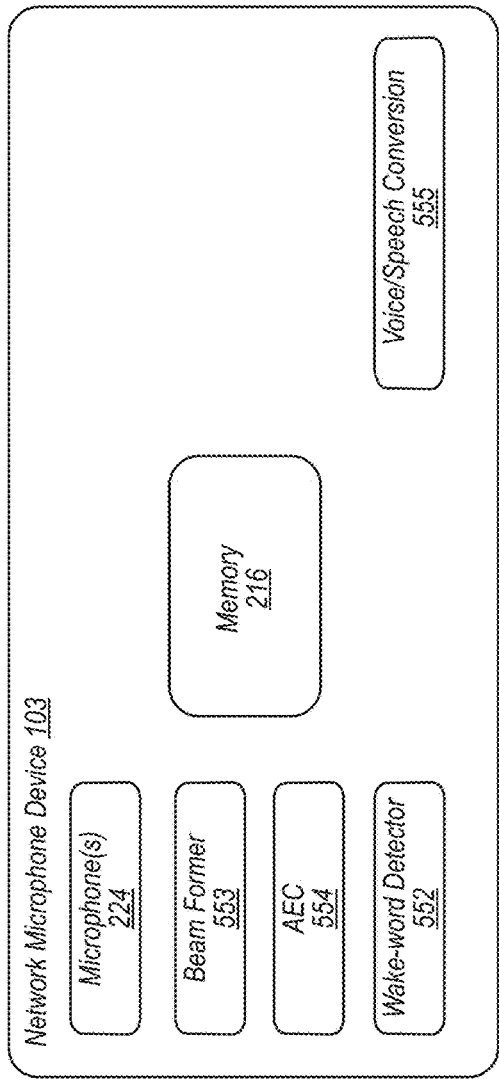
FIG. 5A is a functional block diagram of an example network microphone device in accordance with aspects of the disclosure.

FIG. 5A is a functional block diagram showing additional features of one or more of the NMDs 103 in accordance with aspects of the disclosure. The network microphone device shown in FIG. 5A may include components that are generally similar to certain components of network microphone devices described above, such as the processor 212 (FIG. 2), network interface 230 (FIG. 2), microphone(s) 224, and the memory 216. Although not shown for purposes of clarity, a network microphone device may include other components, such as speakers, amplifiers, signal processors, as discussed above.

The microphone(s) 224 may be a plurality of microphones arranged to detect sound in the environment of the network microphone device. In one example, the microphone(s) 224 may be arranged to detect audio from one or more directions relative to the network microphone device. The microphone(s) 224 may be sensitive to a portion of a frequency range. In one example, a first subset of the microphone(s) 224 may be sensitive to a first frequency range, while a second subset of the microphone(2) 224 may be sensitive to a second frequency range. The microphone(s) 224 may further be arranged to capture location information of an audio source (e.g., voice, audible sound) and/or to assist in filtering background noise. Notably, in some embodiments the microphone(s) 224 may have a single microphone rather than a plurality of microphones.

A network microphone device may further include wake-word detector 552, beam former 553, acoustic echo canceller (AEC) 554, and speech/text conversion 555 (e.g., voice-to-text and text-to-voice). In various embodiments, one or more of the wake-word detector 552, beam former 553, AEC 554, and speech/text conversion 555 may be a subcomponent of the processor 212, or implemented in software stored in memory 216 which is executable by the processor 212.

The wake-word detector 552 is configured to monitor and analyze received audio to determine if any wake words are present in the audio. The wake-word detector 552 may analyze the received audio using a wake word detection algorithm. If the wake-word detector 552 detects a wake word, a network microphone device may process voice input contained in the received audio. Example wake word detection algorithms accept audio as input and provide an indication of whether a wake word is present in the audio. Many first- and third-party wake word detection algorithms are known and commercially available. For instance, operators of a voice service may make their algorithm available for use in third-party devices. Alternatively, an algorithm may be trained to detect certain wake-words.

In some embodiments, the wake-word detector 552 runs multiple wake word detections algorithms on the received audio simultaneously (or substantially simultaneously). As noted above, different voice services (e.g. AMAZON's ALEXA®, APPLE's SIRI®, or MICROSOFT's CORTANA®) each use a different wake word for invoking their respective voice service. To support multiple services, the wake word detector 552 may run the received audio through the wake word detection algorithm for each supported voice service in parallel.

The beam former 553 and AEC 554 are configured to detect an audio signal and determine aspects of voice input within the detect audio, such as the direction, amplitude, frequency spectrum, etc. For example, the beam former 553 and AEC 554 may be used in a process to determine an approximate distance between a network microphone device and a user speaking to the network microphone device. In another example, a network microphone device may detective a relative proximity of a user to another network microphone device in a media playback system.

Figure 5B:
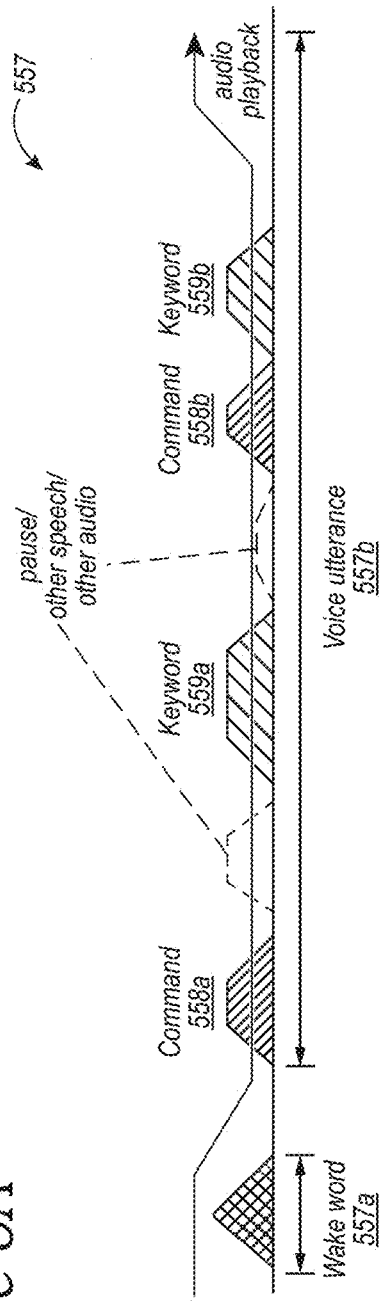
FIG. 5B is a diagram of an example voice input in accordance with aspects of the disclosure.

FIG. 5B is a diagram of an example voice input in accordance with aspects of the disclosure. The voice input may be captured by a network microphone device, such as by one or more of the NMDs 103 shown in FIG. 1. The voice input may include a wake word portion 557a and a voice utterance portion 557b (collectively "voice input 557"). In some embodiments, the wake word 557a can be a known wake word, such as "Alexa," which is associated with AMAZON's ALEXA®).

In some embodiments, a network microphone device may output an audible and/or visible response upon detection of the wake word portion 557a. In addition or alternately, a network microphone device may output an audible and/or visible response after processing a voice input and/or a series of voice inputs (e.g., in the case of a multi-turn request).

The voice utterance portion 557b may include, for example, one or more spoken commands 558 (identified individually as a first command 558a and a second command 558b) and one or more spoken keywords 559 (identified individually as a first keyword 559a and a second keyword 559b). In one example, the first command 557a can be a command to play music, such as a specific song, album, playlist, etc. In this example, the keywords 559 may be one or words identifying one or more zones in which the music is to be played, such as the Living Room and the Dining Room shown in FIG. 1. In some examples, the voice utterance portion 557b can include other information, such as detected pauses (e.g., periods of non-speech) between words spoken by a user, as shown in FIG. 5B. The pauses may demarcate the locations of separate commands, keywords, or other information spoke by the user within the voice utterance portion 557b.

In some embodiments, the media playback system 100 is configured to temporarily reduce the volume of audio content that it is playing while detecting the wake word portion 557a. The media playback system 100 may restore the volume after processing the voice input 557, as shown in FIG. 5B. Such a process can be referred to as ducking, examples of which are disclosed in U.S. patent application Ser. No. 15/277,810 filed Sep. 27, 2016 and titled "Audio Playback Settings for Voice Interaction," which is incorporated herein by reference in its entirety.

f. Example Network System

Figure 6:
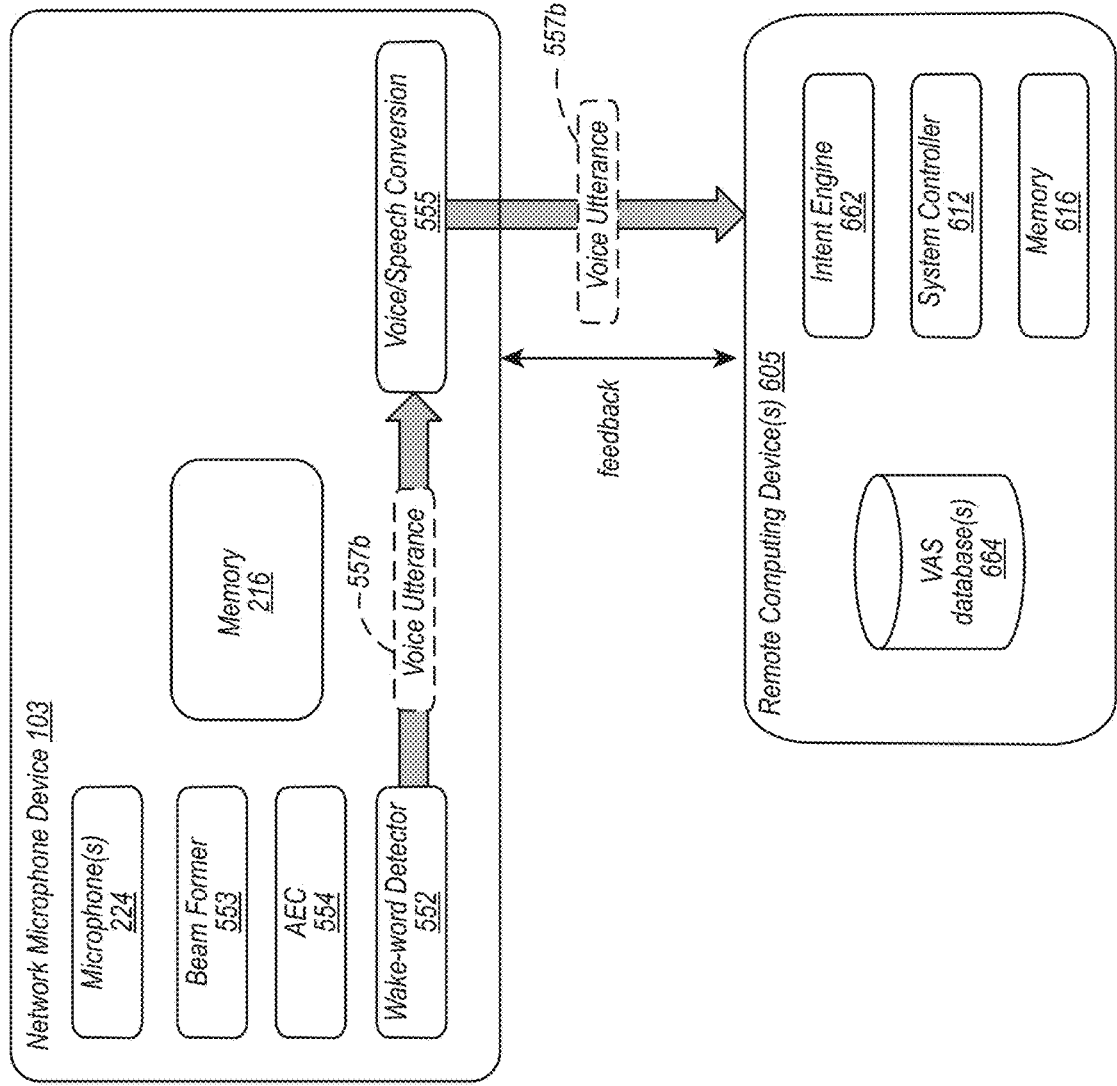
FIG. 6 is a functional block diagram of example remote computing device(s) in accordance with aspects of the disclosure.
Figure 7:
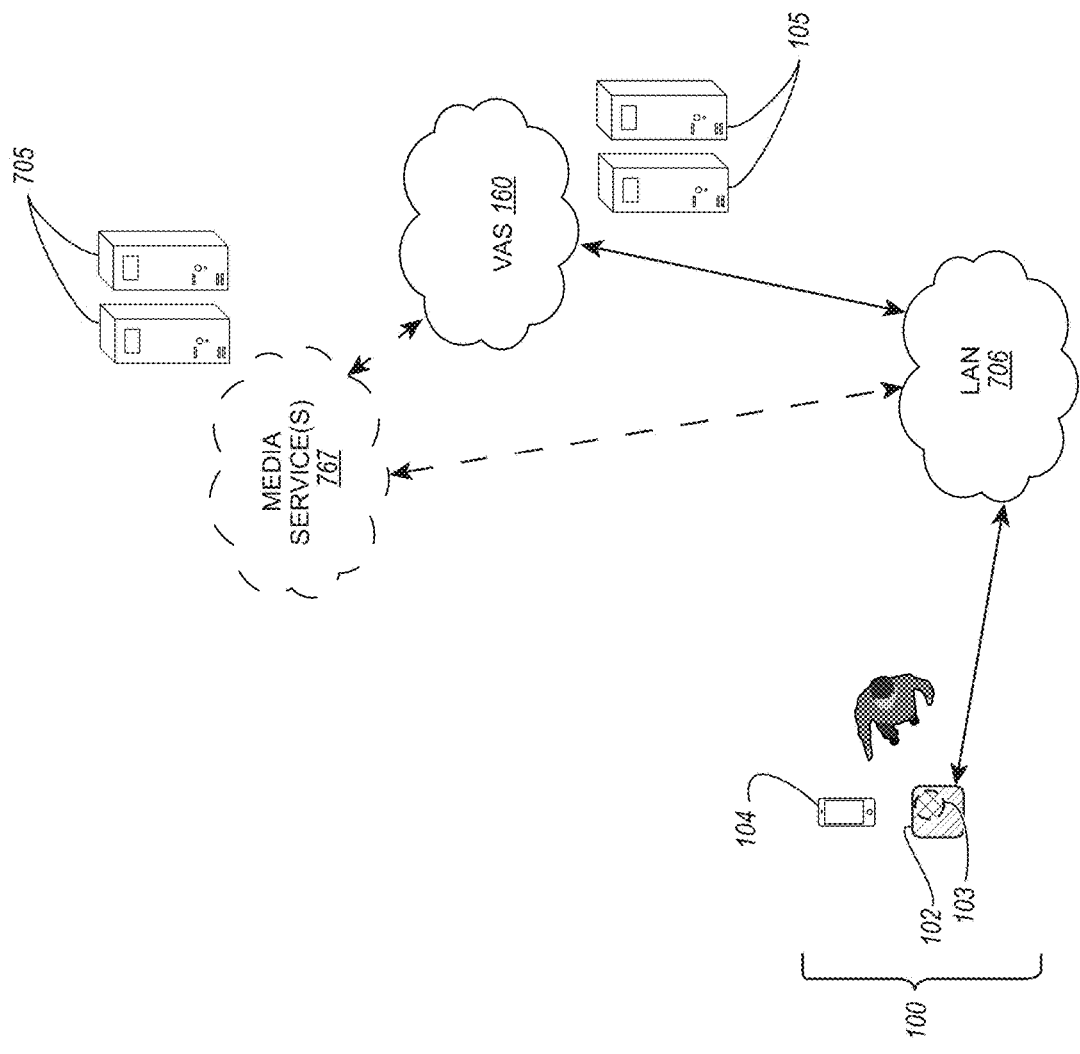
FIG. 7 is a schematic diagram of an example network system in accordance with aspects of the disclosure.

FIG. 6 is a functional block diagram showing additional details of the remote computing device(s) 105 in FIG. 1. In various embodiments, the remote computing device(s) 105 may receive voice inputs from one or more of the NMDs 103 over the WAN 107 shown in FIG. 1. For purposes of illustration, selected communication paths of the voice input 557 (FIG. 5B) are represented by arrows in FIG. 6. In one embodiment, the voice input 557 processed by the remote computing device(s) 105 may include the voice utterance portion 557b (FIG. 5B). In another embodiment, the processed voice input 557 may include both the voice utterance portion 557b and the wake word 557a (FIG. 5B)

The remote computing device(s) 105 include a system controller 612 comprising one or more processors, an intent engine 602, and a memory 616. The memory 616 may be a tangible computer-readable medium configured to store instructions executable by the system controller 612 and/or one or more of the playback, network microphone, and/or controller devices 102-104.

The intent engine 662 is configured to process a voice input and determine an intent of the input. In some embodiments, the intent engine 662 may be a subcomponent of the system controller 612. The intent engine 662 may interact with one or more database(s), such as one or more VAS database(s) 664, to process voice inputs. The VAS database(s) 664 may reside in the memory 616 or elsewhere, such as in memory of one or more of the playback, network microphone, and/or controller devices 102-104. In some embodiments, the VAS database(s) 664 may be updated for adaptive learning and feedback based on the voice input processing. The VAS database(s) 664 may store various user data, analytics, catalogs, and other information for NLU-related and/or other processing.

The remote computing device(s) 105 may exchange various feedback, information, instructions, and/or related data with the various playback, network microphone, and/or controller devices 102-104 of the media playback system 100. Such exchanges may be related to or independent of transmitted messages containing voice inputs. In some embodiments, the remote computing device(s) 105 and the media playback system 100 may exchange data via communication paths as described herein and/or using a metadata exchange channel as described in U.S. application Ser. No. 15/131,244 filed Apr. 18, 2016, and titled "Metadata exchange involving a networked playback system and a networked microphone system, which is incorporated by reference in its entirety.

Processing of a voice input by devices of the media playback system 100 may be carried out at least partially in parallel with processing of the voice input by the remote computing device(s) 105. Additionally, the speech/text conversion components 555 of a network microphone device may convert responses from the remote computing device(s) 105 to speech for audible output via one or more speakers.

FIG. 1 illustrates an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. For example, the media playback system 100 includes playback devices 102 (identified individually as playback devices 102a-102l), controller devices 103a and 103b (collectively "controller devices 103"), and network microphone devices 104 ("NMDs"); identified individually as NMDs 104a-104g), and a wired or wireless network router 106.

In some examples, one or more individual playback devices 102 can have an on-board (e.g., integrated) NMD, such as one of the playback devices 102a-e, which include corresponding NMDs 104a-e, respectively. In some instances, an NMD can be a stand-alone device, such as the NMD 104f or the NMD 10fg. A stand-alone NMD may omit components, such as a speaker or related electronics, in which case it might not produce audio output or may produce limited audio output (e.g., relatively low quality output relative to the quality of output by a playback device). For instance, a playback device might have more transducers and/or larger transducers (e.g., a woofer) and/or more powerful amplifiers as compared with a stand-alone NMD so as to produce a higher quality output than the stand-alone NMD.

In some examples, one or more NMDs can be assigned to a playback device, a group, and/or or a bonded-set of playback devices. For instance, the NMD 104f may be assigned to the playback device 102a in the living room and/or the playback device 102i in the kitchen. In such implementations, the NMD may be assigned to a single voice assistant service, such as AMAZON® Alexa® or another voice assistant service. Further details regarding assignment of playback devices and NMDs are described, for example, in: application Ser. No. 15/098,867 filed on Apr. 14, 2016, titled "Default Playback Device Designation;" application Ser. No. 15/098,892 filed on Apr. 14, 2016, titled "Default Playback Devices;" application Ser. No. 15/237,133, titled "Audio Response Playback;" and application Ser. No. 15/229,855 filed on Aug. 5, 2016, titled "Determining Direction of Networked Microphone Device Relative to Audio Playback Device." Each of these applications are incorporated by reference in their entirety.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

Figure 8A:
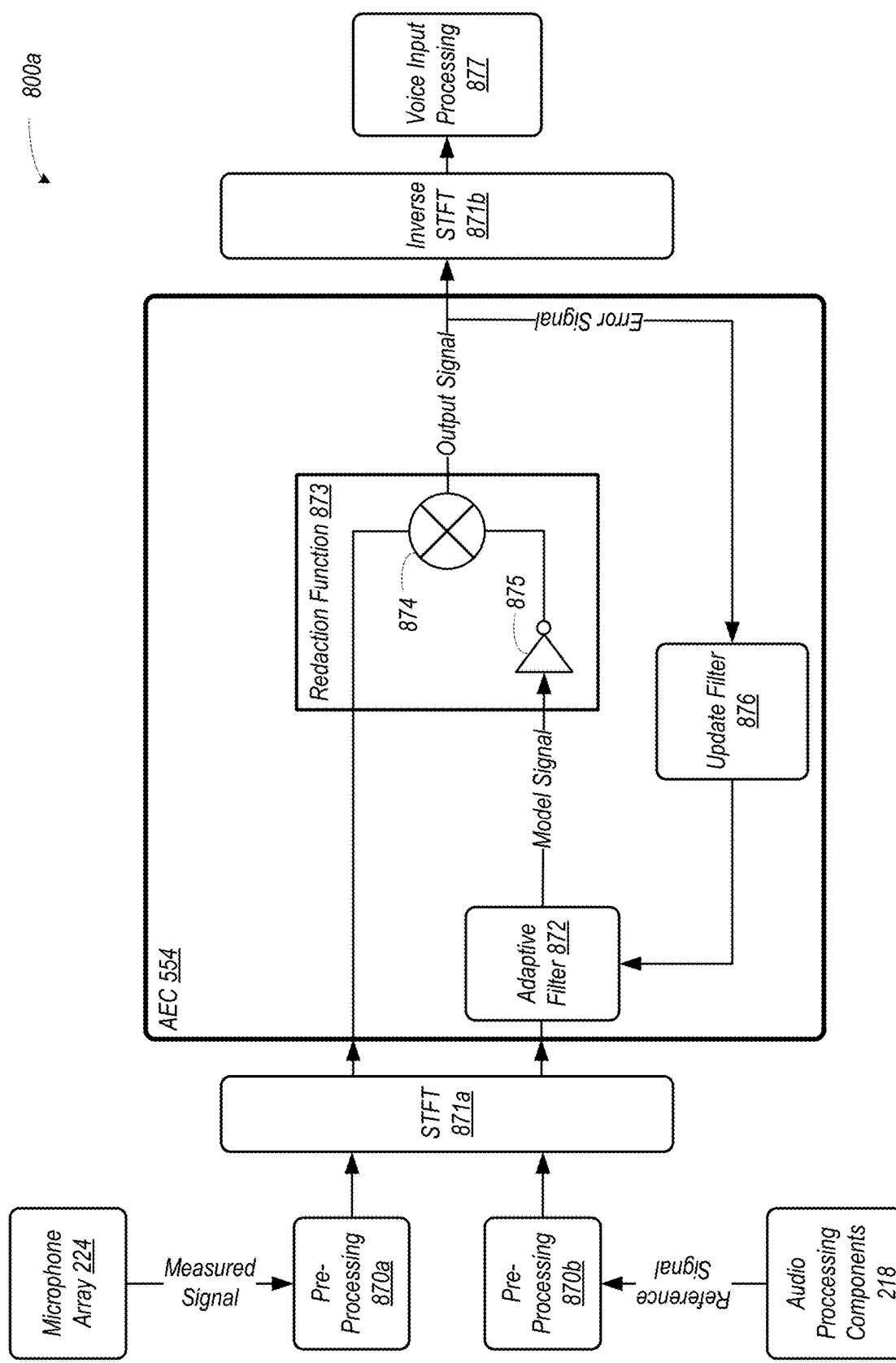
FIG. 8A is a functional block diagram of an example acoustic echo cancellation pipeline.

III. Example Acoustic Echo Cancellation Techniques a. First Example Acoustic Echo Cancellation Pipeline As discussed above, some embodiments described herein may involve acoustic echo cancellation. FIG. 8A is a functional block diagram of an acoustic echo cancellation pipeline 800a configured to be implemented within a playback device that includes a NMD, such as NMDs 103a-e. By way of example, the acoustic echo cancellation pipeline 800a is described as being implemented within playback device 102 of FIG. 2. However, in other implementations, the acoustic echo cancellation pipeline 800a may be implemented in an NMD that is not necessarily a playback device (e.g., a device that doesn't include speakers, or includes relatively low-output speakers configured to provide audio feedback to voice inputs), such as NMDs 103f-g.

In operation, acoustic echo cancellation pipeline 800a is activated when playback device 102 is playing back audio content. As noted above, acoustic echo cancellation can be used to remove acoustic echo (i.e., the sound of the audio playback and reflections and/or other acoustic artifacts from the acoustic environment) from the signal captured by microphone(s) of the networked microphone device. When effective, acoustic echo cancellation improves the signal-to-noise ratio of a voice input with respect to other sound within the acoustic environment. In some implementations, when audio playback is paused or otherwise idle, the acoustic echo cancellation pipeline 800a is bypassed or otherwise disabled.

As shown in FIG. 8A, the microphone array 224 is configured to capture a "measured signal," which is an input to the acoustic echo cancellation pipeline 800a. As described above in reference to FIGS. 2 and 5, the microphone array 224 can be configured to capture audio within an acoustic environment in an attempt to detect voice inputs (e.g., wake-words and/or utterances) from one or more users. When the playback device 102 plays back audio content via speakers 222 (FIG. 2), the microphone array 224 can capture audio that also includes audio signals representing sound produced by speakers 222 in playing back the audio content, as well as other sound being produced within the acoustic environment.

At block 870a, the measured signal is pre-processed in advance of acoustic echo cancellation. Pre-processing of the measured signal may involve analog-to-digital conversion of the microphone array signals. Other pre-processing may include sample rate conversion, de-jittering, de-interleaving, or filtering, among other examples. The term "measured signal" is generally used to refer to the signal captured by the microphone array 224 before and after any pre-processing.

As shown in FIG. 8A, another input to the acoustic echo cancellation pipeline 800a is a "reference signal." The reference signal can represent the audio content being played back by the speakers 222 (FIG. 2). As shown, the reference signal is routed form the audio processing components 218. In an effort to more closely represent the audio content being played back by the speakers 222, the reference signal is sourced from a point in an audio processing pipeline of the audio processing components 218 that closely represents the expected analog audio output of the speakers 222. Since each stage of an audio processing pipeline may introduce artifacts, the point in the audio processing pipeline of the audio processing components 218 that closely represents the expected analog audio output of the speakers 222 is typically near the end of the pipeline.

As noted above, although the acoustic echo cancellation pipeline 800a is shown by way of example as being illustrated within the playback device 102, the acoustic echo cancellation pipeline 800a may alternatively be implemented within a dedicated NMD such as NMD 103f-g of FIG. 1. In such examples, the reference signal may sent from the playback device(s) that are playing back audio content to the NMD, perhaps via a network interface or other communications interface, such as a line-in interface.

At block 870b, the reference signal is pre-processed in advance of acoustic echo cancellation. Pre-processing of the reference signal may involve sample rate conversion, de-jittering, de-interleaving, time-delay, or filtering, among other examples. The term "measured signal" is generally used to refer to the signal captured by the microphone array 224 before and after any pre-processing.

Pre-processing the measured signal and the reference signals readies the signals for mixing during acoustic echo cancellation. For instance, since audio content is output by the speakers 222 before the microphone array 224 captures a representation of that same content, time-delay is introduced to the reference signal to time-align the measured and reference signals. Similarly, since the respective sample rates of analog-to-digital conversation of the analog microphone signals and the reference signal from the audio processing components 218 may be different, sample rate conversation of one or both of the signals may convert the signal(s) into the same or otherwise compatible sample rates. In some examples, other similar pre-processing is performed in blocks 870a and 870b to render the measured signals and reference signals compatible.

At block 871a, the measured and reference signals are converted into the short-time Fourier transform domain. Acoustic echo cancellation in the STFT domain may lessen the processing requirements of acoustic echo cancellation as compared with acoustic echo cancellation in other domains, such as the Frequency-Dependent Adaptive Filter ("FDAF") domain. As such, by processing in the STFT domain, additional techniques for acoustic echo cancellation may become practical. However, while acoustic echo cancellation is shown in the STFT domain by way of example, AEC in other domains (e.g., the FDAF domain) can be implemented in alternative examples.

As those of ordinary skill in the art will appreciate, a STFT is a transform used to determine the sinusoidal frequency and phase content of local sections (referred to as "frames" or "blocks") of a signal as it changes over time. To compute STFTs of the measured and reference signals, each signal is divided into a plurality of frames. In an example implementation, each frame is 16 milliseconds (ms) long. The number of samples in a 16 ms frame may vary based on the sample rate of the measured and reference signals.

Given a signal x(n), the signal is transformed to the STFT domain by:

$$X_k[m] = \Sigma_{n+0}^{N-1} \times [n+mR] w_A[n] \omega_N^{kn},$$

where k is the frequency index, m is the frame index, N is the frame size, R is the frame shift size, $w_A[n]$ is an analysis window of size N, and $$\omega_N = \exp\left(-j\frac{2\pi}{N}\right).$$

Referring now to AEC 554 (FIG. 5A), after being converted into the STFT domain, the measured and reference signals are provided as input to the AEC 554, as shown in FIG. 8A. The acoustic echo cancellation performed by the AEC 554 on the measured signal is an iterative process. Each iteration of the AEC processes a respective frame of the measured signal using a respective frame of the reference signal. Such processing includes passing a frame of the reference signal through the adaptive filter 872 to yield a frame of a model signal. The adaptive filter 872 is intended to transform the reference signal into the measured signal with minimal error. In other words, the model signal is an estimate of the acoustic echo.

To cancel the acoustic echo from the measured signal, the measured signal and the model signal are provided to a redaction function 873. The redaction function 873 redacts the model signal from the measured signal, thereby cancelling the estimated acoustic echo from the measured signal yielding an output signal. In some examples, the redaction function 873 redacts the model signal from the measured signal by inverting the model signal via inverter 874 and mixing the inverted model signal with a frame of the measured signal with mixer 875. In effect, this mixing removes the audio playback (the reference signal) from the measured signal, thereby cancelling the echo (i.e., the audio playback and associated artifacts) from the measured signal. Alternate implementations may use other techniques for redaction.

At block 871b, the output signal of AEC 554 is transformed back by applying the inverse STFT. The inverse STFT is applied by:

$$x[n] = \Sigma_m \Sigma_{k=0}^{N-1} X_k[m] w_S[n-mR] \omega_N^{-k(n-mR)},$$

where $w_s[n]$ is a synthesis window.

After block 871b, the output signal is provided to a voice input processing pipeline at block 877. Voice input processing may involve wake word detection, voice/speech conversion, and/or sending one or more voice utterances to a voice assistant service, among other examples.

Turning now in more detail to internal aspects of the AEC 554, at block 872, the reference signal in the STFT domain is passed through the adaptive filter 872. As noted above, the adaptive filter 872 is a transfer function that adapts during each iteration of the AEC 554 in an attempt to transform the reference signal into the measured signal with diminishing error. Passing a frame of the reference signal through adaptive filter 872 yields a frame of a model signal. The model signal is an estimate of the acoustic echo of the reference signal (i.e., the audio that is being cancelled).

Within examples, adaptive filter 872 implements multi-delay adaptive filtering. To illustrate example multi-delay adaptive filtering, let N be the multi-delay filter (MDF) block size, K be the number of blocks and $F_{2N}$ denote the 2N×2N Fourier transform matrix, and the frequency-domain signals for frame m are:

$$e(m)=F_{2N}[0_{1\times N}, e(mN), \ldots, e(mN+N-1)]^T,$$

$$X_k(m)=\text{diag}\{F_{2N}[x((m-k-1)N-1), \ldots, x((m-k+1)N-1)]^T\},$$

$$d(m)=F_{2N}[0_{1\times N}, d(mN), \ldots, d(mN+N-1)]^T,$$

where d(m) is the modeled signal, e(m) is the modeling error, and $X_k$ (m) is the measured signal. The MDF algorithm then becomes:

$$e(m)=d(m)-\hat{y}(m),$$

$$\hat{y}(m)=\Sigma_{k=0}^{K-1} G_1 X_k(m) \hat{h}_k(m-1),$$

with model update:

$$\forall k: \hat{h}_k(m)=\hat{h}_k(m-1)+G_2\mu_m(m)\nabla \hat{h}_k(m), \text{ and}$$

$$\nabla \hat{h}_k(m)=P_{X_k X_k}^{-1}(m) X_k^H(m) e(m),$$

where $G_1$ and $G_2$ are matrices which select certain time-domain parts of the signal in the frequency domain, $$G_1 = F_{2N} \begin{bmatrix} 0_{N\times N} & 0_{N\times N} \\ 0_{N\times N} & I_{N\times N} \end{bmatrix} F_{2N}^{-1}, \text{ and}$$

$$G_2 = F_{2N} \begin{bmatrix} I_{N\times N} & 0_{N\times N} \\ 0_{N\times N} & 0_{N\times N} \end{bmatrix} F_{2N}^{-1}.$$

The matrix $P_{X_k X_k}(m)=X_k^H(m)X_k(m)$ is a diagonal approximation of the input power spectral density matrix. To reduce the variance of the power spectrum estimate, the instantaneous power estimate can be substituted by its smoothed version, $$P_{X_k X_k}(m)=\beta P_{X_k X_k}(m-1)+(1-\beta)X_k^H(m)X_k(m),$$

where β is the smoothing term. This example also assumes a fixed step-size (how much the filter is adapted during each iteration) for each partition $\mu(m)=\mu_0 I$, however the step size may be varied in some implementations.

Example implementations of adaptive filter 872 implement cross-band filtering. To illustrate such filtering, let y[n] be the near-end measured signal, which includes the near-end speech and/or noise v [n] mixed with the acoustic echo d[n]=h [n] * x [n], where h [n] is the impulse response of the system, x [n] is the far-end reference signal, and * is the convolution operator. Let $x[m]=[x[mR], x[mR+N-1]]^T$ be the $m^{th}$ reference signal vector, $w_A=[w_A[0], \ldots, w_A[N-1]]^T$ be the analysis window vector, $(F)_{k+1,n+1}=w_N^{kn}$, k, n=0 ..., N−1 be the N×N discrete Fourier transform matrix, and $\underline{x}[m]=F(w_A \circ x[m])=[X_0[m], \ldots, X_{N-1}[M]]^T$ be the DFT of the windowed reference signal vector, where ° is the Hadamard (element-wise) product operator and $\{\cdot\}^T$ is the transpose operator.

Given a transfer function H, the acoustic echo can be represented in the STFT domain as $$\underline{d}[m]=\Sigma_{i=0}^{M-1} H_i[m-1] \underline{x}[m-i],$$

where $\underline{d}[m]$ is the DFT of the $m^{th}$ frame echo signal, $H_i$ is the $i^{th}$ impulse response matrix (i.e., the filter for the $m^{th}$ iteration of AEC 554), $\underline{x}[m]$ is the DFT of the $m^{th}$ frame reference signal, and M is the filter length in the STFT domain.

Given the foregoing, acoustic echo cancellation by AEC 554 can be expressed in the STFT domain as:

$$\underline{x}[m]=F(w_A \circ [x[mR], \ldots, x[mR+N-1]]^T), \text{ where } \underline{x}[m]$$
$$\text{is the reference signal,}$$

$$\underline{y}[m]=F(w_A \circ [y[mR], \ldots, y[mR+N-1]]^T), \text{ where } \underline{y}[m]$$
$$\text{is the measured signal,}$$

and $$\underline{e}[m]=\underline{y}[m]-\hat{\underline{d}}[m]=\underline{y}[m]-\Sigma_{i=0}^{M-1} \hat{H}_i[m-1]\underline{x}[m-i],$$

where $\underline{e}[m]$ is the output signal. As noted above, the redaction function 808 redacts the model signal d[m] from the measured signal.

At block 876, an update filter is determined. As noted above, ultimately, the update filter is multiplied by the filter used in the current iteration of the AEC 554 to yield the filter for the next iteration of the AEC 554. Generally, during the first iterations of the AEC 554, some error exists in the cancellation of the echo from the measured signal. However, over successive iterations of the AEC 554, this error is diminished. In particular, during each iteration of the AEC554, the adaptive filter 872 is updated for the next iteration based on error from the current iteration. In this way, during successive iterations of the AEC 554, the AEC 554 mathematically converges to a cancellation of the audio playback by the speakers 222 (FIG. 2).

In the first iteration of the AEC 554, an initial filter is utilized, as no adaptation has yet occurred. In some implementations, the initial filter is a transfer function representing the acoustic coupling between the speakers 222 and the microphones 224 in an anechoic chamber. In some embodiments, the initial filter comprises a transfer function generated, for example using measurements performed in an anechoic chamber. The generated transfer function can represent an acoustic coupling between the speakers 222 and the microphones 224 without any room effect. Such an initial filter could be used in any acoustic environment. Alternatively, in an effort to start the adaptive filter in a state that more closely matches the actual acoustic environment in which the playback device is located, a transfer function representing an acoustic coupling between the speakers 222 and the microphones 224 may be determined during a calibration procedure that involves microphones 224 recording audio output by speakers 222 in a quiet room (e.g., with minimal noise). Other initial filters may be used as well, although a filter that poorly represents the acoustic coupling between the speakers 222 and the microphones 224 may provide a less-optimal starting point for AEC 554 and result in to additional iterations of AEC 554 before convergence occurs.

In subsequent iterations of the AEC 554, the adaptive filter 872 can continue to adapt. During each $n^{th}$ iteration of the AEC, an $n+1^{th}$ instance of the adaptive filter 872 is determined for the next iteration of the AEC 554. In particular, during the $n^{th}$ iteration of the AEC 554, the $n^{th}$ instance of the adaptive filter is multiplied by an $n^{th}$ update filter to yield the $n+1^{th}$ instance of the adaptive filter. The $n^{th}$ update filter is based on the modelling error of the filter during the $n^{th}$ iteration.

To illustrate, let $\hat{H}$ be an adaptive filter matrix. As noted above, the model signal (i.e., the estimated acoustic echo) can be written as $$\hat{\underline{d}}[m]=\Sigma_{i=0}^{M-1}\hat{H}_i[m-1]\underline{x}[m-i],$$

and the adaptive filter matrix can be updated from iteration to iteration using $$\hat{H}_i[m]=\hat{H}_i[m-1]+G^o\Delta\hat{H}_i[m], i=0,\ldots M-1,$$

where $\Delta\hat{H}_i[m]$ is an update matrix for the filter coefficients matrix and $G=\Sigma k=-K^K P^k$ is a matrix that selects the 2K+1 diagonal bands. P is a permutation matrix defined as $$P \equiv \begin{bmatrix} 0 & \ldots & \ldots & 0 & 1 \\ 1 & \ddots & \vdots & 0 & 0 \\ 0 & \ddots & \ddots & \vdots & \vdots \\ \vdots & \ddots & \ddots & 0 & 0 \\ 0 & \ldots & 0 & 1 & 0 \end{bmatrix}.$$

For a filter having K blocks, to improve the modeling accuracy, 2K cross-terms, or 2K off-diagonal bands are added around the main diagonal terms of H without increasing the computational complexity to an impractical extent. In this example, $\hat{H}$ has 2K+1 diagonal bands. The matrix G limits the number of crossband filters that are useful for system identification in the STFT domain since increasing the number of crossband filters does not necessarily lead to a lower steady-state error.

As noted above, the $n^{th}$ update filter is based on the modelling error of the filter during the $n^{th}$ iteration. Using a least mean squares algorithm, the update filter is given by $$\hat{H}_i^{LMS}[m]=\mu\underline{e}[m]\underline{x}^H[m-i],$$

where $\underline{e}[m]=\underline{y}[m]\hat{\underline{d}}[m]$ is the error signal vector in the STFT domain, $\mu>0$ is a step-size, and $\{\cdot\}^H$ is the Hermitian transpose operator.

As an alternative to the least mean squares, the AEC 554 may implement a normalized least mean squares algorithm to improve noise-robustness. Under an NMLS algorithm, the update filter is given by:

$$\Delta\hat{H}_i^{NLMS}[m]=\mu\underline{e}[m](\underline{n}[m]^o\underline{x}[m-1])^H,$$

where the reference signal is normalized by its signal power before being multiplied by the error signal. As noted above, during an nth iteration, the update filter is multiplied by the adaptive filter for the nth iteration to yield the adaptive filter for the n+1 iteration. Given the example above, the adaptive filter is represented as:

$$\hat{H}_i[m]=\hat{H}_i[m-1]+G^o\Delta\hat{H}_i[m], i=0,\ldots,M-1.$$

In example implementations, acoustic echo cancellation pipeline 800*a* may be integrated into an audio processing pipeline that includes additional audio processing of microphone-captured audio such as beam forming, blind source separation, and frequency gating before the microphone-captured audio is processed as a voice input to a voice service.

b. Second Example Acoustic Echo Cancellation Pipeline

FIG. 8B is a functional block diagram of an example acoustic echo cancellation pipeline 800*b* that includes two acoustic echo cancellers. In particular, the audio processing pipeline 800*b* includes the AEC 554 and a tone interference canceller (TIC) 854. In operation, audio processing pipeline 800*b* runs either the AEC 554 or the TIC 854 when cancelling acoustic echo. Like the acoustic echo cancellation pipeline 800*a*, the acoustic echo cancellation pipeline 800*b* is configured to be implemented within playback device 102 of FIG. 2. However, in other implementations, acoustic echo cancellation pipeline 800*b* may be implemented in an NMD that is not necessarily a playback device, such as NMDs 103*f*-*g*.

As shown in FIG. 8B, the acoustic echo cancellation pipeline 800*b* utilizes a de-multiplexer (de-mux) 881*a*, a de-mux 881*b*, and a multiplexer (mux) 882 to switch between the AEC 554 and TIC 854. In particular, the de-mux 881*a* and the de-mux 881*b* route the measured signal (from microphone array 224 of FIG. 2) and the reference signal (from audio processing components 218 of FIG. 2), respectively, to either the AEC 554 or the TIC 854 based on control signal(s) from a AEC/TIC Control 883. Similarly, the mux 882 routes output to the voice input processing 814 (FIG. 8A) from either the AEC 554 or the TIC 854 based on control signal(s) from the AEC/TIC Control 883. In this manner, either the AEC 554 or the TIC 854 can be activated to cancel acoustic echo.

The AEC 554 is configured to cancel audio output from speakers 222 (FIG. 2) in a full audible frequency spectrum. In some examples, the full audible frequency spectrum includes frequencies generally considered audible to human ears (e.g., 20 Hz to 20,000 Hz). Alternatively, some implementations of the AEC 554 are configured to filter a frequency spectrum that includes frequencies generally considered within the range of human speech (e.g., 300 Hz to 3400 Hz). Minor adjustments to these frequency ranges are possible as well. Acoustic echo having content across such frequency ranges is referred to as "full-range" acoustic echo.

Like the AEC 554, the TIC 854 is an acoustic echo canceller and may include generally similar components and have similar functionality to the AEC 554. However, in contrast to the AEC 554, the TIC 854 is configured to cancel audio output from the speakers 222 in the frequency bands of the full audible frequency spectrum in which the acknowledgment tone has content. Example acknowledgment tones, being tones, may have content in relatively few frequency bins. Further, as compared with full range audio content that is user-selectable, the frequency bands of the full audible frequency spectrum in which a given acknowledgment tone has content may be known (e.g., pre-determined), perhaps by playback device 102 or during manufacturing. Alternatively, the frequency bands of the full audible frequency spectrum in which a given acknowledgment tone has content may be determined by the playback device, perhaps in advance of using the TIC 854 to cancel the acknowledgment tone.

To illustrate, as described above with respect to AEC 554, example filters (e.g., adaptive filter 872) may filter in the STFT domain. When filtering certain frequency bands (frequency "bins"), the filter is shorter than when filtering the full audible frequency spectrum. For instance, referring to the example above, the transfer function H can be shorter (i.e., include fewer elements with transfer functions). This reduces the complexity of the second sound cancellation process, allowing the TIC 854 to converge significantly faster than the AEC 554, which has a longer filter so as to be able to cancel acoustic echo across a significantly larger frequency range (i.e., the full audible frequency spectrum). Note that attempting to cancel full range acoustic echo with the TIC 854 will typically not result in effective acoustic echo cancellation, as the TIC 854 is configured to cancel acoustic echo in a subset of the full range by way of its filter.

As noted above, switching between the AEC 554 and the TIC 854 is performed using the de-mux 881*a*, the de-mux 881*b*, and the mux 882 based on control signal(s) from the AEC/TIC Control 883. This switching mechanism is shown by way of example. In some examples, equivalent switching is implemented programmatically, such as in implementations where the AEC 554 and the TIC 854 are implemented in a processor (e.g., a digital signal processor ("DSP") of playback device 102 (FIG. 2).

In FIG. 8B, the AEC/TIC Control 883 operates the de-mux 881*a*, the de-mux 881*b*, and mux 882 to switch between AEC 554 and TIC 854 based on whether the speakers 222 are playing audio content. In particular, when playback device 102 begins playing audio content via speakers 222, the AEC/TIC Control 883 activates the AEC 554 to cancel acoustic echo from the playback of the audio content. Conversely, if the speakers 222 are inactive (i.e., idle), then the AEC 554 is inactive. Accordingly, when the speakers 222 are inactive and the playback device 102 detects a wake word (e.g., via a wake word detector 552 of FIG. 5A), the AEC/TIC Control 883 activates the TIC 854 to cancel acoustic echo from the playback of an audible tone played back in acknowledgment of the detected wake word.

As noted above, being an iterative process, the AEC 554 takes some time to converge to an effective cancellation of acoustic echo from an inactive state (e.g., ~700 ms or more, depending on the processing capabilities and algorithm implemented). As such, if the AEC 554 were activated instead of the TIC 854 when the speakers 222 are inactive and the playback device 102 detects a wake word, the AEC 554 is unlikely to converge in time to effectively cancel acoustic echo of an audible tone coming shortly after a wake word (in acknowledgment of detecting the wake word). However, as described above, the TIC 854 is designed to converge more quickly than AEC 554, and as such will typically be able to converge in time to cancel the acoustic echo of the audible tone in acknowledgment of the wake word.

Under certain reset conditions, the AEC/TIC Reset 884 will reset the input states of the AEC/TIC Control 883. Input states may include event detection (i.e., the detection of a wake word) and the presence or absence of audio playback via the speakers 222. This allows the AEC/TIC Control 883 to select either (a) the AEC 554 or (b) the TIC 854 under new input conditions, such as another wake word or a change in playback status of the playback device 102 (FIG. 2).

In certain conditions, both the AEC 554 and the TIC 854 may be bypassed. Namely, when the speakers 222 are inactive, the AEC 554 may be inactive as well, as there is no full-range acoustic echo of the playback device 102 to cancel. Further, the TIC 854 may be inactive as well until activated by the detection of a wake word. In such conditions, the speakers 222 are expected to be remain idle (until a wake word is detected or playback of audio content is started) and both the AEC 554 and the TIC 854 can be bypassed, as there is no acoustic echo to cancel (either from playback of the acknowledgment tone or from playback of other audio content). Note that if the speakers 222 return to an idle state after the TIC 854 cancels the acoustic echo of an acknowledgment tone, then the TIC 854 can be bypassed.

c. Example State Machine

Figure 9:
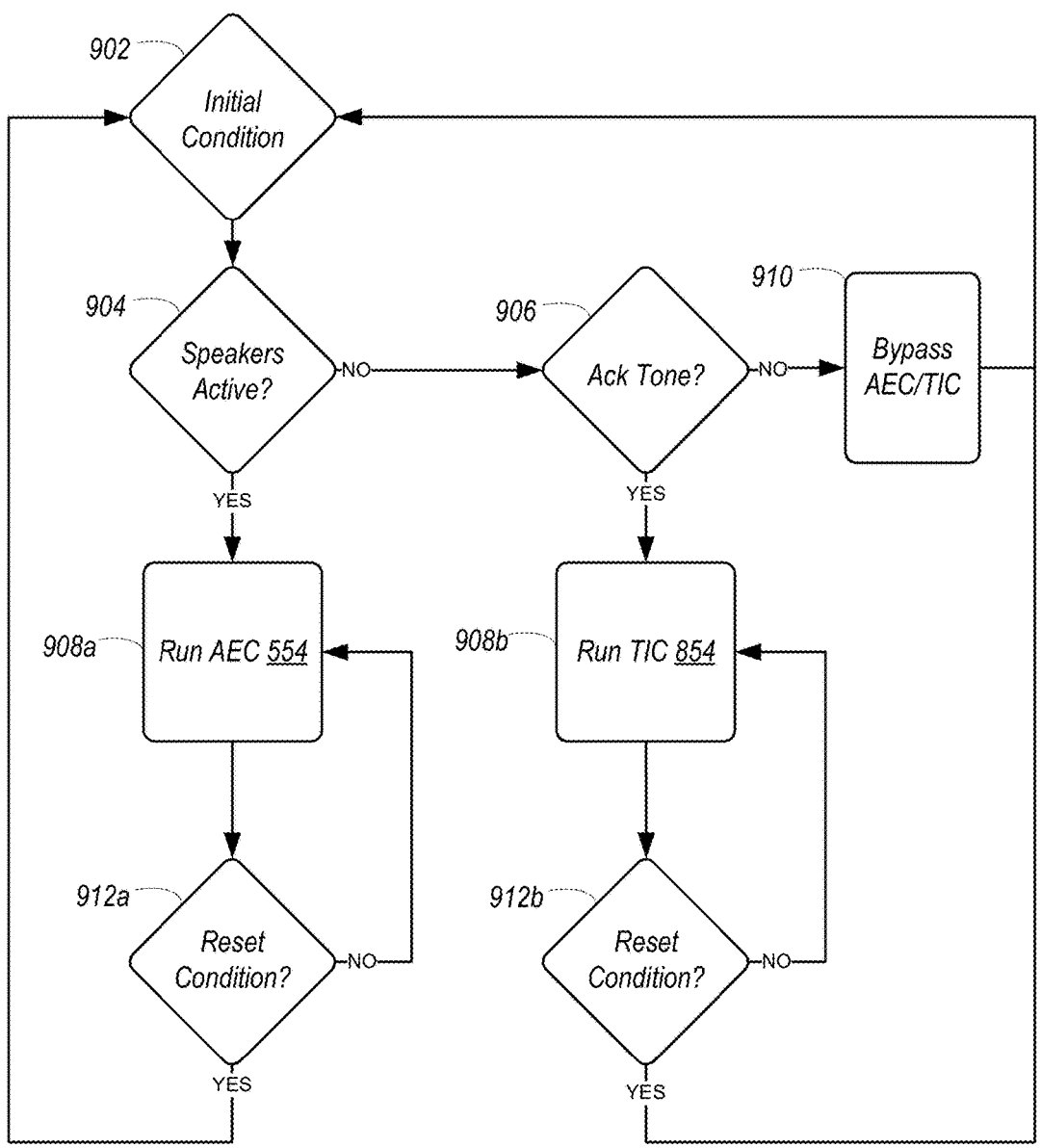
FIG. 9 is a functional block diagram of an example state machine.

In some instances, the AEC/TIC Control 883 and the AEC/TIC Reset 884 are configured as a state machine. FIG. 9 is a functional block diagram of an example state machine 900, which is configured to be implemented by the playback device 102 (FIG. 2), to select between AEC 554 and TIC 854. As shown in FIG. 9, the state machine 900 starts in an initial condition at block 902. In the initial condition, the speakers 222 (FIG. 2) are inactive and there is no wake word acknowledgement tone to be cancelled. These states may be represented as variables, such, "driversIdle==True" to represent that the speakers 222 are idle and "ackTone==False" to represent that there no wake word acknowledgement tone to be cancelled. In such states, both the AEC 554 and the TIC 854 may be bypassed.

However, during operation, the states may change. In particular, at block 904, the state machine 900 determines whether the speakers 222 are active or inactive. In some examples, determines whether the speakers 222 are active or inactive involves determining whether an audio signal is passing through an audio playback pipeline (e.g., an audio playback pipeline implemented by the audio processing components 218 and/or the audio amplifiers 220, perhaps in a DSP). Alternatively, determining whether speakers 222 are active or inactive involves referencing a state variable (e.g., "driversIdle") that is maintained in the memory 216 (FIG. 2) by the playback device 102 to indicate the current state of the speakers 222. Other examples are possible as well.

If the speakers 222 are inactive, the state machine 900 proceeds to block 906, where the state machine 900 determines whether an acknowledgement tone is about to be played. Determining whether determines an acknowledgement tone is about to be played may involve referencing a state variable (e.g., "ackTone") that is maintained in the memory 216 by the playback device 102. A wake word detector (e.g., the wake word detector 552) may set ackTone to "true" in response to detecting a wake word in captured audio.

However, if the speakers 222 are active, the state machine 900 proceeds to block 908*a*, where the AEC 554 is run to cancel the acoustic echo of audio content being played back by the speakers 222. As noted above, the AEC 554 is configured to cancel full-range acoustic echo. If the wake word detector 552 detects a wake word (and the playback device 102 responsively outputs an audible tone in acknowledgment) while the speakers 222 are already active playing other audio content, then the AEC 554 cancels the acoustic echo of the audible tone (perhaps in addition to the acoustic echo of the audio content).

Referring back to block 906, if an acknowledgement tone is about to be played (and the speakers 222 are idle), the state machine 900 proceeds to block 908*b*, where the TIC 854 is run to cancel the acoustic echo of the acknowledgement tone when the tone is played back by the speakers 222. To effectively cancel the acknowledgement tone, the TIC 854 is run prior to the acknowledgement tone being played back by the speakers 222. For instance, the TIC 854 is activated at least one frame prior to the acknowledgement tone being played back by speakers 222, where the TIC 854 implements an acoustic echo cancellation algorithm that processes input signals on a frame-by-frame basis, as described with reference to the AEC 554 in FIG. 8A. In some implementations, the TIC 854 is activated multiple frames prior to the acknowledgement tone being played back by the speakers 222, to provide more iterations for the TIC 854 to converge.

If no acknowledgement tone is about to be played (and the speakers 222 are idle), the state machine 900 proceeds to block 910 and bypasses both the AEC 554 and the TIC 854. State machine 900 then returns to the initial condition at block 902. The state machine 900 may loop through blocks 902, 904, 906, and 908, thereby bypassing the AEC 554 and the TIC 854 while the speakers 222 remain idle and no wake word is detected (e.g., while "driversIdle"==true and "ackTone"==false).

At block 912a, the state machine 900 may determine whether a reset condition for AEC 554 has occurred. Example reset conditions of block 912a include the speakers 222 becoming inactive (e.g., "driversIdle" being set to true) or the expiration of a timer. If a reset condition is detected, the state machine 900 returns to block 902. However, if no reset condition is detected, then the state machine 900 returns to block 908a to continue running the AEC 554 (e.g., if audio content playback is on-going).

Similarly, at block 912b, the state machine 900 may determine whether a reset condition for the TIC 854 has occurred. For instance, an example reset condition for the TIC 854 is completion of the process of cancelling the acoustic echo of the acknowledgment tone using the TIC 854. In particular, when the TIC 854 completes the process of cancelling the acoustic echo of the acknowledgment tone, the TIC 854 is reset in block 912b so that the TIC 854 can return to an idle state (and be bypassed) if appropriate.

Other reset conditions are related to audio playback. For example, a reset condition may be that the speakers 222 becoming active playing audio content (e.g., "driversIdle" being set to false). In such circumstances, the state machine 900 should return to the initial condition, so that AEC 554 can be run to cancel full-range acoustic echo. Alternatively, the TIC 854 may be reset upon the expiration of a timer. A timer may limit the length of the TIC 854 to allow the AEC 854 to be run instead of the TIC 854 if audio playback (other than the acknowledgment tone) starts during playback of the acknowledgment tone.

Some reset conditions are related to user input. For instance, playback of the acknowledgment tone may be deactivated via a voice command, user input via a control device (e.g., control device 104 of FIG. 3), or user input on the playback device 102, among other examples. In such cases, the TIC 854 need not be run. As another example, the voice input (containing the wake word) may be cancelled via a control device, or user input on the playback device 102, among other examples. In such cases, an acknowledgment tone is unnecessary. In a further example, microphones 224 of playback device 102 may be muted, which implies a cancellation of voice inputs. Other examples are possible as well.

IV. Example Acoustic Echo Cancellation

Figure 10:
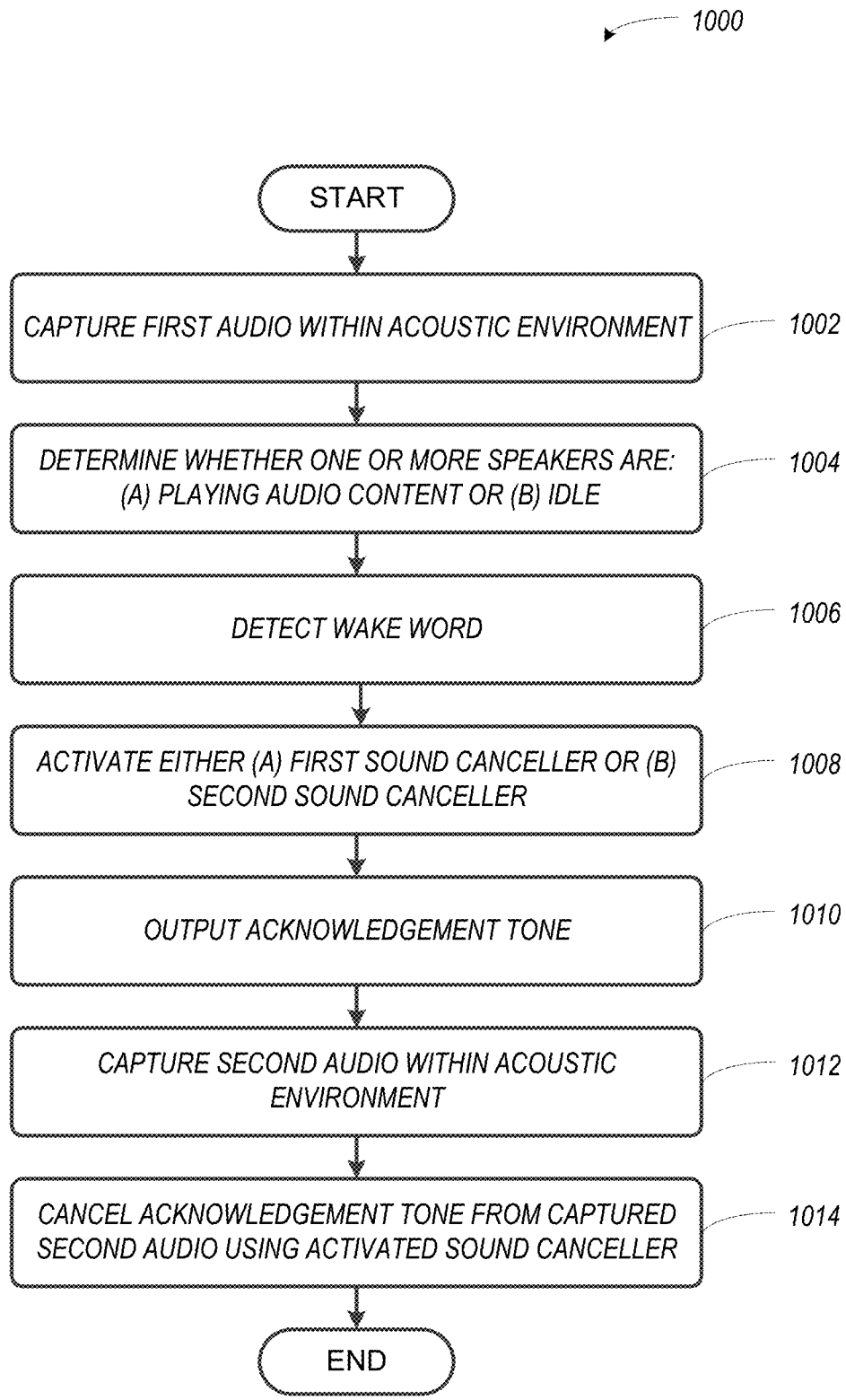
FIG. 10 shows an example flow diagram of a method performing acoustic echo cancellation.

As discussed above, embodiments described herein may involve acoustic echo cancellation. FIG. 10 is a flow diagram of an example implementation 1000 by which a system (e.g., the playback device 102, the NMD 103, and/or the control device 104) may perform acoustic echo cancellation using either a first sound canceller or a second sound canceller. In some embodiments, the implementation 1000 can comprise instructions stored on a memory (e.g., the memory 216 and/or the memory 316) and executable by one or more processors (e.g., the processor 212 and/or the processor 312).

a. Capture First Audio within Acoustic Environment

At block 1002, the implementation 1000 captures first audio within an acoustic environment. For instance, the implementation 1000 can be configured to capture audio within an acoustic environment via a playback device that includes an NMD (e.g., the playback device 102a-e of FIG. 1) having one or more microphones (e.g., the microphones 224 of FIG. 2). Alternatively, the implementation 1000 can be configured to capture audio within an acoustic environment via a NMD (e.g., NMDs 102f-g of FIG. 1) that has a network connection with a playback device.

Capturing audio may involve recording audio within an acoustic environment, as well as processing of the recorded audio, such as analog-to-digital conversation. The implementation may capture audio in an effort to detect voice inputs, such as the voice input 557 of FIG. 5B. As described in FIG. 5B, the example voice input 557 may include a wake word portion 557a and a voice utterance portion 557b. In examples, the first audio captured by the system might include the wake word portion 557a of the voice input 557. The acoustic environment may be defined as sound within detectable range of the microphone.

In some instances, the implementation 1000 may capture audio within an acoustic environment while one or more playback devices are also playing back audio content within the acoustic environment. In such instances, the captured first audio includes audio signals representing the acoustic echo caused by playback of the audio content in the acoustic environment. The captured audio may also include other noise present in the acoustic environment.

b. Determine Whether One or More Speakers are (A) Playing Audio Content or (B) Idle At block 1004, the implementation 1000 determines whether one or more speakers are playing back audio content or idle. For instance, the implementation 1000 can be configured to determine whether the speakers 222 are playing back audio content or idle via the playback device 102. Determining whether the speakers 222 are playing back audio content may involve determining whether an audio signal is passing through the audio playback pipeline of the playback device 102 (e.g., through a DSP of the playback device 102), as described above with reference to block 904 of FIG. 9.

Alternatively, determining whether the speakers 222 are playing back audio content may involve the implementation 1000 referencing a state variable, as also described above with reference to block 904 of FIG. 9. In some examples, the playback device 102 may reference such a state variable from the memory 216. Alternatively, one or more of the NMDs 103a-f may reference such a state variable from the memory 216 of one of the playback device 102a-1021 (e.g., using the network interface 230). Yet further, one or more of the NMDs 103a-f may maintain representations of state variables indicating states of the playback device(s) 102a-1021 in the memory 516, and may reference the state variable from the memory 216. Other examples are possible as well.

c. Detect Wake Word

In FIG. 10, at block 1006, the implementation 1000 detects a wake word. For instance, the system may detect a wake word within the captured first audio content. By way of example, the implementation 1000 may detect the wake word within the captured first audio content using the wake word detector 552 of the NMD 103 (FIG. 5A). In some examples, detecting the wake word triggers an event detector, which ultimately causes the implementation 1000 to perform one or more responsive functions, such as outputting an acknowledgment tone and/or activating a sound canceller.

d. Activate Either (A) a First Sound Canceller or (B) a Second Sound Canceller

At block 1008, the implementation 1000 activates either (A) a first sound canceller or (B) a second sound canceller. For instance, when the one or more speakers 222 are playing back audio content, the implementation 1000 activates a first sound canceller (e.g., the AEC 554) configured to cancel audio output from the one or more speakers 222 in a full audible frequency spectrum. Alternatively, when the one or more speakers are idle, the implementation 1000 activates a second sound canceller (e.g., the TIC 854) in response to detecting the wake word. The second sound canceller is configured to cancel audio output from the one or more speakers in the frequency bands of the full audible frequency spectrum in which the audible tone in acknowledgment of the detected wake word has content.

In some instances, the implementation 1000 includes an acoustic echo cancellation pipeline, such as acoustic echo cancellation pipeline 800*b* of FIG. 8B. In such instances, the implementation 1000 may switch between the first sound canceller (e.g., the AEC 554) or the second sound canceller (e.g., TIC 854) based on control signals from the AEC/TIC Control 883. Further, the implementation 1000 may implement one or more state machines (e.g., the state machine 900 of FIG. 9) to determine when to activate either the first sound canceller, the second sound canceller, or to bypass both sound cancellers.

e. Output Acknowledgement Tone

At block 1010, the implementation 1000 outputs the acknowledgment tone. For instance, the implementation 1000 outputs an acknowledgment tone via the speakers 222 of the playback device 102 in response to detecting the wake word in block 906, thereby acknowledging detection of the wake word. In some examples, a digital representation (e.g., a file) of the acknowledgment tone is stored in memory 216. Alternatively, the acknowledgment tone is streamed from a remote computing system, such as a server of a streaming content service, or the control device 104 (FIG. 3).

f. Capturing Second Audio within the Acoustic Environment

At block 1012, the implementation 1000 captures second audio within the acoustic environment. For example, the implementation 1000 can be configured to capture second audio within an acoustic environment via a playback device or an NMD, as described above with respect to block 1002. Capturing audio may involve recording audio within an acoustic environment, as well as processing of the recorded audio, such as analog-to-digital conversation.

As described in FIG. 5B, the example voice input 557 may include a wake word portion 557*a* and a voice utterance portion 557*b*. Given that the implementation 1000 outputs the acknowledgment tone in response to detecting the wake word in block 906, the acknowledgment tone may overlap with a voice utterance portion 557*b* following a wake word portion 557*a*. Such overlap may interfere with capturing and/or processing of the voice utterance portion 557*b*. As such, the implementation 1000 has enabled the AEC 554 or the TIC 854 to cancel the acoustic echo of the acknowledgment tone from the captured audio.

g. Cancel Acknowledgment Tone from the Captured Second Audio Using the Activated Sound Canceller At block 1014, the implementation 1000 cancels the acknowledgment tone from the captured second audio using the activated sound canceller. In particular, the implementation 1000 cancels the acknowledgment tone using the sound canceller activated in block 1014. In an example, the implementation 1000 provides the captured second audio and the acknowledgment tone as measured and reference signals, respectively, to the TIC 854, which then provides an output signal with the acoustic echo of the acknowledgment tone removed. In another example, the implementation 1000 provides the captured second audio and a compound audio signal (including the acknowledgment tone and audio content being played back by playback 102) as measured and reference signals, respectively, to AEC 554, which then provides an output signal with the acoustic echo of the acknowledgment tone and the acoustic echo of the audio content being played back by playback 102 removed.

h. Additional Functionality

In some examples, the implementation 1000 may perform additional functions. Some examples functions are provided to illustrate examples. Such examples should not be considered limiting.

In some examples, the implementation 1000 identifies a set of frequency bands of the full audible frequency spectrum in which an audible tone in acknowledgment of the detected wake-word has content. For instance, implementation 1000 measures spectral content of the audible tone in the frequency domain (e.g., using a discrete Fourier transform) and identifies, from the spectral content of the audible tone in the frequency domain, a set of the frequency bands in which the audible tone has content. The implementation 1000 may then configure (e.g., instruct) the second sound canceller (e.g., the TIC 854) to process only the set of frequency bins in which the audible tone has content.

Such an embodiment may be useful in embodiments in which the acknowledgment tone is modifiable. If the acknowledgment tone is known and static, the second sound canceller (e.g., the TIC 854) can be pre-configured to process only the set of frequency bins in which the audible tone has content. Other examples are possible as well.

As noted above, in some examples, detecting the wake word triggers an event detector, which ultimately causes the implementation 1000 to perform one or more responsive functions. In some examples, this event detector is reset upon detecting one or more reset events, which allows the implementation 1000 to select a different sound canceller if different conditions arise. Detecting the reset event may include one of: (i) cancelling the audible tone from the captured second audio using the activated sound canceller; (ii) expiration of a timer on the activated sound canceller; (iii) initiation of audio content playback via the one or more speakers; (iv) cancellation of a voice input corresponding to the wake-word detected within the captured first audio content via a control interface; (v) muting of the one or more microphones; and (iv) de-activation of the audible tone via the control interface. Other example reset events are described in connection with blocks 912*a* and 912*b* of FIG. 9.

V. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

(Feature 1) A method to be performed by a system, the method comprising: capturing, via the one or more microphones, first audio within an acoustic environment; determining whether the one or more speakers are (a) playing back audio content or (b) idle; detecting, within the captured first audio content, a wake-word for a voice service; identifying a set of frequency bands of the full audible frequency spectrum in which an audible tone in acknowledgment of the detected wake-word has content; in response to detecting the wake-word for the voice service and before playing an audible tone in acknowledgement of the detected wake-word on the one or more speakers, activating either (a) a first sound canceller or (b) a second sound canceller, wherein activating either the (a) first sound canceller or (b) the second sound canceller comprises: when the one or more speakers are playing back audio content, activating the first sound canceller, the first sound canceller configured to cancel audio output from the one or more speakers in a full audible frequency spectrum; and when the one or more speakers are idle, activating the second sound canceller, the second sound canceller configured to cancel audio output from the one or more speakers in the identified frequency bands of the full audible frequency spectrum in which the audible tone in acknowledgment of the detected wake-word has content; and in response to detecting the wake-word for the voice service and after activating either (a) the first sound canceller or (b) the second sound canceller, outputting the audible tone in acknowledgement of the detected wake-word via the one or more speakers; capturing, via the one or more microphones, second audio within the acoustic environment, wherein the second audio comprises sound produced by the one or more speakers in outputting the audible tone in acknowledgement of the detected wake-word; and cancelling the audible tone in acknowledgment of the detected wake-word from the captured second audio using the activated sound canceller.

(Feature 2) The method of feature 1, wherein identifying the set of frequency bands of the full audible frequency spectrum in which an audible tone in acknowledgment of the detected wake-word has content comprises: measuring spectral content of the audible tone in the frequency domain; identifying, from the spectral content of the audible tone in the frequency domain, a set of the frequency bands in which the audible tone has content; and instructing the second sound canceller to process only the set of frequency bins in which the audible tone has content.

(Feature 3) The method of feature 3, wherein audio captured by the one or more microphones is divided into frames for processing by the either (a) the first sound canceller or (b) the second sound canceller, and wherein activating either (a) the first sound canceller or (b) the second sound canceller before playing the audible tone in acknowledgement of the detected wake-word comprises activating either (a) the first sound canceller or (b) the second sound canceller at least one frame before outputting the audible tone in acknowledgement of the detected wake-word via the one or more speakers.

(Feature 4) The method of feature 1, wherein detecting, within the captured first audio content, the wake-word for the voice service comprises triggering an event detector in response to detecting the wake-word, and wherein the operations further comprise resetting the event detector upon detecting a reset event.

(Feature 5) The method of feature 1, wherein detecting the reset event comprises at least one of: (i) cancelling the audible tone from the captured second audio using the activated sound canceller; (ii) expiration of a timer on the activated sound canceller; (iii) initiation of audio content playback via the one or more speakers; (iv) cancellation of a voice input corresponding to the wake-word detected within the captured first audio content via a control interface; (v) muting of the one or more microphones; and (iv) de-activation of the audible tone via the control interface.

(Feature 6) The method of feature 1, wherein determining whether the one or more speakers are (a) playing back audio content or (b) idle comprises determining that the one or more speakers are playback back audio content based on an audio stage of the system passing an audio signal representing the audio content.

(Feature 7) The method of feature 1, wherein the system includes a playback device comprising a network interface and the one or more speakers and a networked-microphone device comprising a network interface, the one or more microphones, the one or more processors, and the data storage storing instructions executable by the one or more processors, and wherein the playback device and the networked-microphone device are connected via the network interface of the playback device and the network interface of the networked-microphone device.

(Feature 8) The method of feature 1, wherein the system includes a playback device comprising a housing in which the one or more speakers and the one or more microphones are housed.

(Feature 9) A tangible, non-transitory computer-readable medium having stored therein instructions executable by one or more processors to cause a device to perform the method of any of features 1-8.

(Feature 10) A device configured to perform the method of any of features 1-8.

(Feature 11) A media playback system configured to perform the method of any of features 1-8.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A system comprising a playback device, wherein the playback device comprises at least one processor and at least one non-transitory computer-readable medium including instructions that are executable by the at least one processor such that the playback device is configured to:
    based on one or more speakers of the playback device being currently idle, activate a tone canceller, wherein the playback device activates an echo canceller when the one or more speakers are playing audio other than a particular audible tone and no longer idle, and wherein, while activated, the echo canceller is configured to cancel audio output from the one or more speakers across a plurality of frequency bands;
    capture, via one or more microphones, a first portion of a first voice input;

detect, within the first portion of the first voice input, a wake word for a voice assistant;

in response to detection of the wake word within the first portion of the first voice input and after activation of the tone canceller, output, via the one or more speakers, the particular audible tone in acknowledgement of the wake-word detection, wherein the particular audible tone has content in one or more known frequency bands which are a subset of the plurality of frequency bands, and wherein the one or more speakers are no longer idle when outputting the particular audible tone;

capture, via the one or more microphones, a second portion of the first voice input; and cancel, via the activated tone canceller, the particular audible tone in acknowledgement of the wake-word detection from the captured second portion of the first voice input.

2. The system of claim 1, wherein the instructions are executable by the at least one processor such that the playback device is further configured to:

based on the one or more speakers of the playback device being currently active in playing audio, activate the echo canceller, wherein the playback device deactivates the tone canceller when the one or more speakers are currently active in playing audio and no longer idle, and wherein the playback device is playing back particular audio content;

capture, via the one or more microphones, a first portion of a second voice input;

detect, within the first portion of the second voice input, a second wake word for the voice assistant;

in response to detection of the wake word within the first portion of the second voice input and after activation of the echo canceller, output, via the one or more speakers, the particular audible tone in acknowledgement of the acknowledgement of the wake-word detection within the first portion of the second voice input;

capture, via the one or more microphones, a second portion of the second voice input; and cancel, via the activated echo canceller, speaker output within the captured second portion of the second voice input, wherein the speaker output comprises (a) the particular audible tone in acknowledgement of the wake-word detection within the first portion of the second voice input and (b) the particular audio content.

3. The system of claim 1, wherein the instructions are executable by the at least one processor such that the playback device is further configured to:

detect input data representing a command to mute the one or more microphones; and based on detection of the input data representing the command to mute the one or more microphones: (i) disable the one or more microphones and deactivate (a) the echo canceller and (b) the tone canceller.

4. The system of claim 1, wherein the instructions are executable by the at least one processor such that the playback device is further configured to:

detect input data representing a command to de-activate the particular audible tone; and based on one or more speakers of the playback device being currently idle and detection of the input data representing the command to de-activate the particular audible tone, disable the tone canceller.

5. The system of claim 1, wherein the instructions that are executable by the at least one processor such that the playback device is configured to activate the tone canceller comprise instructions are executable by the at least one processor such that the playback device is configured to:

activate the tone canceller in response to detection of the wake word within the first portion of the first voice input.

6. The system of claim 1, wherein the instructions that are executable by the at least one processor such that the playback device is configured to cancel the particular audible tone in acknowledgement of the wake-word detection from the captured second portion of the first voice input comprise instructions are executable by the at least one processor such that the playback device is configured to:

determining a sequence of frames representing the second portion of the first voice input, wherein the instructions are executable by the at least one processor such that the playback device is configured to activate the tone canceller comprise instructions are executable by the at least one processor such that the playback device is configured to:

activate the tone canceller at least one frame before output of the particular audible tone in acknowledgement of the wake-word detection within the first portion of the first voice input.

7. The system of claim 1, wherein the instructions are executable by the at least one processor such that the playback device is further configured to:

determine whether the one or more speakers are (a) currently active in playing audio or (b) idle based on one or more state variables representing a current playback state of the playback device.

8. A playback device comprising:
one or more speakers;
a network interface;
at least one processor; and
data storage including instructions that are executable by the at least one processor such that the playback device is configured to:

based on the one or more speakers of the playback device being currently idle, activate a tone canceller, wherein the playback device activates an echo canceller when the one or more speakers are playing audio other than a particular audible tone and no longer idle, and wherein, while activated, the echo canceller is configured to cancel audio output from the one or more speakers across a plurality of frequency bands;

capture, via one or more microphones, a first portion of a first voice input;

detect, within the first portion of the first voice input, a wake word for a voice assistant;

in response to detection of the wake word within the first portion of the first voice input and after activation of the tone canceller, output, via the one or more speakers, the particular audible tone in acknowledgement of the wake-word detection, wherein the particular audible tone has content in one or more known frequency bands which are a subset of the plurality of frequency bands, and wherein the one or more speakers are no longer idle when outputting the particular audible tone;

capture, via the one or more microphones, a second portion of the first voice input; and cancel, via the activated tone canceller, the particular audible tone in acknowledgement of the wake-word detection from the captured second portion of the first voice input.

9. The playback device of claim 8, wherein the instructions are executable by the at least one processor such that the playback device is further configured to:
- based on the one or more speakers of the playback device being currently active in playing audio, activate the echo canceller, wherein the playback device deactivates the tone canceller when the one or more speakers are currently active in playing audio, and wherein the playback device is playing back particular audio content;
- capture, via the one or more microphones, a first portion of a second voice input;
- detect, within the first portion of the second voice input, a second wake word for the voice assistant;
- in response to detection of the wake word within the first portion of the second voice input and after activation of the echo canceller, output, via the one or more speakers, the particular audible tone in acknowledgement of the wake-word detection within the first portion of the second voice input;
- capture, via the one or more microphones, a second portion of the second voice input; and
- cancel, via the activated echo canceller, speaker output within the captured second portion of the second voice input, wherein the speaker output comprises (a) the particular audible tone in acknowledgement of the wake-word detection within the first portion of the second voice input and (b) the particular audio content.

10. The playback device of claim 8, wherein the instructions are executable by the at least one processor such that the playback device is further configured to:
- detect input data representing a command to mute the one or more microphones; and
- based on detection of the input data representing the command to mute the one or more microphones: (i) disable the one or more microphones and deactivate (a) the echo canceller and (b) the tone canceller.

11. The playback device of claim 8, wherein the instructions are executable by the at least one processor such that the playback device is further configured to:
- detect input data representing a command to de-activate the particular audible tone; and
- based on the one or more speakers of the playback device being currently idle and detection of the input data representing the command to de-activate the particular audible tone, disable the tone canceller.

12. The playback device of claim 8, wherein the instructions that are executable by the at least one processor such that the playback device is configured to activate the tone canceller comprise instructions are executable by the at least one processor such that the playback device is configured to:
- activate the tone canceller in response to detection of the wake word within the first portion of the first voice input.

13. The playback device of claim 8, wherein the instructions that are executable by the at least one processor such that the playback device is configured to cancel the particular audible tone in acknowledgement of the wake-word detection from the captured second portion of the first voice input comprise instructions are executable by the at least one processor such that the playback device is configured to:
- determining a sequence of frames representing the second portion of the first voice input, wherein the instructions are executable by the at least one processor such that the playback device is configured to activate the tone canceller comprise instructions are executable by the at least one processor such that the playback device is configured to:
- activate the tone canceller at least one frame before output of the particular audible tone in acknowledgement of the wake-word detection within the first portion of the first voice input.

14. The playback device of claim 8, wherein the instructions are executable by the at least one processor such that the playback device is further configured to:
- determine whether the one or more speakers are (a) currently active in playing audio or (b) idle based on one or more state variables representing a current playback state of the playback device.

15. A tangible, non-transitory computer-readable medium storing instructions that are executable by at least one processor such that a playback device is configured to:
- based on one or more speakers of the playback device being currently idle, activate a tone canceller, wherein the playback device activates an echo canceller when the one or more speakers are playing audio other than a particular audible tone and no longer idle, and wherein, while activated, the echo canceller is configured to cancel audio output from the one or more speakers across a plurality of frequency bands;
- capture, via one or more microphones, a first portion of a first voice input;
- detect, within the first portion of the first voice input, a wake word for a voice assistant;
- in response to detection of the wake word within the first portion of the first voice input and after activation of the tone canceller, output, via the one or more speakers, the particular audible tone in acknowledgement of the wake-word detection, wherein the particular audible tone has content in one or more known frequency bands which are a subset of the plurality of frequency bands, and wherein the one or more speakers are no longer idle when outputting the particular audible tone;
- capture, via the one or more microphones, a second portion of the first voice input; and
- cancel, via the activated tone canceller, the particular audible tone in acknowledgement of the wake-word detection from the captured second portion of the first voice input.

16. The tangible, non-transitory computer-readable medium of claim 15, wherein the instructions are executable by the at least one processor such that the playback device is further configured to:
- based on the one or more speakers of the playback device being currently active in playing audio, activate the echo canceller, wherein the playback device deactivates the tone canceller when the one or more speakers are currently active in playing audio, and wherein the playback device is playing back particular audio content;
- capture, via the one or more microphones, a first portion of a second voice input;
- detect, within the first portion of the second voice input, a second wake word for the voice assistant;
- in response to detection of the wake word within the first portion of the second voice input and after activation of the echo canceller, output, via the one or more speakers, the particular audible tone in acknowledgement of the wake-word detection within the first portion of the second voice input;
- capture, via the one or more microphones, a second portion of the second voice input; and cancel, via the activated echo canceller, speaker output within the captured second portion of the second voice input, wherein the speaker output comprises (a) the particular audible tone in acknowledgement of the wake-word detection within the first portion of the second voice input and (b) the particular audio content.

17. The tangible, non-transitory computer-readable medium of claim 15, wherein the instructions are executable by the at least one processor such that the playback device is further configured to:
   detect input data representing a command to mute the one or more microphones; and
   based on detection of the input data representing the command to mute the one or more microphones: (i) disable the one or more microphones and deactivate (a) the echo canceller and (b) the tone canceller.

18. The tangible, non-transitory computer-readable medium of claim 15, wherein the instructions that are executable by the at least one processor such that the playback device is further configured to:
   detect input data representing a command to de-activate the particular audible tone; and
   based on one or more speakers of the playback device being currently idle and detection of the input data representing the command to de-activate the particular audible tone, disable the tone canceller.

19. The tangible, non-transitory computer-readable medium of claim 15, wherein the instructions that are executable by the at least one processor such that the playback device is configured to activate the tone canceller comprise instructions are executable by the at least one processor such that the playback device is configured to:
   activate the tone canceller in response to detection of the wake word within the first portion of the first voice input.

20. The tangible, non-transitory computer-readable medium of claim 15, wherein the instructions are executable by the at least one processor such that the playback device is configured to cancel the particular audible tone in acknowledgement of the wake-word detection from the captured second portion of the first voice input comprise instructions that are executable by the at least one processor such that the playback device is configured to:
   determine a sequence of frames representing the second portion of the first voice input, wherein the instructions are executable by the at least one processor such that the playback device is configured to activate the tone canceller comprise instructions that are executable by the at least one processor such that the playback device is configured to:
   activate the tone canceller at least one frame before output of the particular audible tone in acknowledgement of the wake-word detection within the first portion of the first voice input.

* * * * *

UNITED STATES PATENT AND TRADEMARK OFFICE
CERTIFICATE OF CORRECTION

| | |
|---|---|
| PATENT NO. | : 11,302,326 B2 |
| APPLICATION NO. | : 16/845946 |
| DATED | : April 12, 2022 |
| INVENTOR(S) | : Saeed Bagheri Sereshki |

It is certified that error appears in the above-identified patent and that said Letters Patent is hereby corrected as shown below:

In the Claims

In Column 34, in Claim 5, Line 1, after "instructions" insert -- that --.

In Column 34, in Claim 6, Line 12, after "instructions" insert -- that --.

In Column 34, in Claim 6, Line 15, after "instructions" insert -- that --.

In Column 34, in Claim 6, Line 18, after "instructions" insert -- that --.

In Column 35, in Claim 12, Line 52, after "instructions" insert -- that --.

In Column 35, in Claim 13, Line 62, after "instructions" insert -- that --.

In Column 35, in Claim 13, Line 65, after "instructions" insert -- that --.

In Column 36, in Claim 13, Line 1, after "instructions" insert -- that --.

In Column 38, in Claim 19, Line 3, after "instructions" insert -- that --.

In Column 38, in Claim 20, Line 10, after "instructions" insert -- that --.

In Column 38, in Claim 20, Line 18, after "instructions" insert -- that --.

Signed and Sealed this
Seventh Day of June, 2022

Katherine Kelly Vidal
*Director of the United States Patent and Trademark Office*